Nov. 13, 1951  G. F. STARNES  2,574,598
CHECK CONTROLLED PHONOGRAPH
Filed Aug. 4, 1948  26 Sheets-Sheet 1

GEORGE F. STARNES,
Inventor.

By
Attorney

Nov. 13, 1951     G. F. STARNES     2,574,598
CHECK CONTROLLED PHONOGRAPH

Filed Aug. 4, 1948     26 Sheets-Sheet 2

GEORGE F. STARNES,
Inventor.
By Paul Eaton
Attorney

Nov. 13, 1951 G. F. STARNES 2,574,598
CHECK CONTROLLED PHONOGRAPH
Filed Aug. 4, 1948 26 Sheets-Sheet 3

GEORGE F. STARNES,
Inventor.

By
Attorney

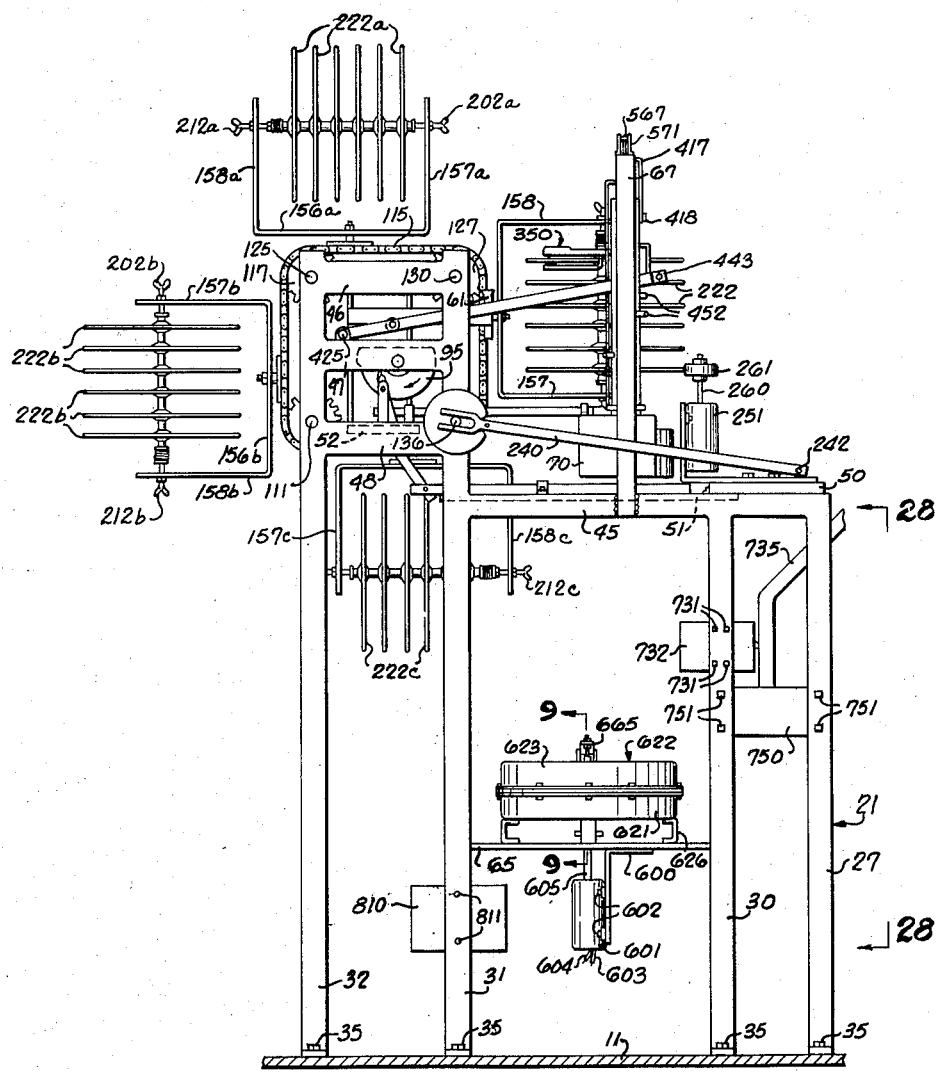

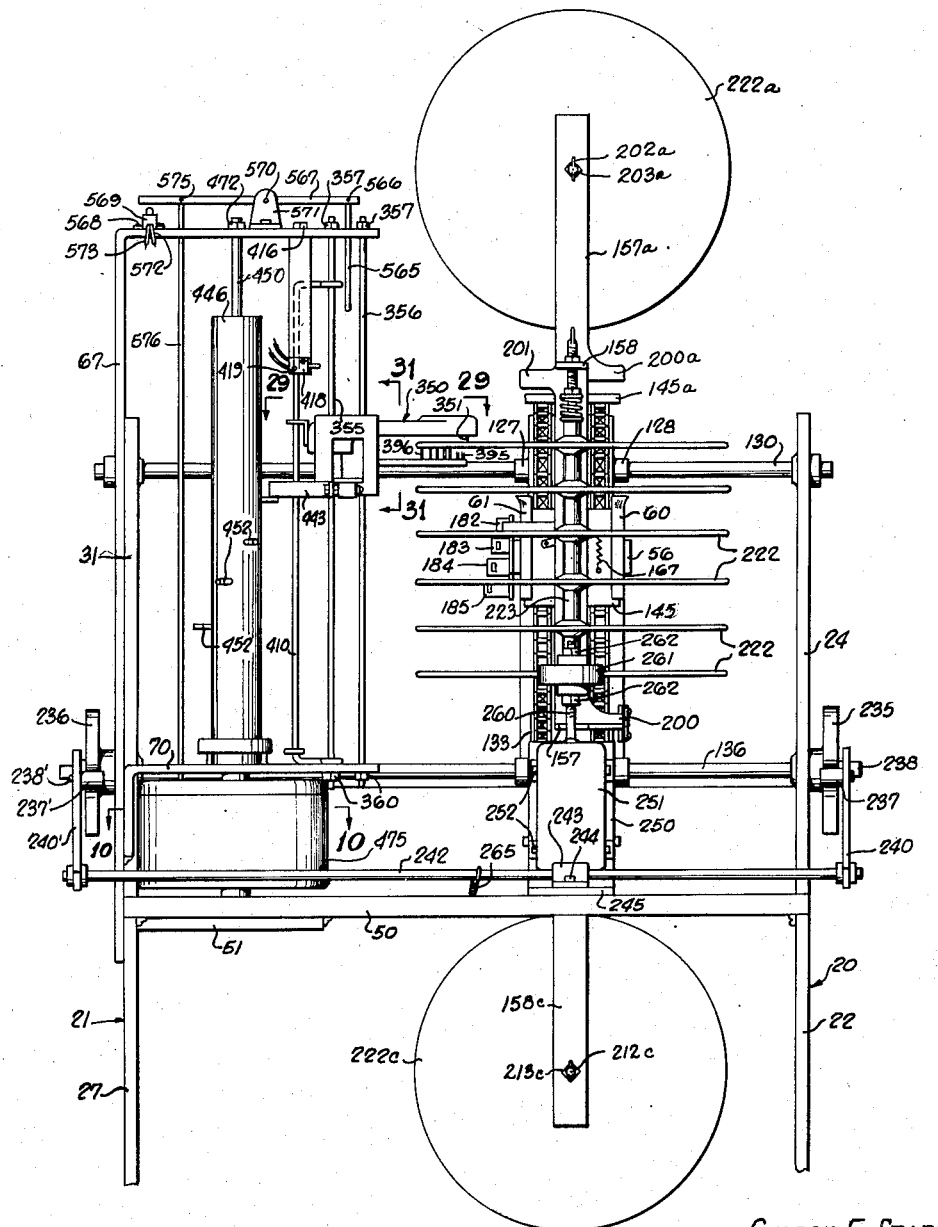

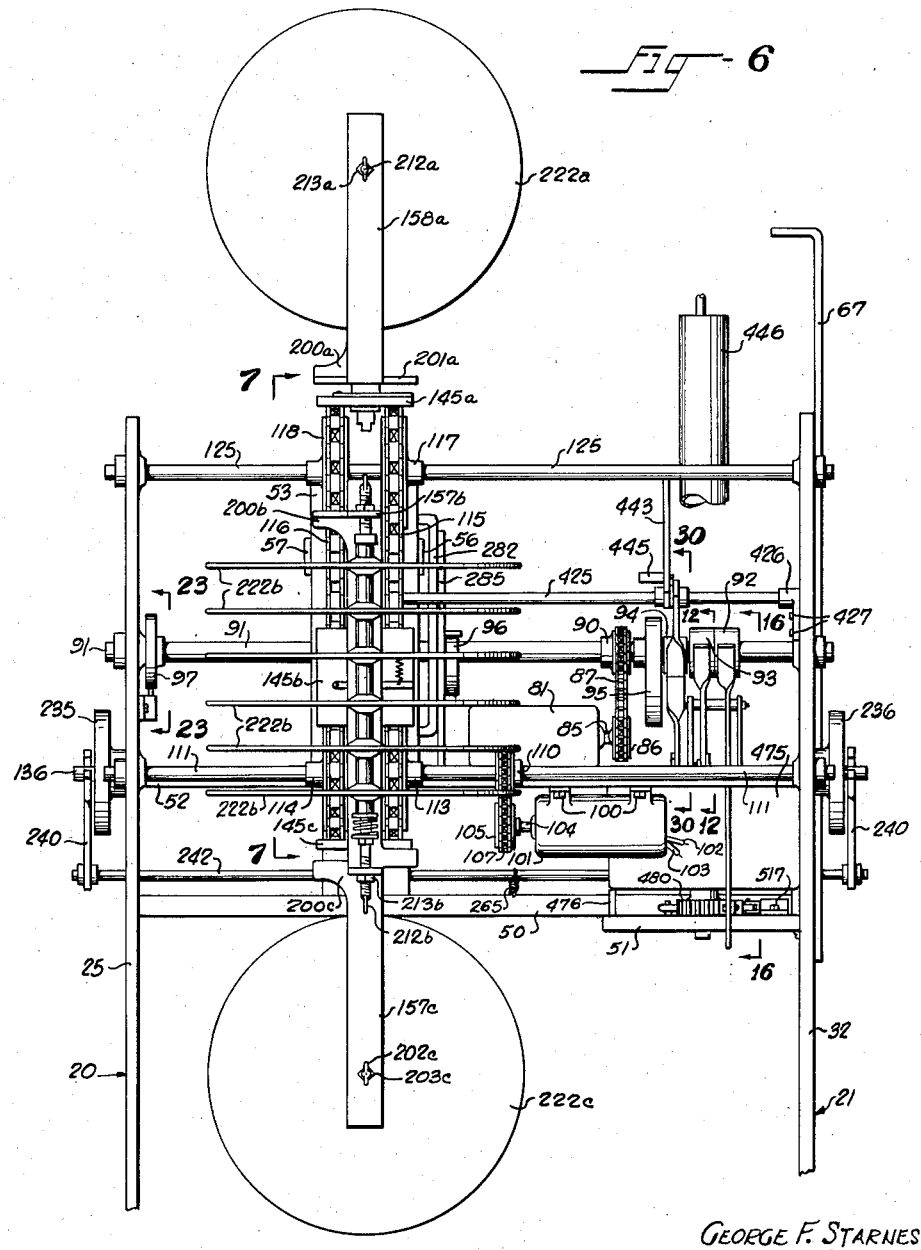

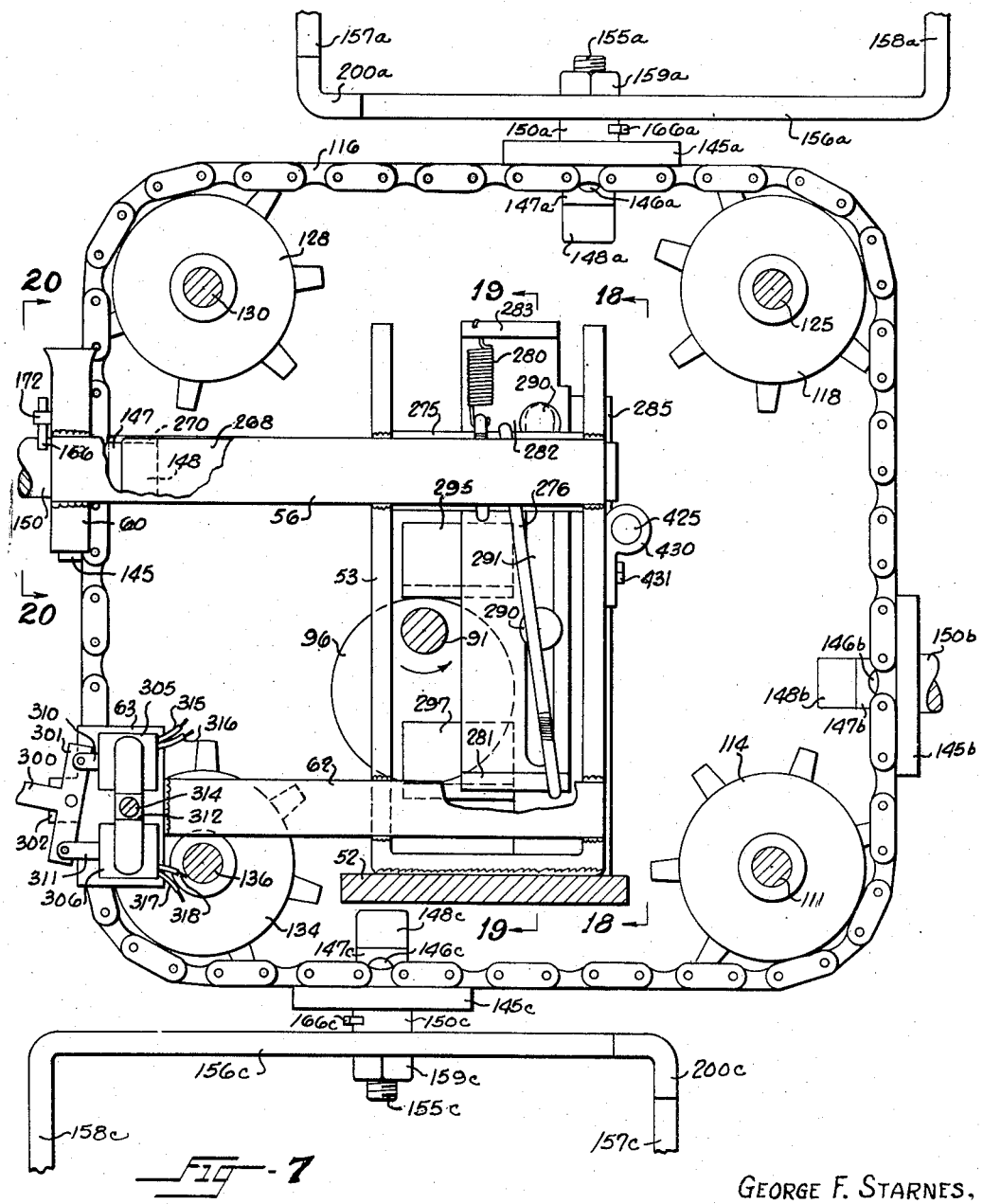

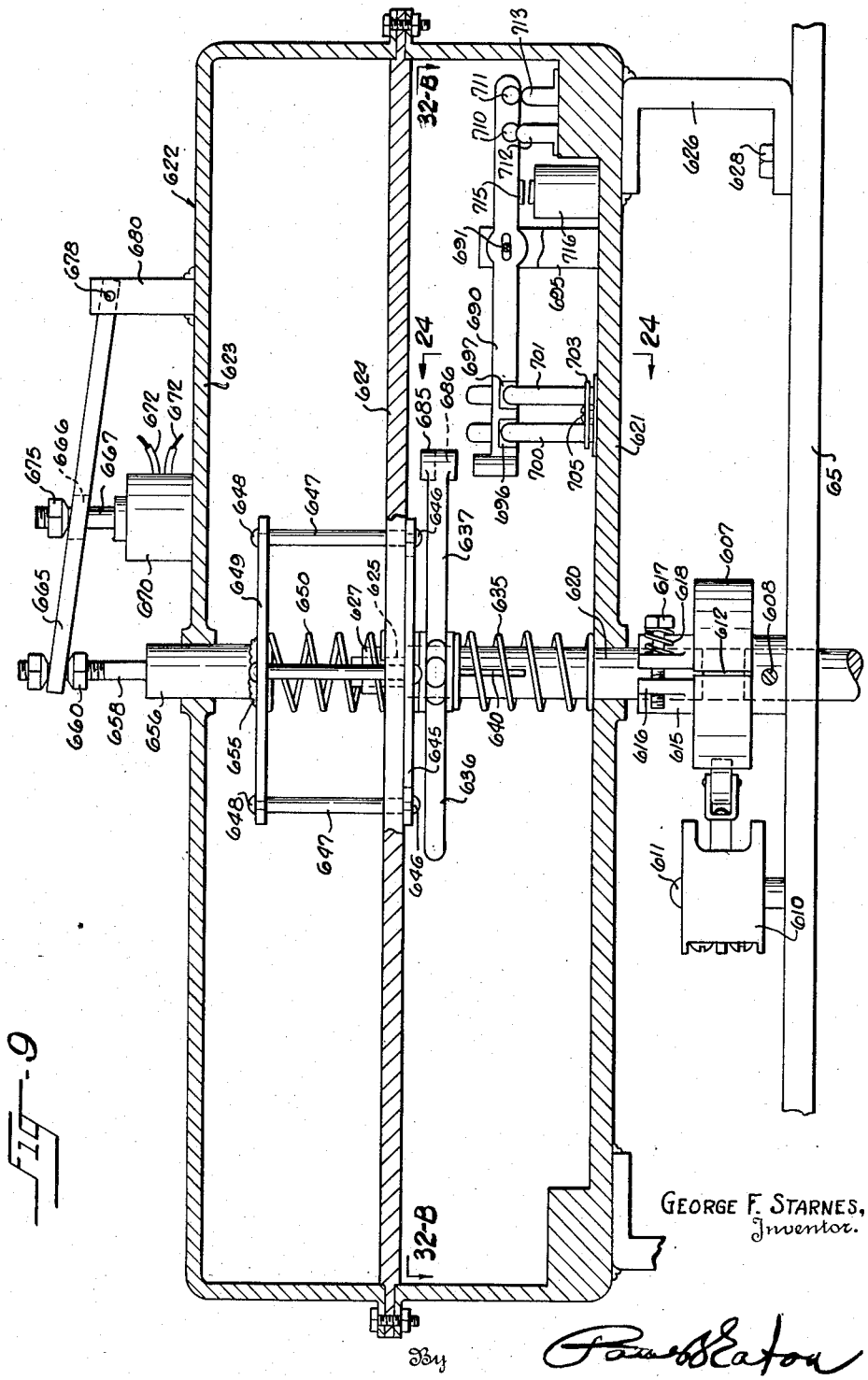

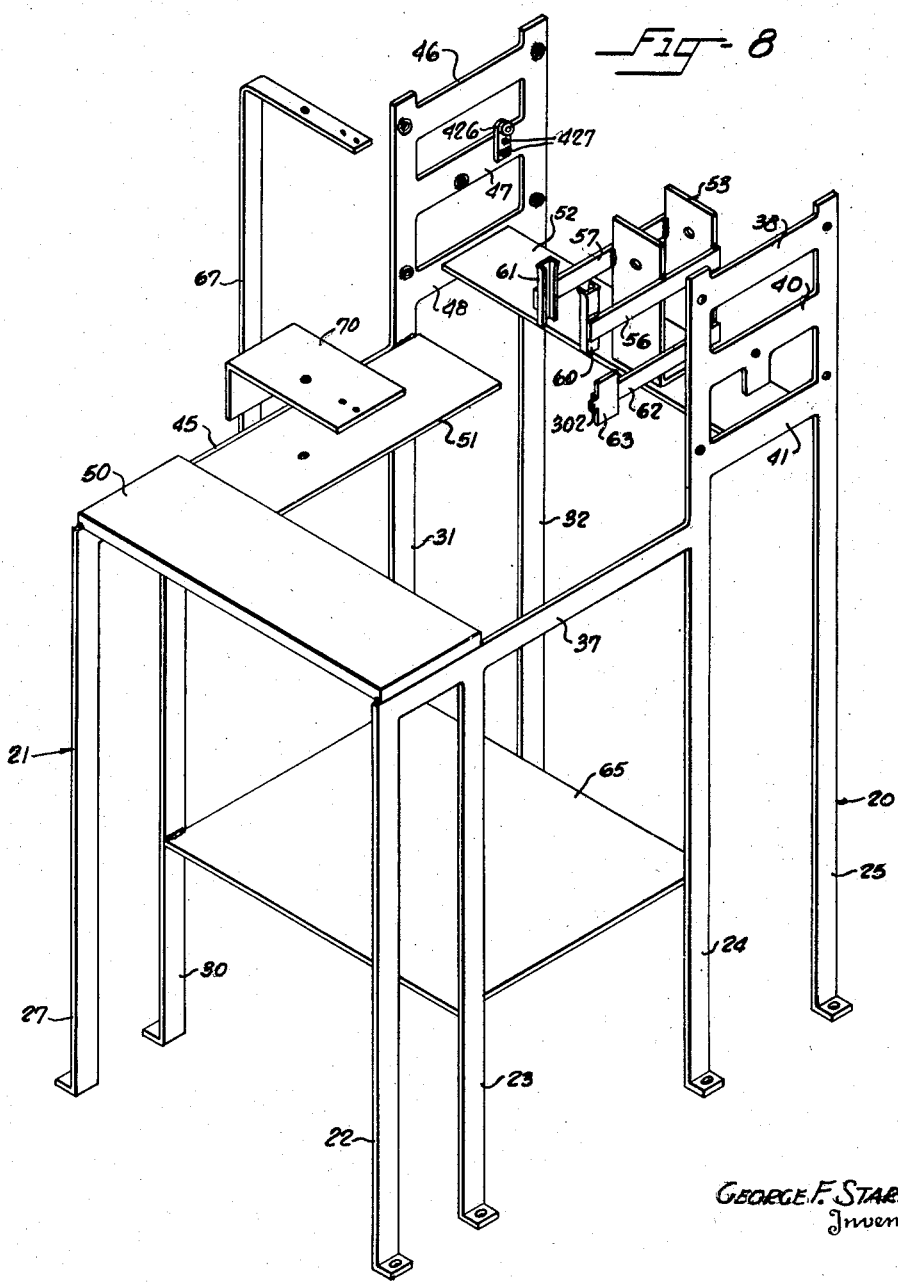

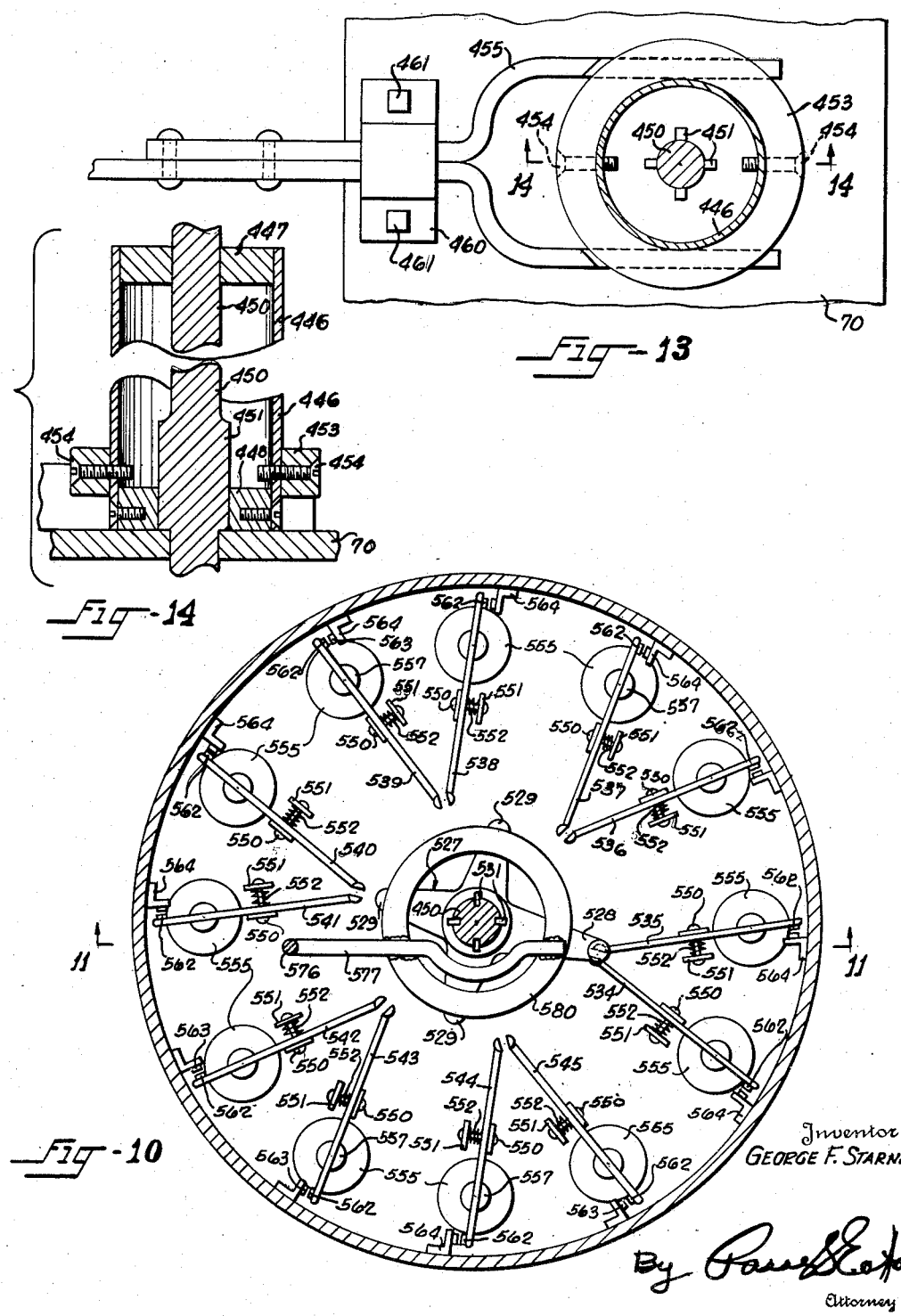

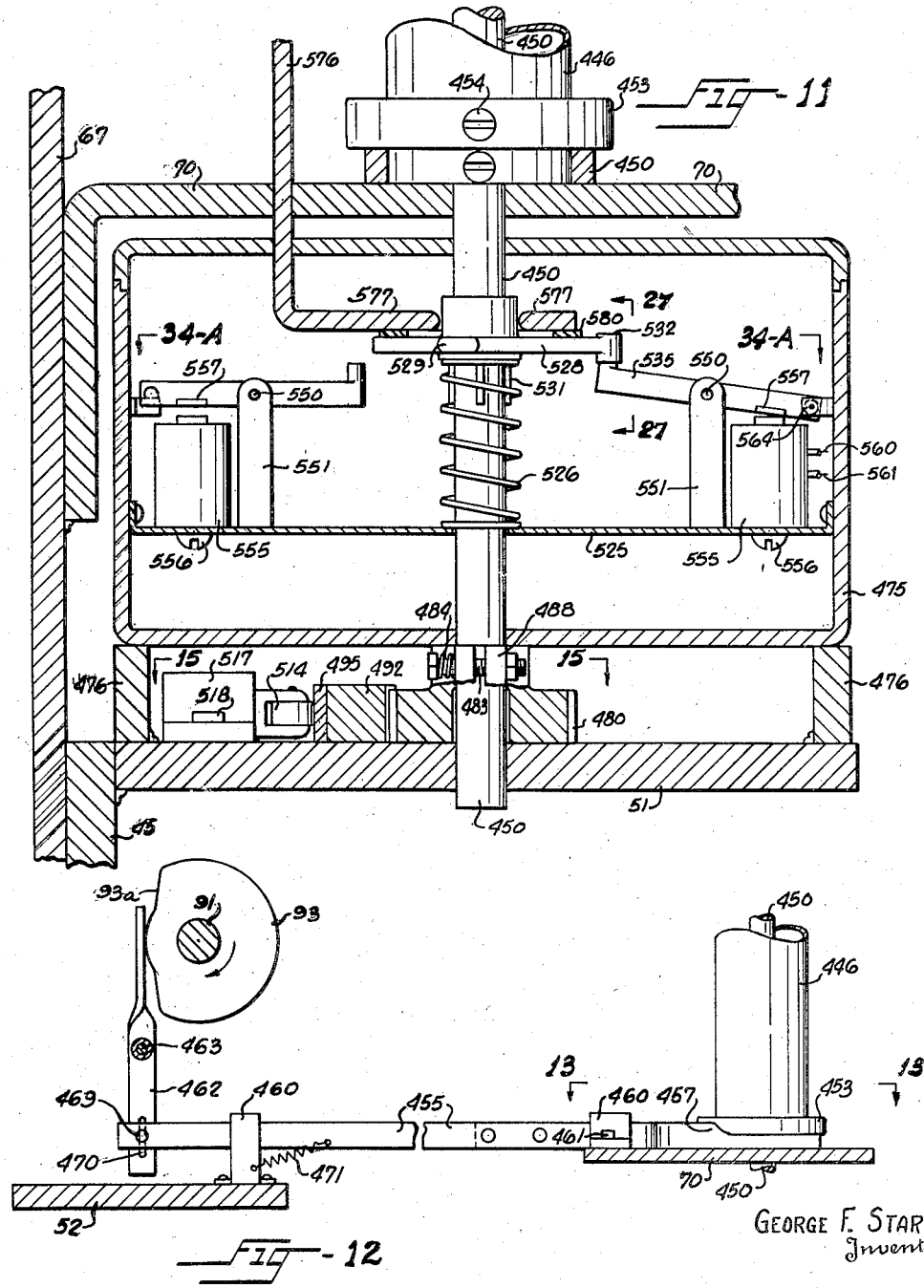

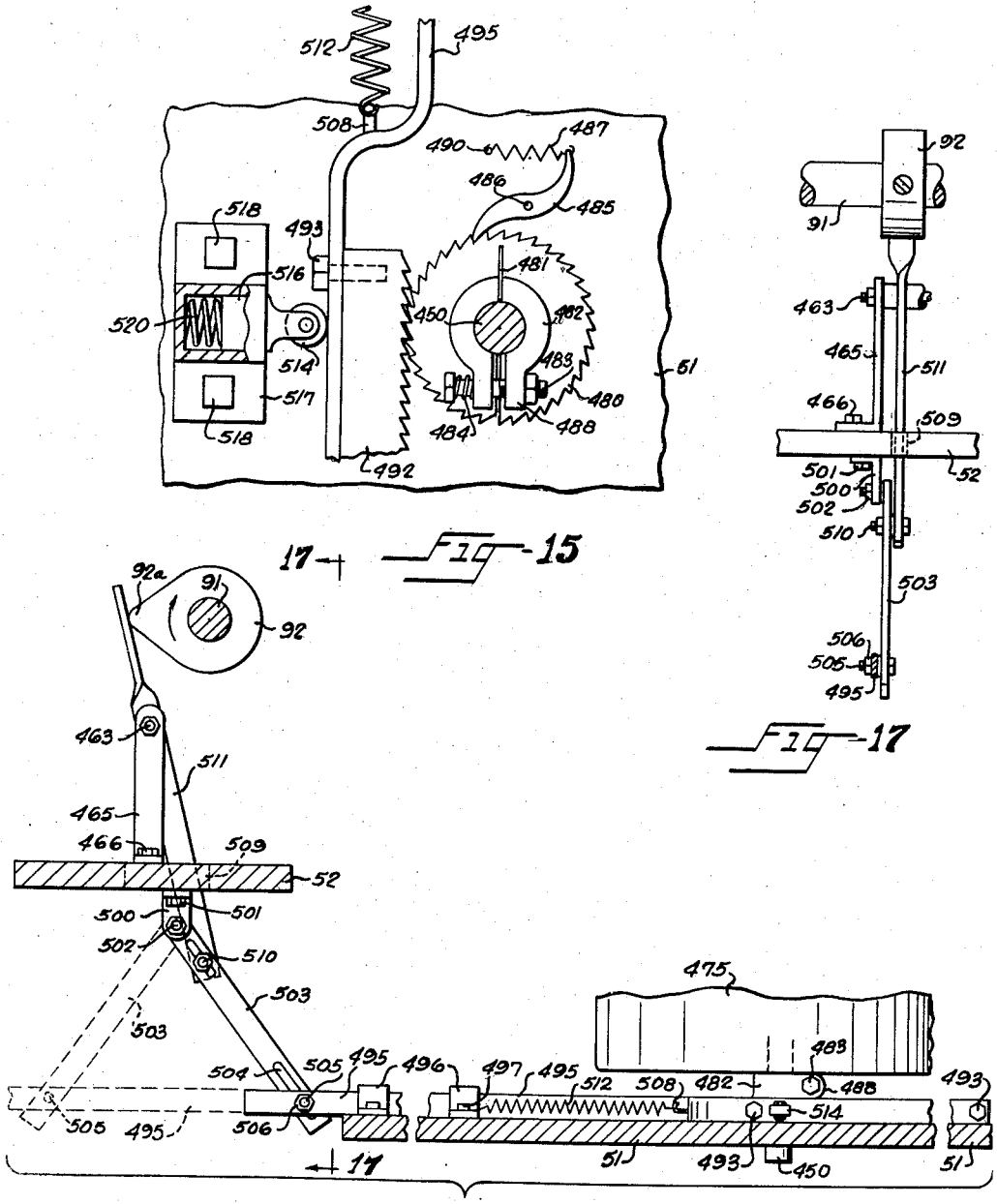

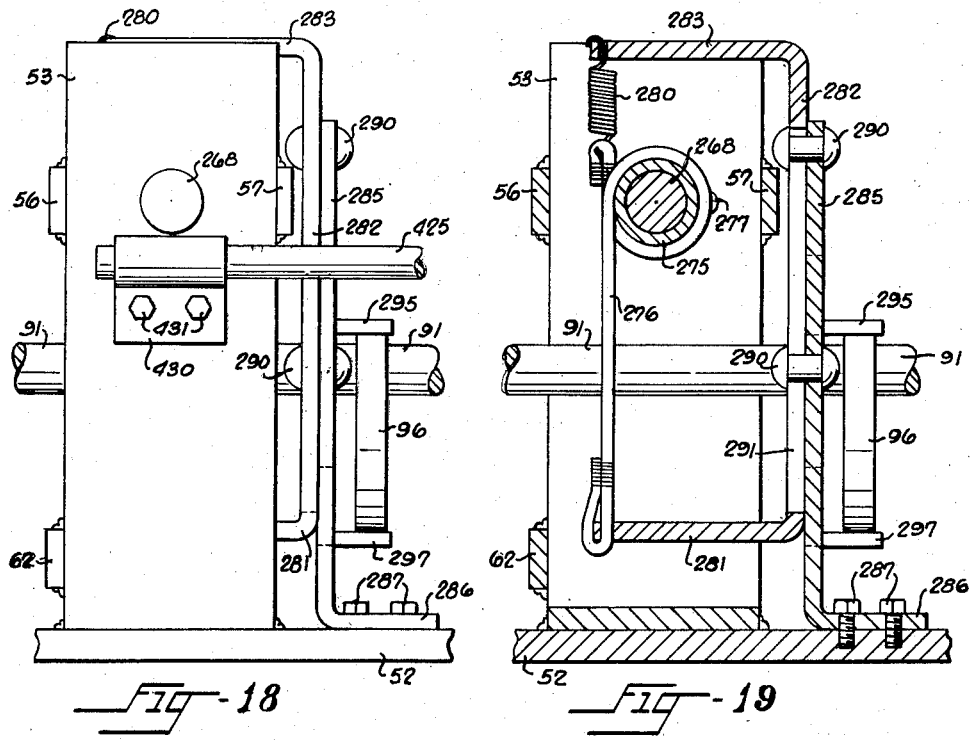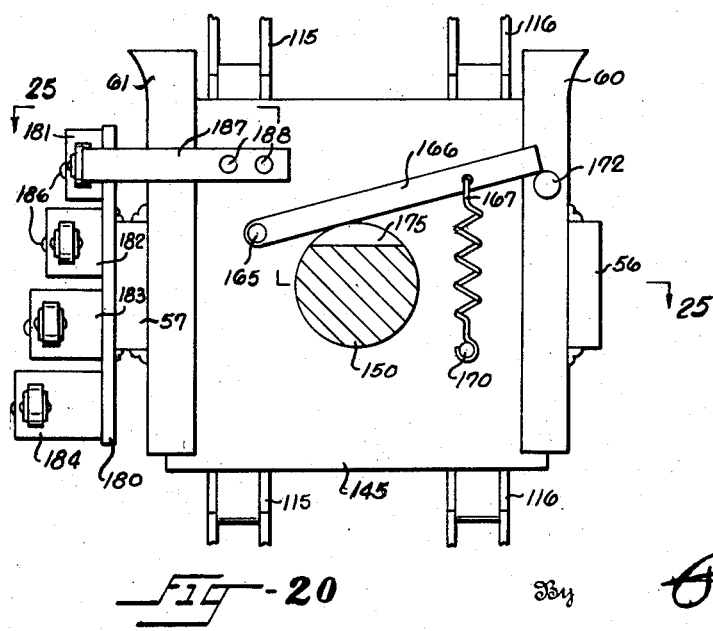

Nov. 13, 1951 G. F. STARNES 2,574,598
CHECK CONTROLLED PHONOGRAPH
Filed Aug. 4, 1948 26 Sheets—Sheet 14

GEORGE F. STARNES,
Inventor.

By Paul S. Eaton
Attorney

Nov. 13, 1951     G. F. STARNES     2,574,598
CHECK CONTROLLED PHONOGRAPH
Filed Aug. 4, 1948     26 Sheets-Sheet 15
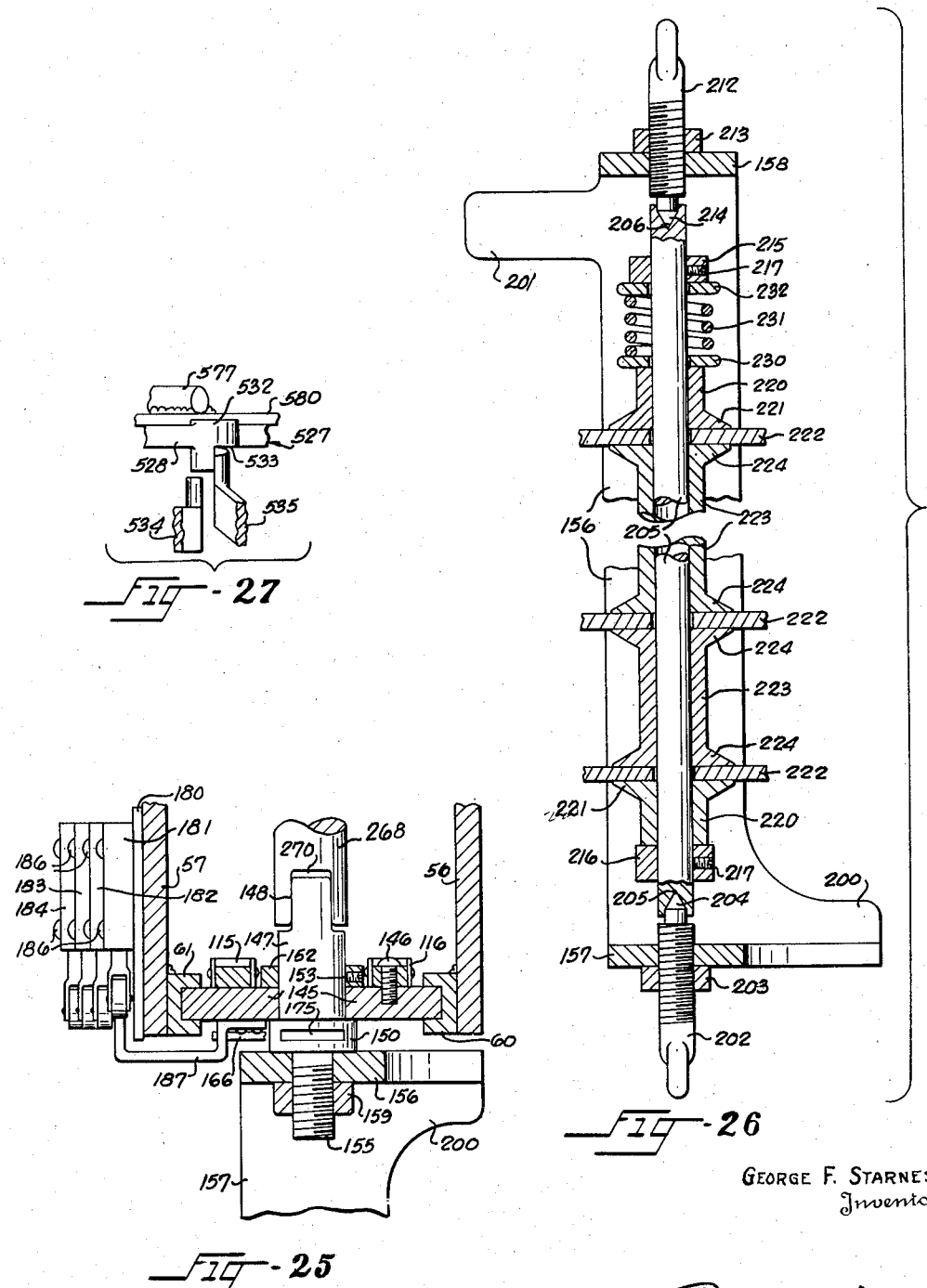
GEORGE F. STARNES,
Inventor.
By
Attorney Nov. 13, 1951 G. F. STARNES 2,574,598
CHECK CONTROLLED PHONOGRAPH
Filed Aug. 4, 1948 26 Sheets-Sheet 16
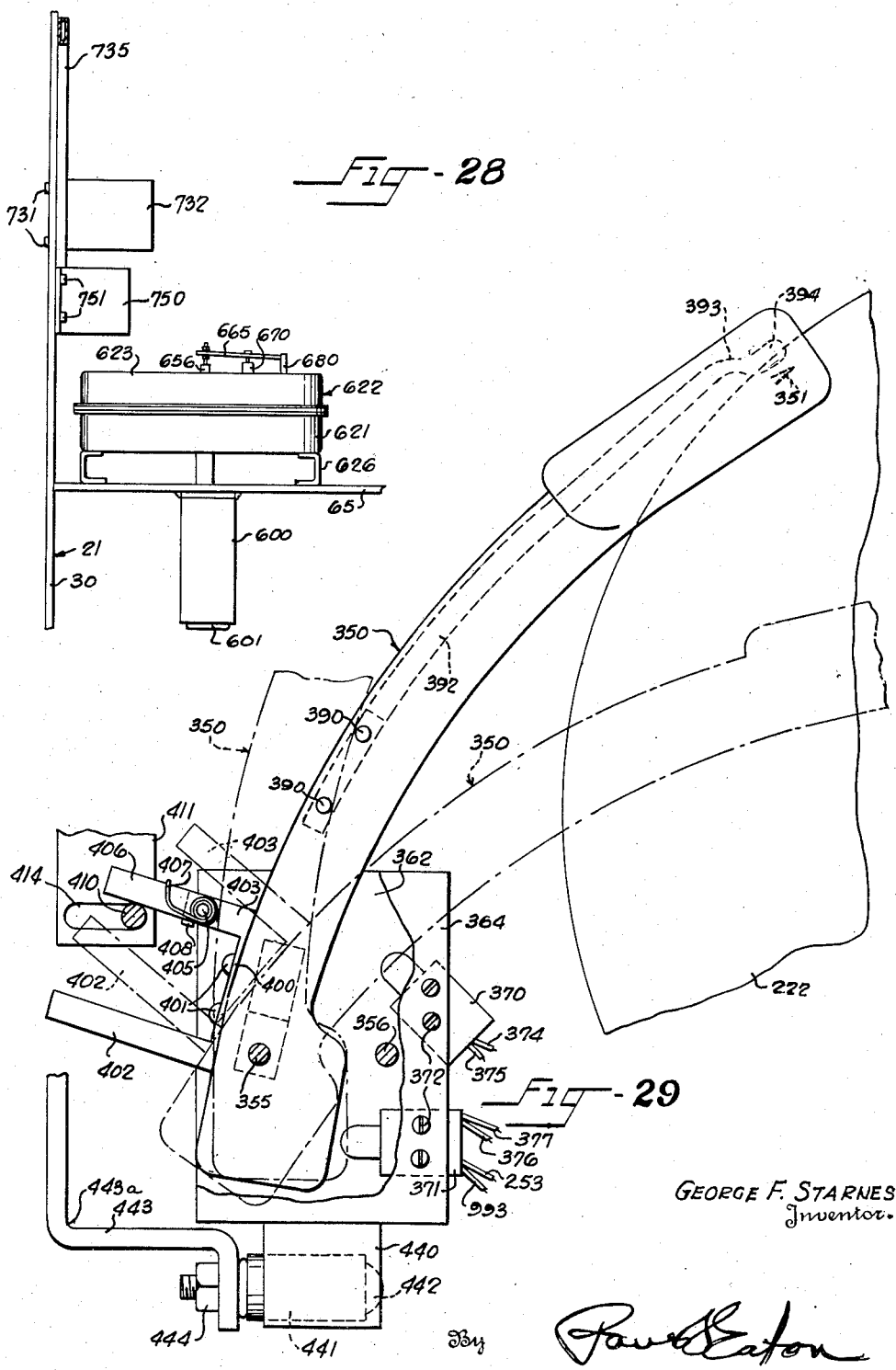
GEORGE F. STARNES,
Inventor.

Nov. 13, 1951   G. F. STARNES   2,574,598
CHECK CONTROLLED PHONOGRAPH
Filed Aug. 4, 1948   26 Sheets-Sheet 17

GEORGE F. STARNES,
Inventor

By Paul A. Eaton
Attorney

Nov. 13, 1951   G. F. STARNES   2,574,598
CHECK CONTROLLED PHONOGRAPH
Filed Aug. 4, 1948   26 Sheets—Sheet 18
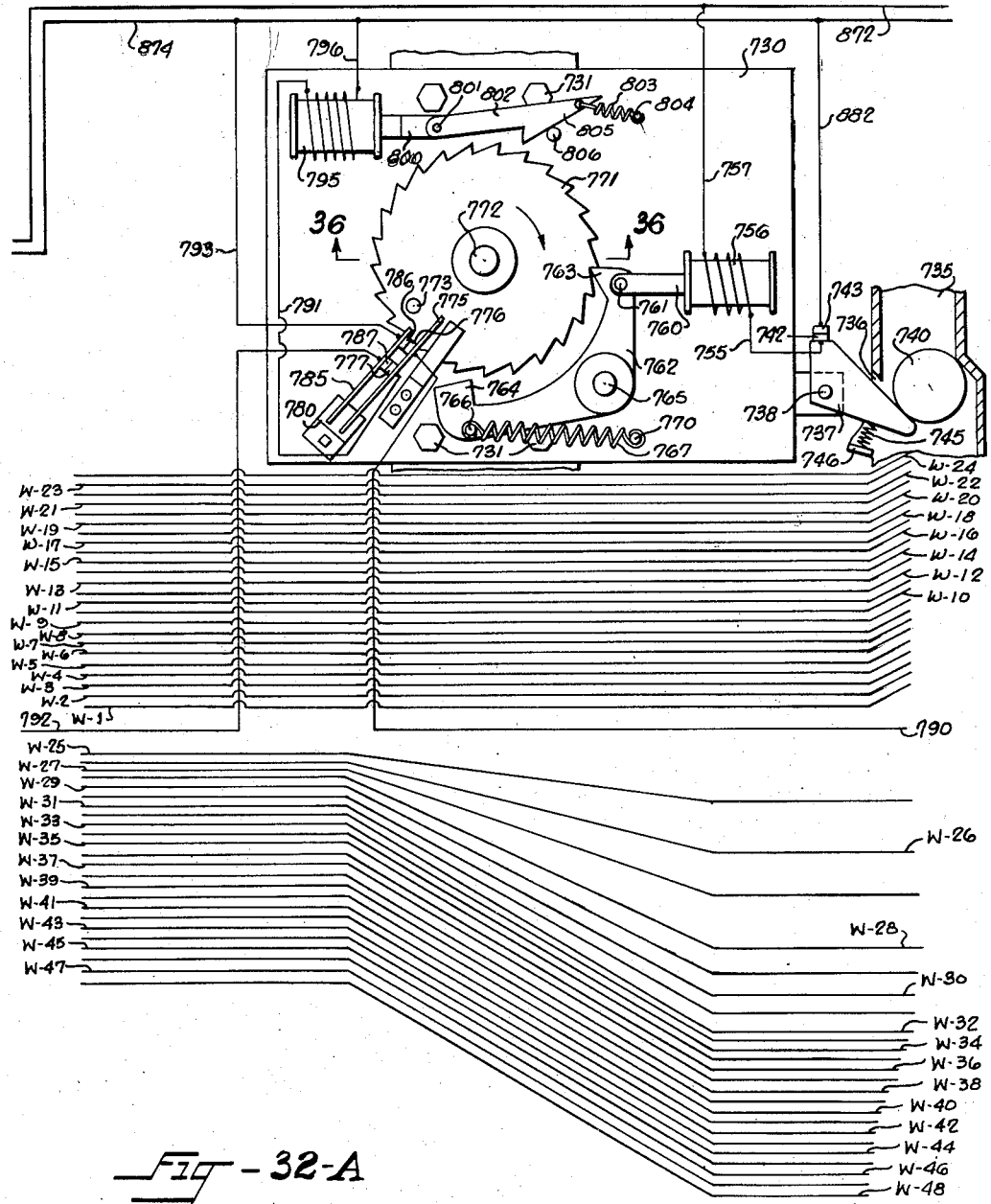
FIG-32-A
GEORGE F. STARNES,
Inventor.

Nov. 13, 1951          G. F. STARNES          2,574,598
              CHECK CONTROLLED PHONOGRAPH
Filed Aug. 4, 1948                    26 Sheets-Sheet 19
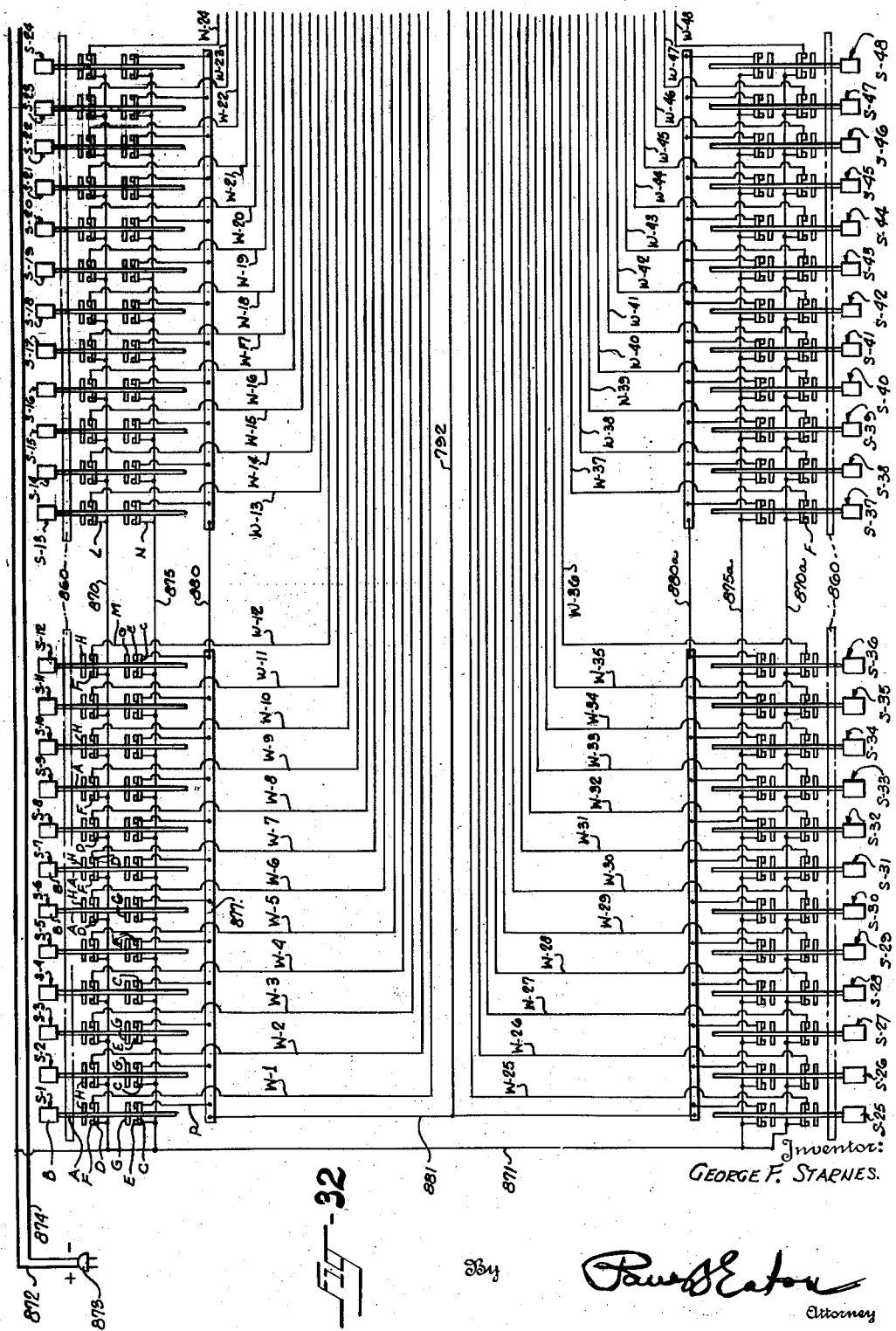
Inventor:
GEORGE F. STARNES.

Nov. 13, 1951  G. F. STARNES  2,574,598
CHECK CONTROLLED PHONOGRAPH
Filed Aug. 4, 1948  26 Sheets-Sheet 20

Fig. 32-B

George F. Starnes,
Inventor.

Nov. 13, 1951  G. F. STARNES  2,574,598
CHECK CONTROLLED PHONOGRAPH
Filed Aug. 4, 1948  26 Sheets-Sheet 21

GEORGE F. STARNES,
Inventor.
By Paul Eaton
Attorney

Nov. 13, 1951  G. F. STARNES  2,574,598
CHECK CONTROLLED PHONOGRAPH
Filed Aug. 4, 1948  26 Sheets-Sheet 22
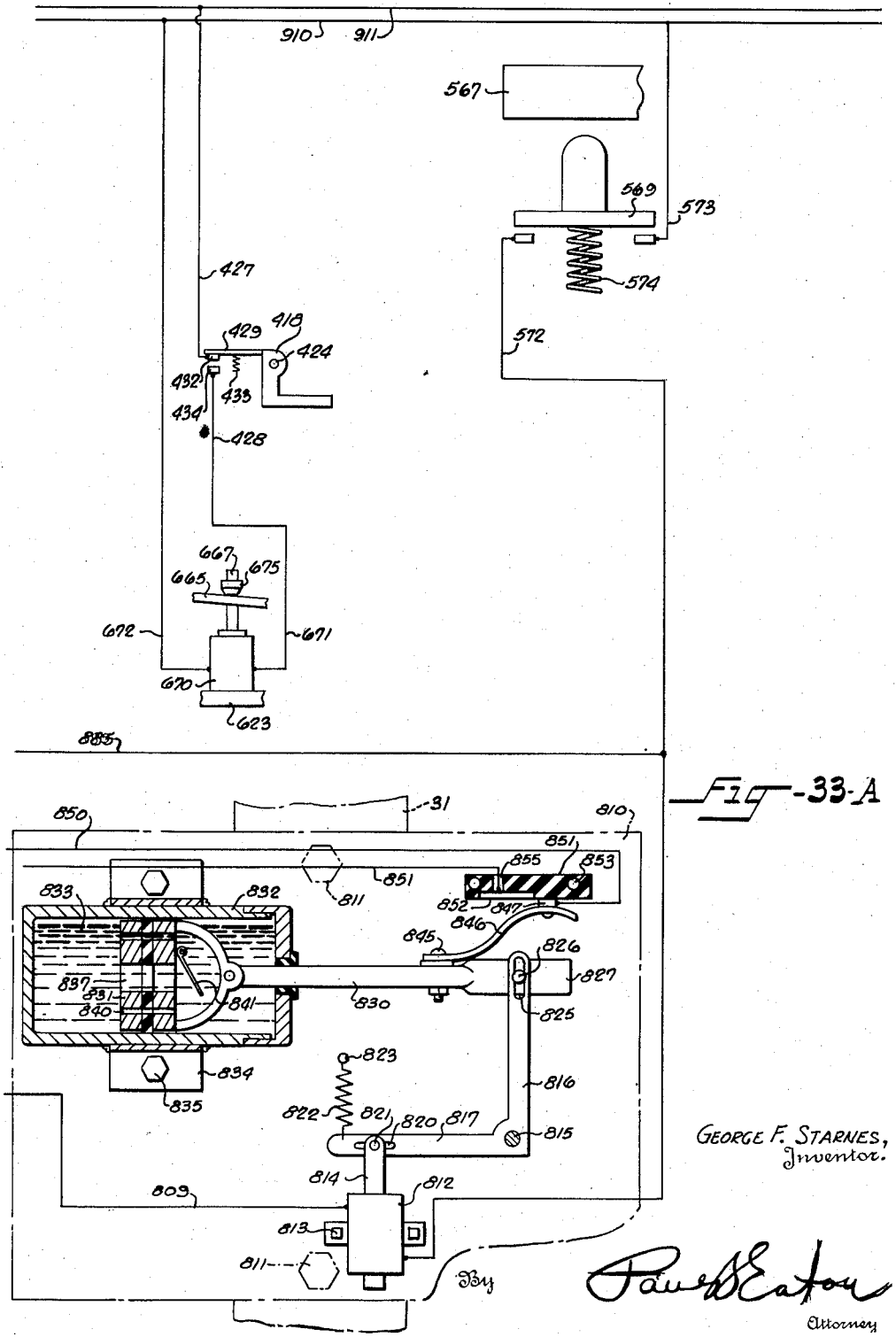

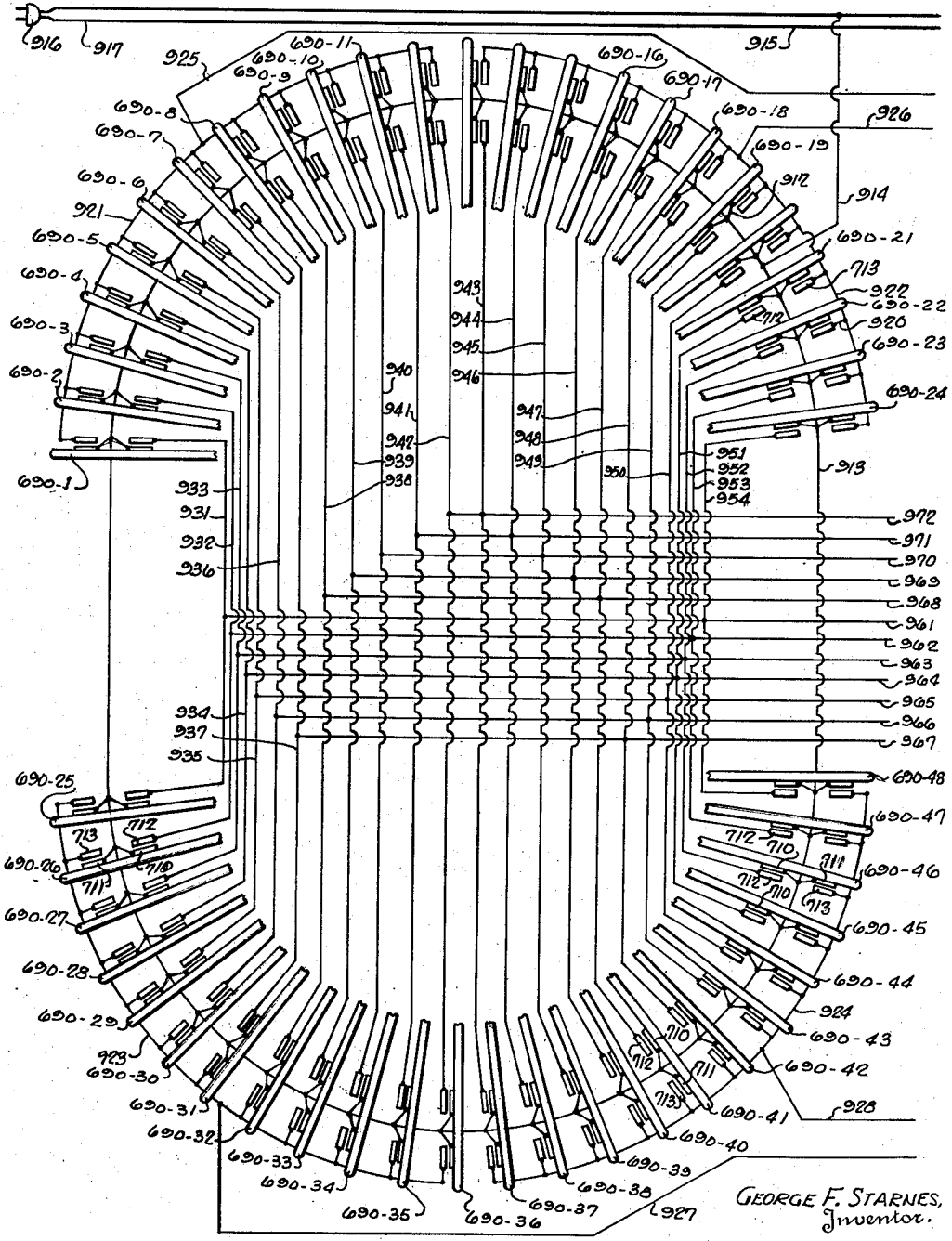

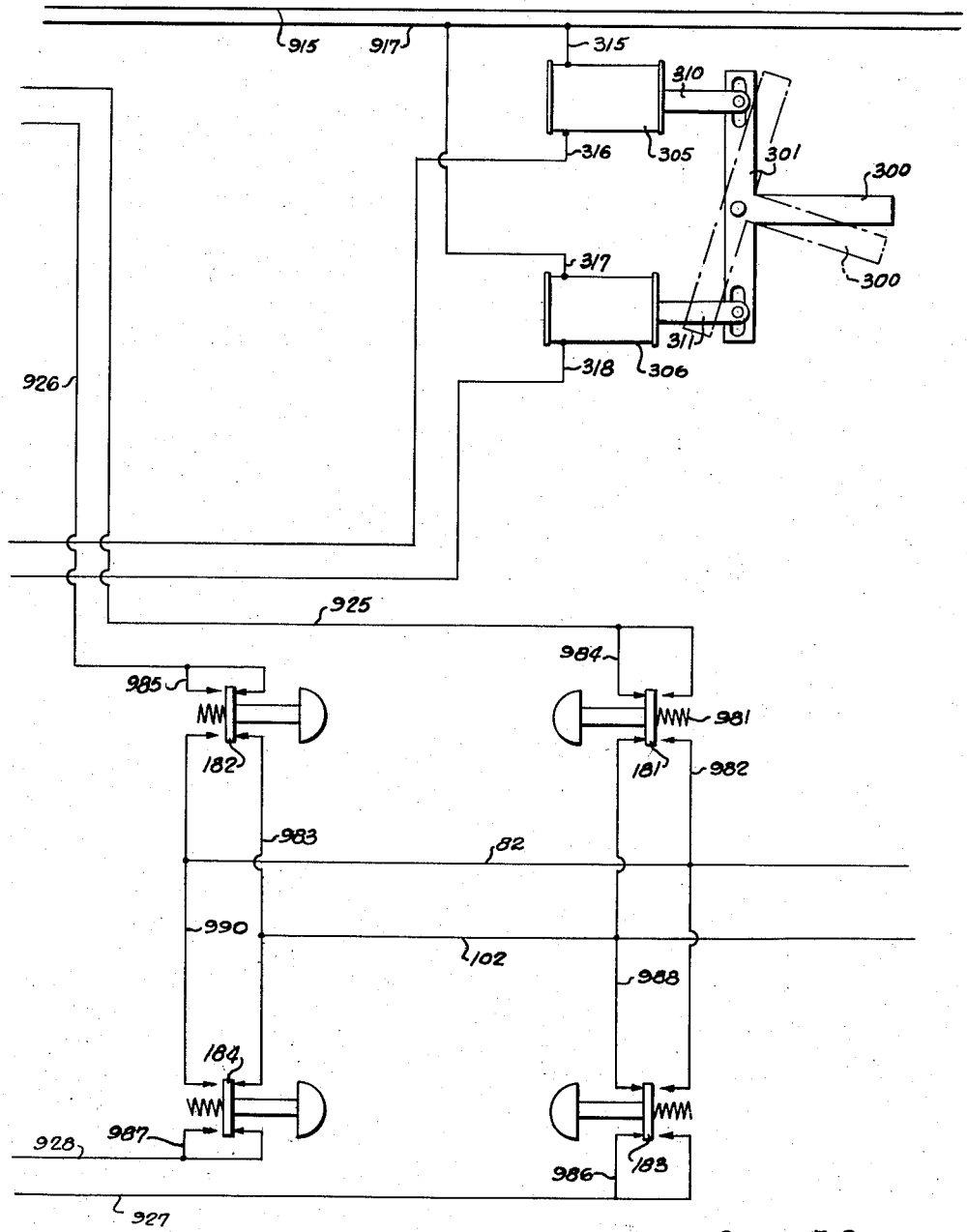
Fig-34-B

Nov. 13, 1951 G. F. STARNES 2,574,598
CHECK CONTROLLED PHONOGRAPH
Filed Aug. 4, 1948 26 Sheets-Sheet 25
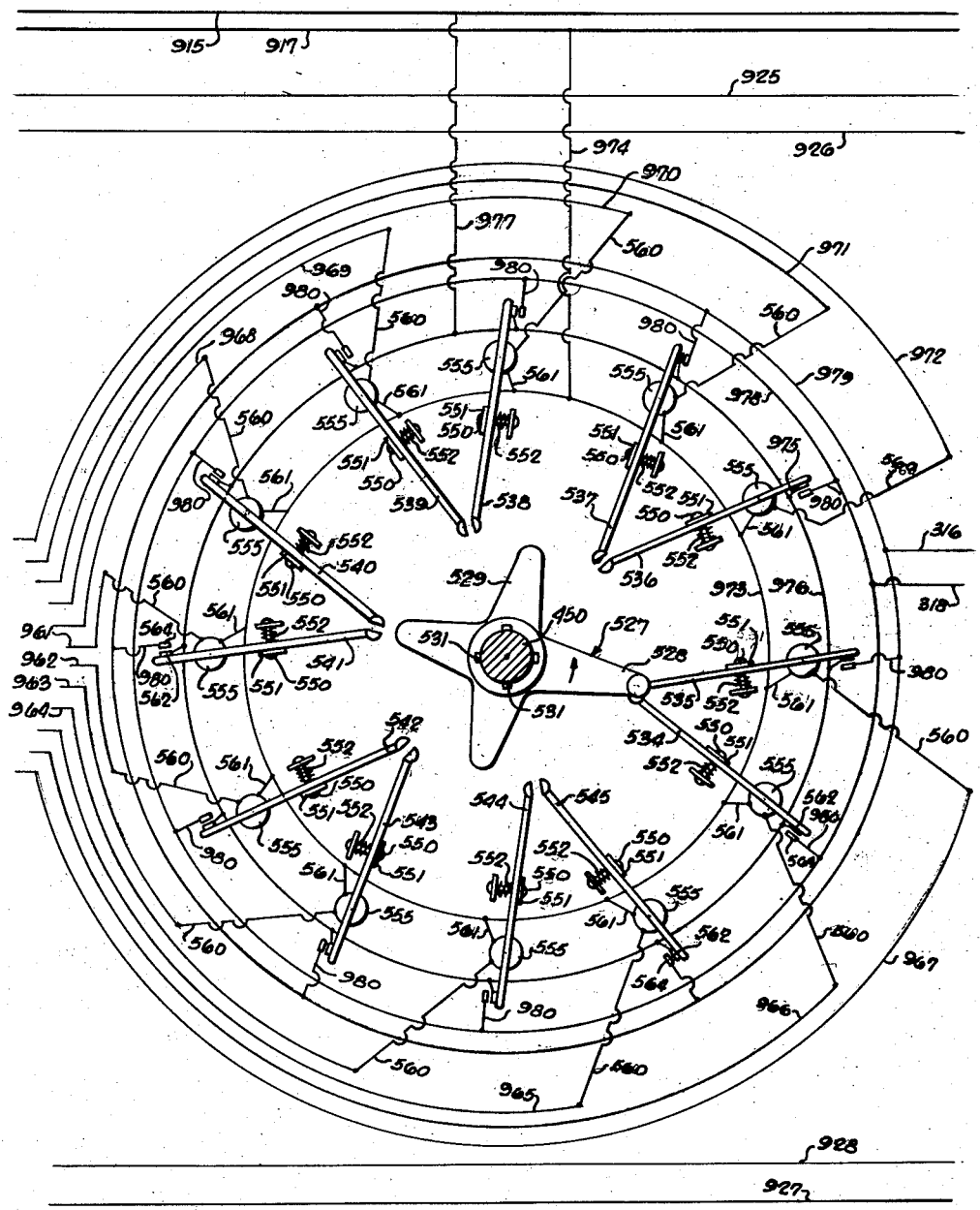
FIG-34-A
GEORGE F. STARNES, Inventor.
By Paul B. Eaton
Attorney Nov. 13, 1951  G. F. STARNES  2,574,598
CHECK CONTROLLED PHONOGRAPH
Filed Aug. 4, 1948  26 Sheets-Sheet 26
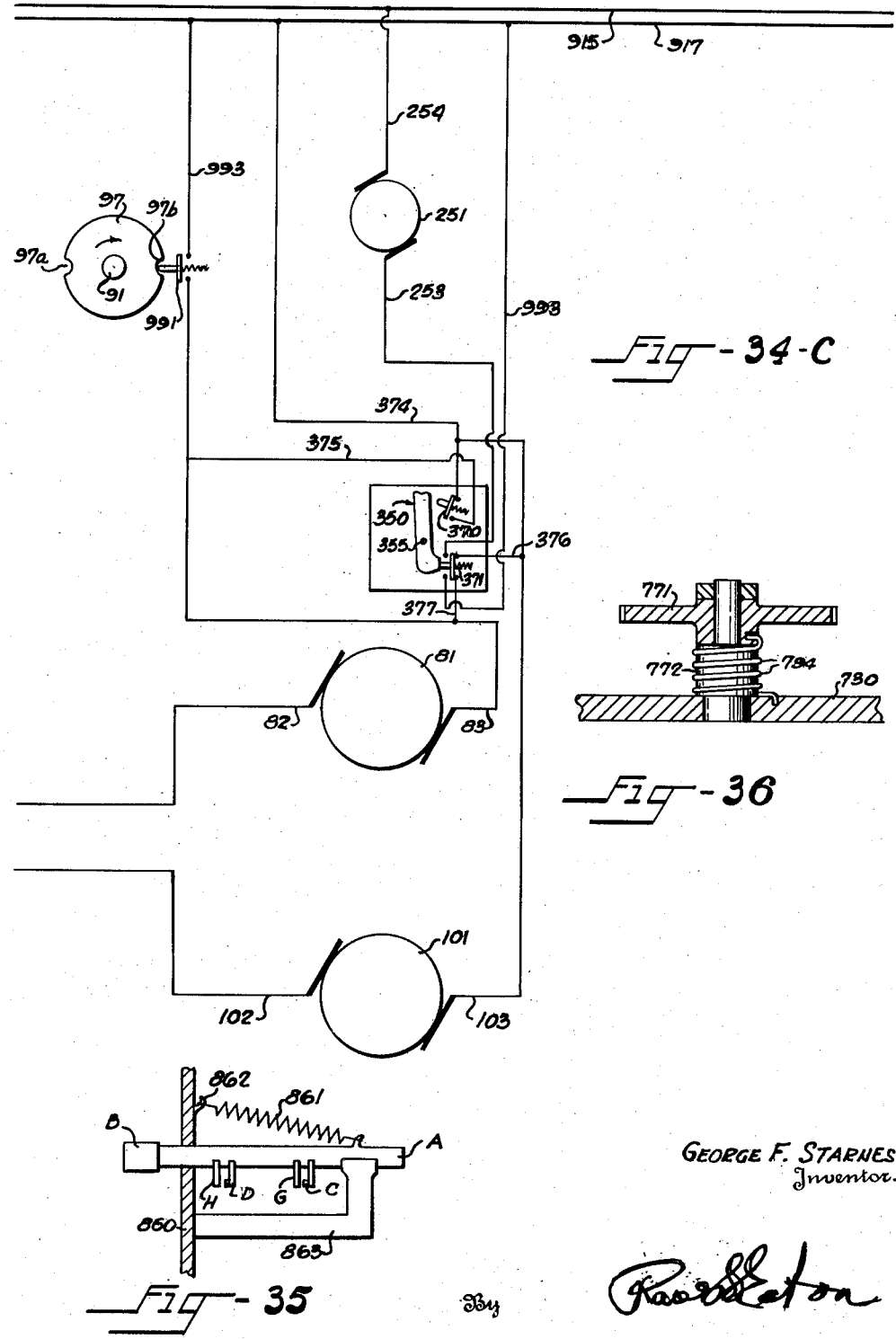
GEORGE F. STARNES,
Inventor.

Patented Nov. 13, 1951

2,574,598

UNITED STATES PATENT OFFICE 2,574,598

CHECK CONTROLLED PHONOGRAPH

George F. Starnes, Hickory, N. C., assignor to Paul B. Eaton, Charlotte, N. C.

Application August 4, 1948, Serial No. 42,431

7 Claims. (Cl. 274—10)

This invention relates to an automatic phonograph record selector mechanism of a type such as may be enclosed within a cabinet and which may be controlled from the outside of the cabinet by means of a coin feed mechanism and selector buttons.

The primary object of this invention is to provide a phonograph record selector mechanism having a rotatable magazine therein in which a plurality of records may be mounted and whereby a tone arm may engage one of the surfaces of each of the records, and when so desired, the rotatable magazine may be automatically rotated 180 degrees from its original position to permit the tone arm of the phonograph to engage the other surface of the records.

It is another object of this invention to provide a plurality of magazines of the type heretofore described, and selection means whereby anyone of the desired magazines may be moved into position so that the desired record may be engaged by the tone arm of the phonograph.

It is still another object of this invention to provide an electrically operated tone arm having a connection between the same and a plurality of manually controlled selector buttons to thereby cause the tone arm of the phonograph to engage anyone of a plurality of superposed records, as desired, these records being disposed within a rotatable magazine so that both sides of the record may be engaged independently by the tone arm.

It is still another object of this invention to provide a phonograph record selector mechanism comprising a plurality of magazines in each of which a plurality of records is rotatably mounted, and an electrically operated selector mechanism associated therewith, having manually controlled buttons whereby either side of any one of the records disposed within any one of the magazines may be moved into operating position, depending upon the particular selector button that has been manually engaged and depressed to where the desired record surface would be engaged by the tone arm of the phonograph.

It is a further object of this invention to provide an accumulator mechanism to be associated with this invention which is adapted to cooperate with the record holding means in such a manner that a plurality of the buttons may be depressed while any one of the records is being played and the accumulator will complete a circuit to the magazines automatically after each record is played until all of the selections that have been accumulated in the accumulator have been played.

It is still another object of this invention to provide a credit ratchet mechanism which is associated with the selector buttons and the accumulator of this phonograph record player and which is adapted to be actuated by a coin so that a number of coins may be inserted in the machine to actuate the credit ratchet so the accumulator mechanism may be actuated by depressing a number of the selector buttons equivalent to the number of coins inserted in the machine.

It is another object of this invention to provide a resilient roller which is adapted to engage the lowermost of the records disposed in the magazine rack while it is in operating position, regardless of which end of the rack is in the lowermost position, to thus transmit rotation to the records disposed within the rack.

Some of the objects of the invention having been stated, other objects will appear as the description proceeds, when taken in connection with the accompanying drawings, in which:

Figure 4 is an elevation looking from the left-hand side of Figure 2 to the right;

Figure 5 is a front elevation of the upper portion of the record selective apparatus looking up at the lower side of Figure 2;

Figure 6 is a rear elevation of the upper portion of the record selective apparatus showing the opposite side from that shown in Figure 5;

Figure 7 is an enlarged elevation with parts in section of the upper central portion of Figure 3 and being taken along the line 7—7 in Figure 6;

Figure 8 is an isometric view of the framework on which the record changing apparatus is mounted;

Figure 9 is a vertical sectional view taken along the line 9—9 in Figure 4 and showing the accumulator mechanism associated with this apparatus;

Figure 10 is an enlarged plan view with parts in section and being taken substantially along the line 10—10 in Figure 5 and showing the spiral selector mechanism;

Figure 11 is a vertical sectional view through the spiral selector mechanism and is taken substantially along the line 11—11 in Figure 10;

Figure 12 is an enlarged elevation, with parts in section, of the spiral drum raising means and being taken substantially along the line 12—12 in Figure 6;

Figure 13 is an enlarged sectional plan view taken along the line 13—13 in Figure 12;

Figure 14 is a vertical sectional view taken substantially along the line 14—14 in Figure 13;

Figure 15 is a top plan view with parts broken away, and being partly in section, and is taken substantially along the line 15—15 in Figure 11;

Figure 16 is an enlarged elevation with parts in section and is taken along the line 16—16 in Figure 6;

Figure 17 is an elevation taken along the line 17—17 in Figure 16;

Figure 18 is an elevation taken substantially along the line 18—18 in Figure 7;

Figure 19 is a vertical sectional view taken substantially along the line 19—19 in Figure 7 and showing the parts in a neutral position;

Figure 20 is an enlarged elevation with parts in section and being taken along the line 20—20 in Figure 7;

Figure 25 is a sectional plan view taken along the line 25—25 in Figure 20;

Figure 26 is an enlarged vertical sectional view taken along the line 26—26 in Figure 3;

Figure 27 is an enlarged vertical sectional view taken substantially along the line 27—27 in Figure 11;

Figure 28 is an enlarged elevation of the credit box unit, the coin box unit and the accumulator unit and is taken along the line 28—28 in Figure 4;

Figure 29 is an enlarged top plan view of the tone arm assembly and is taken substantially along the line 29—29 in Figure 5;

Figure 32 is a partial schematic wiring diagram associated with this invention and showing the manually operated selector switch and button assemblies;

Figure 33:
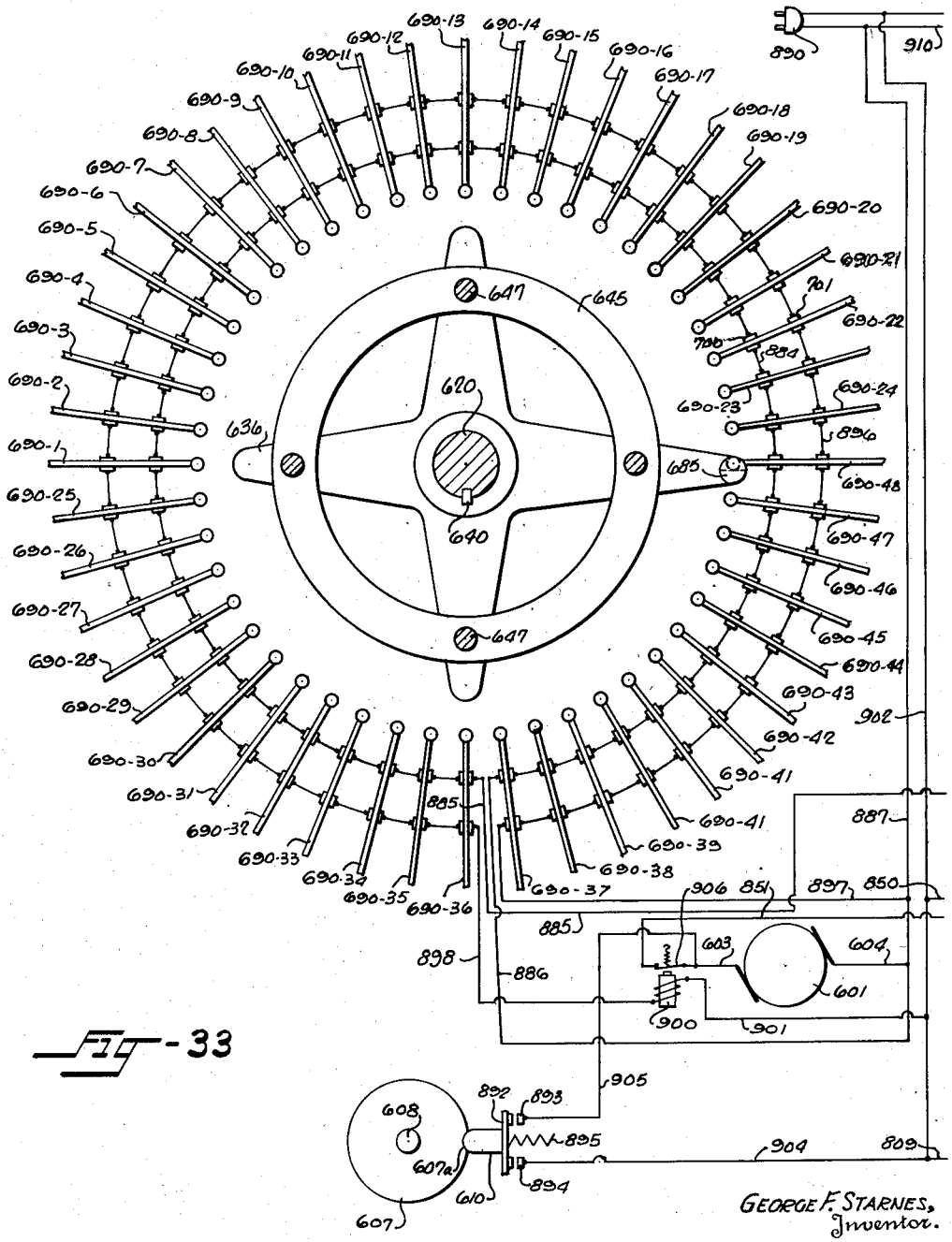

Figure 32-A is a partial schematic wiring diagram and is an extension of Figure 32 and showing the credit ratchet assembly in plan associated therewith;

Figure 32-B is a partial schematic wiring diagram and is a further extension of Figure 32 and Figure 32-A and showing a top plan view with parts in section, being taken along the line 32-B—32-B in Figure 9, but showing all of the selector arms associated with the accumulator mechanism;

Figure 33 is a partial schematic wiring diagram and is an enlarged plan view of the central portion of Figure 32-B but showing a second circuit means associated therewith;

Figure 33-A is a partial schematic wiring diagram and is an extension of Figure 33;

Figure 34 is an exploded top plan view showing the outer ends of the selector arms associated with the accumulator mechanism shown in Figure 32-B, but showing a third circuit associated therewith;

Figure 34-A is a schematic wiring diagram and is an extension of Figure 34 and showing a schematic plan view of the spiral selector mechanism and this schematic plan view is taken substantially along the line 34-A—34-A in Figure 11;

Figure 34-B is a schematic wiring diagram and is a further extension of Figures 34 and 34-A;

Figure 34-C is a schematic wiring diagram and is still another extension of Figures 34, 34-A and 34-B;

Figure 35 is a schematic elevation showing one of the selector switch and button assemblies used in the electrical circuit of this apparatus;

Figure 36 is a transverse sectional view through the credit ratchet assembly and being taken along the line 36—36 in Figure 32-A.

Figure 1:
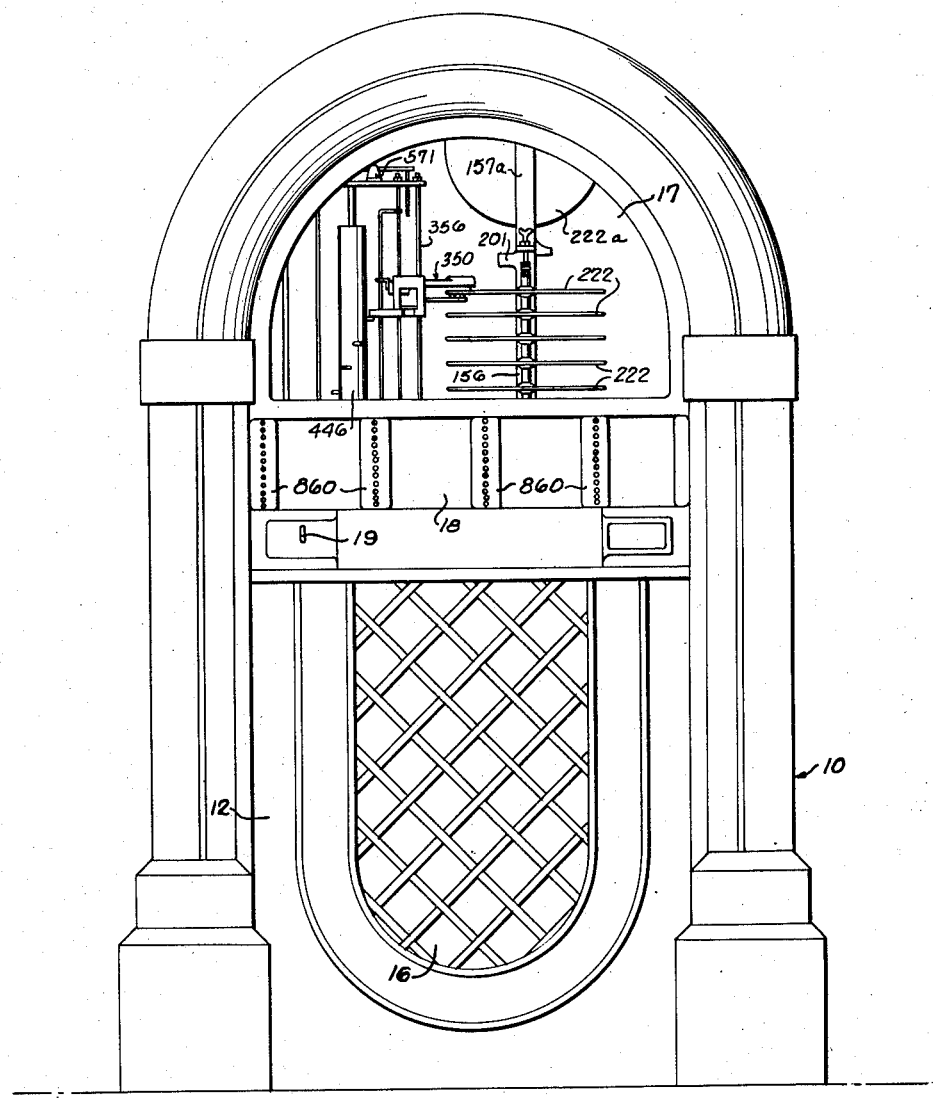
Figure 1 is a front elevation of the cabinet in which the phonograph record selective apparatus is adapted to be housed.

Referring more specifically to the drawings, the numeral 10 broadly designates a suitable cabinet (Figures 1 and 3) for housing this record selective apparatus and this cabinet has a bottom panel 11, a front panel 12 and a rear panel 13 which are connected to a substantially U-shaped top member 14 to form the side panels for the cabinet. The front panel 12 is provided with a grilled opening 16, a window 17 and a panel 18 which is penetrated by the selector buttons, to be later described, and on the inner surface of which they are mounted. The panel 18 also has a coin slot 19 therein.

Obviously, there are many types of cabinets that may be used for housing a record selective apparatus of this type and this cabinet is shown by way of illustration only.

Figure 3:
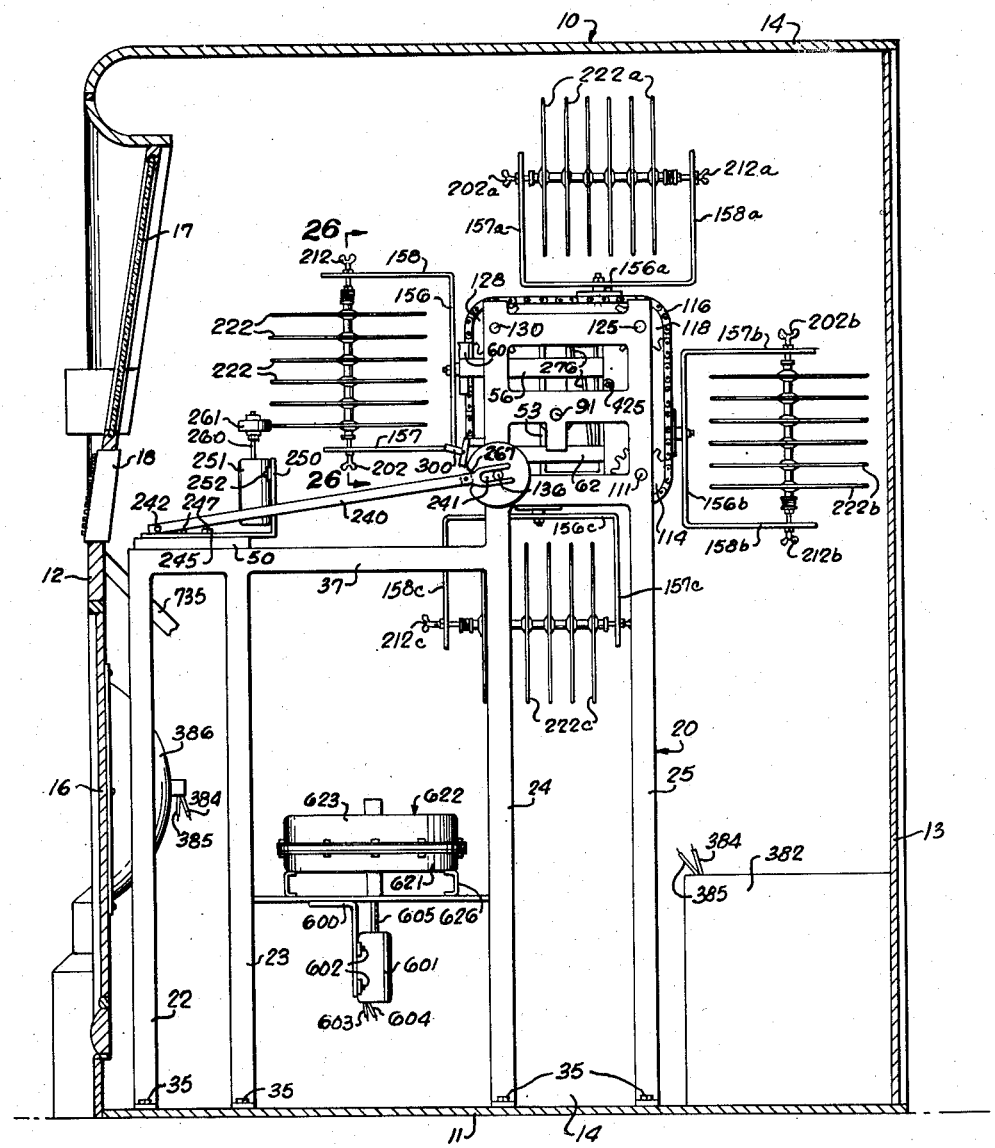
Figure 3 is an elevation looking at the right-hand side of Figure 2 but showing the record selective apparatus disposed within the cabinet and showing the cabinet in cross-section.

Secured as by screws 35 on the bottom panel 11 of the cabinet 10 is a cast right-hand frame member 20 and a cast left-hand side frame member 21. The right-hand member has spaced vertical legs 22, 23, 24 and 25 and the left-hand side frame member 21 has similar spaced vertical legs 27, 30, 31 and 32 (Figures 3 and 8).

The upper ends of the vertical legs 22 and 23, in Figure 8, are connected to a horizontal bar 37 which extends rearwardly beyond the upper end of the leg 23 and is connected to a medial portion of the leg 24.

The vertical legs 24 and 25 of the vertical side frame member 20 are joined together at their upper ends by a horizontally disposed bar 38 and disposed below the bar 38 are parallel spaced bars 40 and 41 which are integral at each end thereof with the vertical legs 24 and 25. The vertical legs 27 and 30 of the vertical side frame member 21 are joined together at their upper ends by a rearwardly extending bar 45, the rear end of which is connected to a medial portion of the vertical leg 31 and the vertical legs 31 and 32 are joined together at their upper ends by a horizontally disposed bar 46. The bar 46 has bars 47 and 48 spaced therebelow which are connected at their opposite ends to the vertical bars 31 and 32.

The front upper ends of the vertical side frame members 20 and 21, in Figure 8, are welded to opposite sides of a horizontally disposed plate 50 and welded to the lower surface of this plate 50 and extending rearwardly therefrom is a horizontally disposed plate 51 which is welded at its outer edge to the vertical side frame member 21 flush with the upper surface of the horizontal bar 45.

Spanning the distance between the bars 41 and 48 of the vertical side frame members 20 and 21, respectively, is a horizontally disposed plate 52 (Figures 2, 5, 6, 7 and 8) which has welded to the upper surface thereof a U-shaped plate member 53 having horizontally disposed arms 56 and 57 extending forwardly therefrom at each side thereof. These arms 56 and 57 have flared guide members 60 and 61, respectively, welded on the forward ends thereof, the purpose of which will be later described.

Welded to the right-hand side of the U-shaped member 53, in Figure 8, and extending forwardly therefrom is a horizontally disposed bar 62 having a small vertically disposed plate 63 welded on the forward end thereof. Welded to a medial portion of the vertical legs 23 and 24 and 30 and 31, and spanning the distance therebetween, is a horizontally disposed plate 65 on which the accumulator mechanism, to be later described, is mounted (Figures 3, 4, 8, 9 and 28). Welded intermediate the ends of the horizontal bar 45 of the left-hand vertical side frame member 21 is the lower end of an inverted L-shaped strap iron member 67 which has welded adjacent the lower end thereof and projecting inwardly therefrom a plate 70 and this plate 70, as well as the inverted L-shaped member 67, are adapted to support the tone arm mechanism to be later described (Figures 8 and 29).

Mounted on the upper surface of the horizontally disposed plate 52 is an electric motor 81 (Figures 2 and 6) having electric wires 82 and 83 leading therefrom which are a part of an electrical circuit to be later described. This electric motor 81 has a shaft 85 extending therefrom on which a sprocket wheel 86 is mounted. The sprocket wheel 86 has a sprocket chain 87 mounted thereon, which extends upwardly and is mounted on a sprocket wheel 90. The sprocket wheel 90 is fixedly mounted on a transverse driven shaft 91 rotatably mounted in the horizontally disposed bars 46 and 47 in the vertical side frame members 20 and 21, respectively.

This cam shaft 91 has cam wheels 92, 93, 94, 95, 96 and 97 fixedly mounted thereon, the purposes of which will be later described.

Secured on the lower surface of the horizontally disposed plate 52, by any suitable means such as screws 100, is a second electric motor 101 (Figure 6) having electric wires 102 and 103 (Figures 6 and 34-C) which are also a part of an electrical circuit to be later described. The electric motor 101 has a shaft 104 extending from the same on which is fixedly mounted a sprocket wheel 105 having a sprocket chain 107 (Figures 2 and 6) mounted thereon which extends upwardly and is mounted at its other end on a sprocket wheel 110 fixedly mounted on a transverse magazine conveyor drive shaft 111 (Figures 3, 4, 6 and 7). The magazine conveyor drive shaft 111 is rotatably mounted at each end thereof in the vertical legs 25 and 32 of the vertical side frame members 20 and 21, respectively (Figures 3, 4, 6 and 8).

Figure 2:
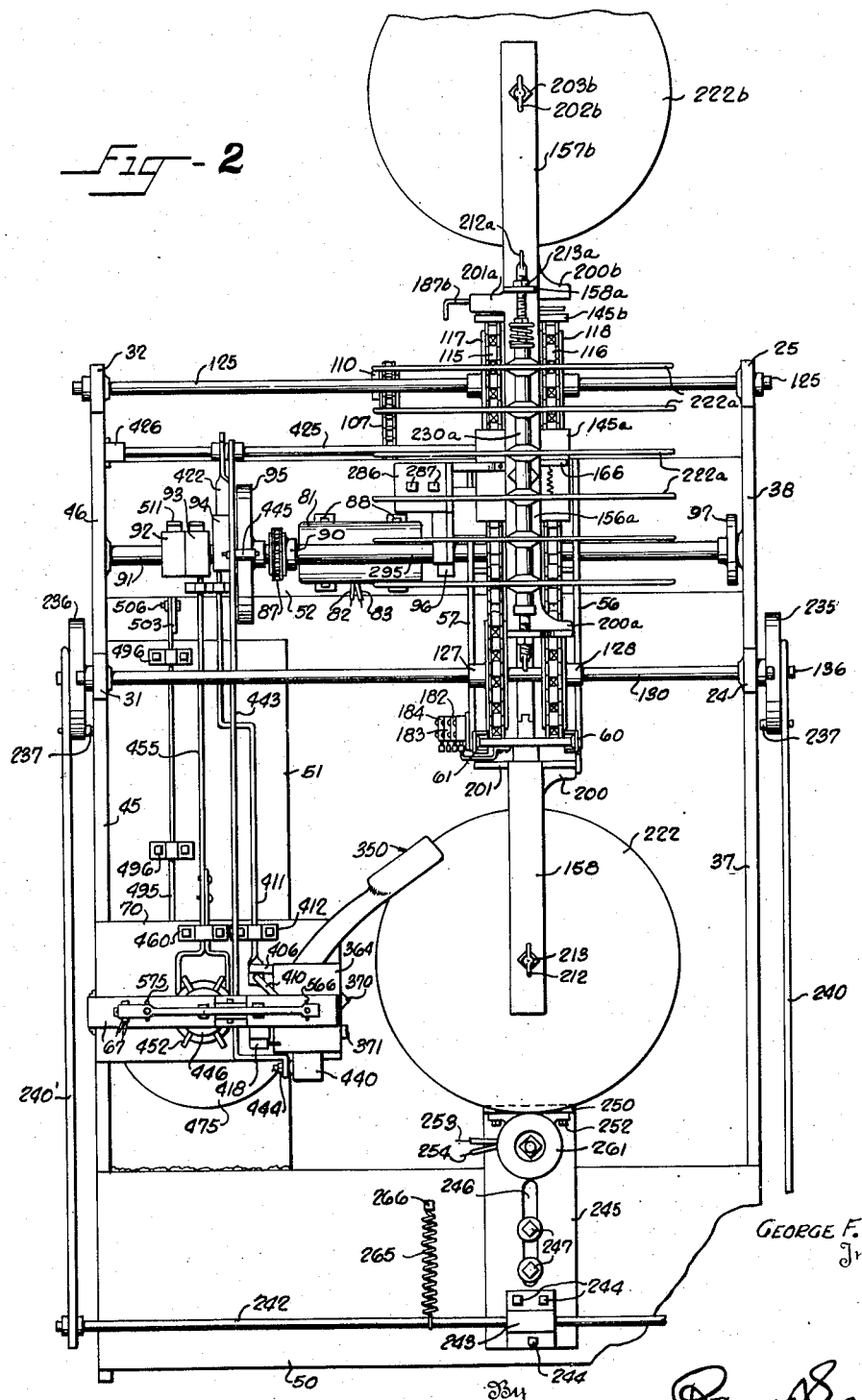
Figure 2 is an enlarged top plan view of the phonograph record selective apparatus as it is removed from the cabinet shown in Figure 1.

The transverse magazine conveyor drive shaft 111 has spaced sprocket wheels 113 and 114 fixedly mounted thereon which are engaged by endless conveyor sprocket chains 115 and 116 respectively. These sprocket chains 115 and 116 project upwardly in Figure 6 from the sprocket wheels 113 and 114 and are mounted on sprocket wheels 117 and 118 respectively, which are fixedly mounted on a transverse idler shaft, rotatably mounted in the upper ends of the vertical legs 25 and 32 of the vertical side frame members 20 and 21 respectively (Figures 2 and 6).

The sprocket chains 115 and 116 then extend forwardly from the sprocket wheels 117 and 118 and are mounted on sprocket wheels 127 and 128, respectively, which are fixedly mounted on a second idler shaft 130 (Figures 2, 5 and 7) and this shaft 130 is rotatably mounted at each end thereof in the upper ends of the vertical legs 24 and 31 of the vertical side frame members 20 and 21 respectively. The sprocket chains 115 and 116 extend downwardly from the sprocket wheels 127 and 128 and engage sprocket wheels 133 and 134 which are fixedly mounted on a third idler shaft 136 (Figures 5 and 7) and the sprocket chains 115 and 116 then extend rearwardly to the sprocket wheels 113 and 114. The sprocket chains 115 and 116 heretofore described are what are known as block chains and which are provided as a means for mounting the magazines to be presently described. However, by slight modifications to the magazines to be presently described, it is obvious that any desired type of sprocket chain may be used with this apparatus.

Secured, as by screws 146, to certain of the solid links of the sprocket block chains 115 and 116 and spaced equal distances apart from each other along the length of the sprocket chains 115 and 116, are magazine positioning guide blocks 145, 145a, 145b and 145c. The blocks 145, 145a, 145b and 145c are slidably penetrated by magazine supporting stub shafts 147, 147a, 147b and 147c respectively. Only the parts associated with the guide block 145 will be described and all of the parts associated with the magazine guide blocks 145a, 145b, and 145c being identical, the same reference characters will apply to the parts associated with the guide blocks 145a, 145b and 145c as apply to the parts associated with the guide block 145, with the corresponding letters a, b and c affixed thereto.

By referring to Figure 25 it may be observed that the shaft 147 has a tongue 148 at one end thereof and has an enlarged annular portion 150 integral therewith which forms a shoulder which engages the outer surface of the magazine positioning guide block 145. This shaft 147 has a collar 152 secured thereon by a set screw 153. It is thus seen that the shafts 147, 147a, 147b and 147c may have oscillatory motion in the blocks 145a, 145, 145b and 145c, but they are prevented from having endwise movement in the blocks 145, 145a, 145b and 145c by the annular portion 150 and the collar 152.

The shaft 147 has a restricted threaded portion 155 integral therewith which slidably penetrates a strap iron magazine rack 156 having outwardly bent arms 157 and 158 integral therewith. The rack 156 is secured on the same by means of a nut 159.

By referring to Figure 20 it may be observed that the positioning block 145 has pivotally mounted thereon, as at 165, a latch bar 166 which has the upper end of a tension spring 167 mounted adjacent its free end and this tension spring 167 extends downwardly and its other end is connected to a spring perch 170 extending from the block 145. The flanged guide member 60, in Figure 20, has a pin 172 extending outwardly therefrom which is adapted to be engaged by the other end of the latch 166 as the guide block 145 moves downwardly between the flanged guide members 60 and 61. The annular portion 150 of the shaft 147 has a groove 175 therein which is adapted to be engaged by the latch 166 and as the block 145 moves downwardly in Figure 20 between the guide members 60 and 61, the outer free end of the latch 166 engages the pin 172 in the guide member 60 to thus raise the latch 166 out of engagement with the notch 175 in the shaft 147. This will permit oscillation of the shaft 147 by means to be later described, within the block 145, and when the sprocket chains 115 and 116 are caused to move the block 145 downwardly from the position shown in Figure 20 and out of engagement with the guide members 60 and 61, the free end of the lever 166 will move upwardly until it is permitted to slip by the pin 172 in the guide member 60, at which time the latch 166 will be urged downwardly, by the tension spring 167, into engagement with the groove 175 in the shaft 147.

It may be observed in Figure 20 that the horizontally disposed arm 57 has a narrow vertically disposed plate 180 welded thereto and this plate 180 has secured thereon, by any suitable means such as screws 186 (Figure 25), suitable microswitches 181, 182, 183 and 184, all of which are spaced apart from each other.

It may be observed in Figures 20 and 25 that the micro-switches 181 to 184 inclusive are staggered outwardly with respect to each other and when the positioning block 145 is disposed within the guide members 60 and 61, as shown in Figure 20, the micro-switch 181 is engaged by an actuating arm 187 which is bent to pass by the flared guide member 61 and is secured, as by rivets 188, to the positioning block 145.

Now, as the succeeding blocks 145a, 145b and 145c are moved into position between the flared guide members 60 and 61, the arms 187a, 187b and 187c are adapted to engage the microswitches 182, 183 and 184, respectively, and these micro-switches 181, 182, 183 and 184 have electric wires extending from the same which will be later described.

Referring to Figures 2, 5, 6, and 26, it may be observed that the magazine rack 156 has oppositely directed ears 200 and 201 projecting outwardly therefrom adjacent the juncture of the bent arms 157 and 158, respectively, and the main portion of the magazine rack 156. It will be noted that the distance from the ear 201 to the shaft 147 in the magazine is substantially greater than the distance from the outwardly projecting ear 201 to the shaft 147. The purpose of this arrangement will be later described.

The outwardly bent arm 157 is threadably penetrated by a thumb screw 202 which is locked therein by a lock nut 203 and the upper end of this thumb screw, as observed in Figure 26, is tapered as at 204 to form a bearing surface for one end of a shaft or spindle 205 having tapered holes 206 in each end thereof. The outwardly bent arm 158 of the magazine rack 156 is threadably penetrated by a thumb screw 212 (Figure 26) which is identical to the thumb screw 202 and this thumb screw 212 also has a tapered portion 214 integral therewith which is adapted to engage the tapered bore 206 in the outer end of the shaft 205. This thumb screw 212 is also locked in engagement with the arm 158, by a lock nut 213. It is thus seen that by turning either one of the adjustment screws 202 or 212 outwardly away from engagement with the opposite ends of the shaft 205, the shaft 205 may be easily removed from the magazine rack 156.

The shaft 205 has a plurality of spacers 223 loosely mounted thereon between the remote ends of each of which a phonograph record 222 is mounted. The records 222 are also loosely penetrated by the shaft 205. The spacers 223 have enlarged tapering annular portions 224 integral therewith to thereby provide a larger surface area for support of each of the records 222 disposed therebetween. The shaft 205 has collars 215 and 216 secured thereon and disposed adjacent opposite ends thereof.

Engaging the remote surfaces of the two remotely disposed records 222 are half spacers 220 having enlarged tapering annular portions 221 which are similar to the enlarged annular portions 224 of the spacers 223. The lowermost half spacer 220, as observed in Figure 26, is adapted to engage the upper surface of the collar 216 and the uppermost of the half spacers is adapted to engage the lower surface of a washer 230 which is also loosely mounted on the shaft 205 and the upper surface of which is engaged by the lower end of a compression spring 231, the other end of which engages a washer 232, which is identical to the washer 230, and the upper surface of which engages the lower surface of the collar 215. It is thus seen that the records 222 on the shaft 205 and the spacers 223 are urged downwardly towards the collar 216 in Figure 26, by the compression spring 231, to thus insure that all of the records 222 will be positioned in the same manner regardless of how often the records 222 are removed from the shaft 205, as long as the collar 216 remains fixed to the shaft 205. It is thus seen that when rotation is imparted to one of the records 222, in a manner to be presently described, all of the records 222 in that particular magazine will be caused to rotate.

By referring to Figures 3 and 5 it may be observed that the idler shaft 136 on which the sprocket wheels 133 and 134 are mounted extends outwardly beyond the vertical legs 24 and 31 and has fixedly mounted thereon cam wheels 235 and 236 which are adapted to be engaged by cam followers 237 and 237' respectively. Both of the cam followers 237 and 237' and associated parts being identical, like reference characters will apply to the parts on the left-hand side in Figure 5 as apply to the parts on the right-hand side but with the prime notation added.

The cam followers 237 and 237' are rotatably mounted on studs 238 and 238' secured adjacent the front ends of forwardly projecting arms 240 and 240' (Figures 2 to 6 inclusive). The arms 240 are forked at their rear ends as at 241 and 241', respectively, and these forked portions 241 and 241' are adapted to slidably engage the opposed ends of the shaft 136 to thus hold the cam followers 237 and 237' in alinement with the cam wheels 235 and 236, respectively. The front ends of the arms 240 and 240' are pivotally mounted on opposite ends of a transverse shaft 242 which is fixedly mounted in a bearing block 243 (Figure 5) which is secured, by any suitable means such as screws 244, to a horizontally disposed plate member 245 (Figures 2 and 5).

Referring to Figure 2 it may be observed that the plate 245 is mounted for horizontal sliding movement on the horizontally disposed plate 50 and has a slot 246 extending longitudinally thereof which is penetrated by shoulder screws 247 threadably imbedded in the plate 50. This plate 245 has integral therewith a vertically disposed plate portion 250 on which an electric spindle motor 251 (Figures 2, 3, and 5) is secured, by any suitable means such as screws 252. The electric spindle motor 251 has electric wires 253 and 254 (Figure 2) extending therefrom which are also a part of an electrical circuit to be later described.

The spindle motor 251 has a spindle shaft 260 extending upwardly therefrom (Figure 3) which has slidably mounted thereon a resilient roller 261 which is secured on the spindle shaft 260 by lock nuts 262 disposed at each side of the resilient roller 261. A tension spring 265 is connected, at its front end in Figure 2, to the transverse shaft 242 and the rear end of this tension spring 265 is connected to a spring perch 266 which is mounted on the horizontally disposed plate 50.

The cam wheels 235 and 236 are each provided with a transverse groove 267 cut in the periphery thereof and it is thus seen that the tension spring 265 urges the cam followers 237 and 237' against the periphery of the cam wheels 235 and 236 whenever the cam followers 237 and 237' move into the transverse grooves 267 in the peripheries of the cam wheels 235 and 236, the resilient roller 261 in Figure 2 will be urged rearwardly to engage the lowermost of the records 222 which are mounted in the magazine rack 156 and thus the friction between the roller 261 and the lowermost record 222 will cause the shaft 205 on which the records 222 are mounted to rotate, or, in other words, all of the records in one magazine are caused to rotate simultaneously whenever the cam followers 237 and 237' are in engagement with the transverse grooves 267 in the cam wheels 235 and 236.

The tone arm, to be later described, is adapted to play only the top surfaces of the records and therefore it is necessary that the magazine racks 156 be rotated 180 degrees from the position shown in Figure 5 in the event that it is desired to play the opposite sides of the records 222.

By referring to Figures 7, 18, 19, 20, 21, 22 and 25, there may be observed the means for imparting partial rotation to the magazine racks 156. The micro-switches 181, 182, 183 and 184 in Figure 20 are caused to be actuated by the actuating arms 187, 187a, 187b and 187c as each of the respective positioning blocks 145, 145a, 145b and 145c successively move into position between the flared guide members 60 and 61 to thus open a circuit which will be later described, and this will cause the stub shaft 147 to stop in alignment with a rearwardly extending shaft 268 (Figures 7 and 25) having a slot 270 cut in the front end thereof and which is adapted to be engaged by the tongue 148 of the shaft 147. It is thus seen that when the shaft 268 is caused to partially rotate in a manner to be later described, rotation is imparted to the shaft 147 to thus partially rotate the magazine rack 156 mounted on the same.

The rearwardly extending shaft 268 is rotatably mounted in the vertical legs of the U-shaped plate 53 (Figures 7, 8, 18 and 19) disposed between the vertical legs of the U-shaped plate 53 and fixedly mounted on the shaft 268 is a sleeve 275 which serves as a spacer between the vertical legs of the U-shaped member 53 to prevent endwise movement of the shaft 68. This sleeve 275 may also be termed as an intermittently reciprocable idler shaft. A cord or cable 276 surrounds and is secured on the sleeve 275 by a set screw 277 (Figure 19) and this sleeve 275 is secured on the shaft 268 by a set screw 278 (Figure 7).

By referring to Figure 19 it may be observed that the cord 276 surrounds the sleeve 275 and one end of the same extends upwardly and has the lower end of a tension spring 280 connected thereto, the upper end of which is connected to an upper arm 281 of a channel-shaped bracket 282 which has a lower arm 283 to which the lower end of the cord 276 is connected (Figure 19). This channel-shaped bracket 282 has vertical sliding movement against a vertically disposed leg 285 of an L-shaped bracket 286 the lower end of which is secured, by any suitable means such as screws 287, to the horizontally disposed plate 62.

The channel-shaped plate 282 is held in engagement with the vertical leg 285 of the L-shaped bracket 286 by rivets 290 and this channel-shaped bracket 282 has an elongated slot 291 therein which is slidably penetrated by the rivets 290 and the rivets 290 fixedly penetrate the vertical leg 285 of the bracket 286.

The channel-shaped bracket 282 has spaced angle clips 295 and 297 welded thereto and extending forwardly therefrom and the proximate surfaces of these angle clips 295 and 297 are adapted to engage the peripheral surface of the cam wheel 96 which is fixedly mounted on the transverse shaft 91 heretofore described. It is thus seen that rotation of the cam wheel 96 will cause reciprocatory vertical motion of the channel-shaped bracket 282 and as the bracket 282 moves upwardly, the upper end of the cord 276 will be pulled upwardly to thus cause the shaft 268 to rotate in a clockwise direction as observed in Figure 19.

Conversely, provided that partial rotation of the shaft 268 is not restricted, as will be later described, the shaft 268 will be caused to rotate in a counterclockwise direction as the cord 276 is pulled downwardly by downward movement of the channel-shaped bracket 282. In the event that rotation of the shaft 268 is restricted in the manner to be later described, the opposite ends of the tension spring 280 will be stretched apart to allow the cam 96 to continue to rotate although the shaft 268 is not rotating. The purpose of this action will be later described.

It has already been described how the distance from the shaft 147, which penetrates the magazine rack 156, is greater to the outwardly bent arm 158 than it is to the outwardly bent arm 157 of the magazine rack 156.

Now, as the magazine rack 156 is in the position shown in Figure 5, that is with the outwardly extending arm 157 in the lowermost position, the ear 200, which is integral with the magazine rack 156 engages an outwardly projecting finger 300 (Figures 5 and 7) of a T-shaped bracket 301. This T-shaped bracket 301 is pivotally mounted, as at 302 (Figure 7), on the vertically disposed plate 63 and this plate 63 also has mounted thereon a pair of solenoid coils 305 and 306 having plungers 310 and 311 extending forwardly therefrom, the outer ends of which are pivotally connected to opposite ends of the T-shaped member 301. These solenoids 305 are fastened to the vertical plate 63 by a vertically disposed clamping bar 312 which is secured on the vertically disposed plate 63 by means of a screw 314. These solenoid coils 305 and 306 have electric wires 315 and 316 and 317 and 318, respectively, which extend to an electrical circuit to be later described.

When the solenoid coil 305 in Figure 7 is energized, in a manner to be later described, the plunger 310 is drawn into the solenoid coil 305 to thus cause the free end of the finger 300 of the T-shaped member 301 to be moved upwardly.

When the lower solenoid coil 306 is energized, in a manner to be later described, the solenoid plunger 311 is drawn into the solenoid coil 306, to thus partially rotate the T-shaped member 301 in a counterclockwise direction in Figure 7 and the free end of the finger 300 will thus move downwardly out of engagement with the ear 200 that is integral with the rack 156.

When the magazine rack 156 is in the position shown in Figure 5, that is the laterally bent arm 157 of the rack 156 is in the lowermost position and the ear 200 is in engagement with the finger 300 of the T-shaped member 301, as shown in Figure 5, the solenoid plunger 310 has been drawn into the solenoid coil 305 in Figure 7 so that the free end of the finger 300 of the T-shaped member 301 is in its raised position.

Figure 21:
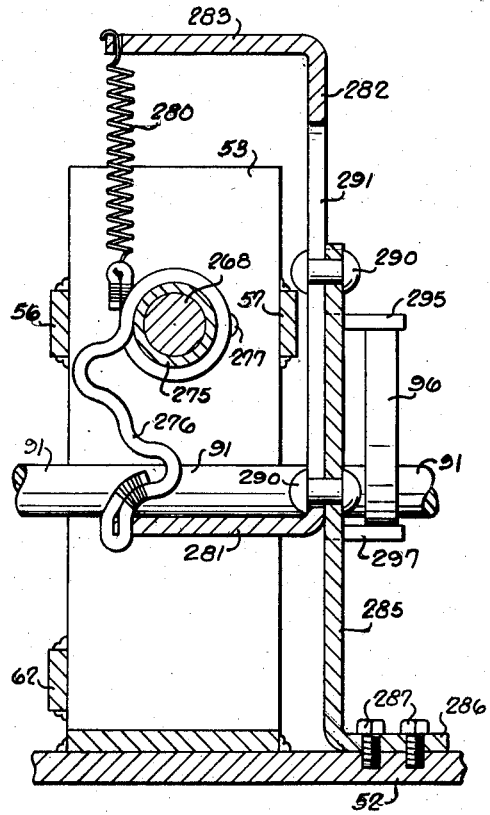
Figure 21 is a vertical sectional view similar to Figure 19 but showing the parts in a different position.

Now, when the magazine rack 156 and the finger 300 and the associated parts heretofore described are in this position, the channel-shaped member 282 is in the raised position shown in Figure 21, however, it is obvious that the shaft 268 cannot rotate, due to the fact that the ear 200 on the rack 156 is in engagement with the finger 300 of the T-shaped member 301 and thus prevents the rack 156 form rotating about its axis. Consequently, the tension spring 280 is stretched open inasmuch as the cord 276 cannot be drawn upwardly as the channel-shaped bracket 282 moves upwardly, due to the fact that the cord 276 is secured to the sleeve 275, which, in turn, is secured to the shaft 268, and it will be noted in Figure 21 that when the channel-shaped bracket 282 moves upwardly, and the shaft 268 is restricted from rotation, the cord 276 merely becomes slackened between the shaft 268 and the lower portion 281 of the channel-shaped bracket 282.

Now, the various parts of this machine are so timed that when the channel-shaped bracket 282 moves downwardly from the position shown in Figure 21 to the position shown in Figure 19, which is the neutral position for this channel-shaped bracket 282, it is seen that the tension spring 281 is no longer under a strong tension, if any at all, and consequently, the pressure exerted by the ear 200 in Figure 5, against the arm 300, is very light, and at this time the solenoid 306 is energized to rotate the T-shaped member 301 in Figure 7 in a counterclockwise direction so that the free end of the finger 300 may move downwardly out of the path of the ear 200 at the lower end of the rack 156.

Figure 22:
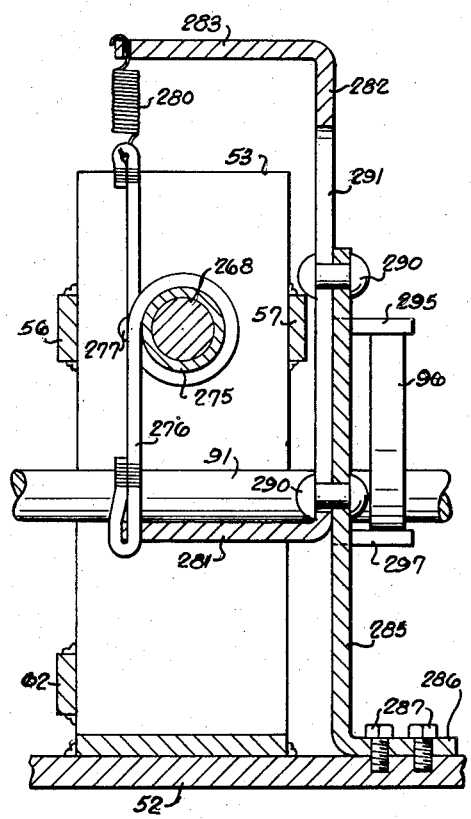
Figure 22 is another view similar to Figure 19 but showing the parts in another position.

When this finger 300 of the member 301 is in the lowered position, as heretofore described, the various parts of this apparatus are so timed that the channel-shaped bracket 282 will again be raised upwardly by the cam wheel 96 to the position shown in Figure 22, and it is obvious that without the restriction of the finger 300 against the ear 200, the shaft 268 will be permitted to rotate and this rotation is imparted to the same by the upper end of the cord 276 being pulled upwardly by the tension spring 280 which is connected to the outer end of the arm 283 of the bracket 282.

This will, of course, cause the rack 156 to rotate in a counterclockwise direction about its axis in Figure 5 until the horizontal arm 158 of the magazine rack 156 is in its lowermost position, or in the same position that the horizontal arm 157 is shown to be in Figures 3, 4 and 5 and the ear 201, which is adjacent the arm 158 will then be moved into engagement with the finger 300 of the member 301, which, as heretofore described, is in the lowermost position at this time.

The cam wheel 96 is so timed that when the channel-shaped bracket 282 moves to the position shown in Figure 22, the tension spring 280 will be placed under a slight tension which is not as great as the tension placed on the tension spring 280 when the parts are in the position shown in Figure 21. The purpose of this slight tension is to insure that the rack 156 will be disposed in a vertical position as the ear 201 is urged against the finger 300 on the member 301.

After a selection has been played the magazine rack 156 must be automatically turned to the position shown in Figure 5. It is obvious that when the parts are in the position shown in Figure 21 and are moved to the position shown in Figure 19, that rotation could not be imparted to the shaft 268. However, when the parts are in the position shown in Figure 22, and the channel-shaped bracket 282 is moved downwardly to the position shown in Figure 19, it is obvious that the shaft 268 would be rotated in a counterclockwise direction as observed in Figure 22 which would impart rotation to the magazine rack 156 in a clockwise direction in Figure 5.

Now, if it is desired to play the upper side of the record 222 when the parts are in the position shown in Figure 5, the finger 300 would then be moved upwardly by the solenoid coil 305, in the manner described, and this would prevent the rack 156 from rotating in a counterclockwise direction as observed in Figure 5, as heretofore described. In the event that it is desired to again play the bottom surface of one of the records 222, the finger 300 of the member 301 would remain in its lowered position to thus permit the rack 156 to return to the position where the arm 157 of the rack 156 would be in the uppermost position. The attitude of the finger 300 is automatically controlled as will be later described.

The reason that the spindle motor 251 is caused to move into and out of engagement with the lowermost of the records on the rack 156 is due to the fact that the records 222 on the magazine rack 156 must rotate about the axis of the rack 156 as the rack rotates and this resilient roller 261 must be moved out of the path of the records 222 while the rack 156 is rotated, and then the resilient roller 261 is moved back into engagement with the lowermost of the records to impart rotation to the records 222 about their vertical axis.

*The tone arm*

The tone arm employed in this apparatus is conventional in all respects with the exception of the manner in which it is mounted and various parts which are connected to the tone arm. Consequently, only those parts which are pertinent to the operation of this apparatus are to be described.

The tone arm, which is broadly designated at 350, has a needle 351 (Figure 5) extending therefrom which is adapted to engage the top surface of each of the records 222 intermittently. It may be observed in Figure 29 that the tone arm is pivotally mounted adjacent the end remote from the needle, on a vertically disposed guide rod 355 and also has vertical sliding movement on the guide rod 355. Disposed adjacent the guide rod 355, in parallel relation thereto, is a second guide rod 356 (Figures 29 and 31). The upper ends of the guide rods 355 and 356 slidably penetrate the horizontal leg of the inverted L-shaped member 67 and are secured in the same by lock nuts 357 threadably mounted on the upper ends thereof (Figure 5). The lower ends of the guide rods 355 and 356 penetrate the plate member 70 (Figure 30) and are secured to the same by lock nuts 360 threadably mounted on the lower ends thereof.

The tone arm 350 has the upper end of a substantially Z-shaped member 361 (Figure 31) welded to the same and the lower end of this member 361 is slidably penetrated by the guide rod 355 and thus serves to assist in rigidly supporting the tone arm 350. The lower end of the Z-shaped member 361 slidably engages the upper surface of a horizontally disposed plate portion 362 of a C-shaped bracket 363.

The C-shaped bracket 363 has an upper horizontal plate portion 364 and both of the horizontally disposed plate portions 362 and 364 of the C-shaped bracket 363 are penetrated by and have vertical sliding movement on the guide rods 355 and 356.

Secured to the lower surface of the upper horizontal plate portion 364 of the C-shaped member 363 are micro-switches 370 and 371. These micro-switches are secured to the same by any suitable means such as screws 372. These micro-switches 370 and 371 (Figures 29) have electric wires 374 and 375, and 376 and 377, respectively, extending therefrom to an electrical circuit to be later described.

The tone arm 350 is provided with electric wires 380 and 381 which extend to a suitable amplifier 382 (Figure 3) mounted on the bottom panel 11 of the cabinet 10 and this amplifier has electric wires 384 and 385 extending from the same to a suitable loudspeaker 386 mounted, in a conventional manner, inside the cabinet adjacent the grilled opening 16.

Secured to the lower surface of the tone arm 350, intermediate its ends, by any suitable means such as rivets 390, is one end of an arm 392 which projects downwardly from the lower surface of the tone arm 350 and is then bent outwardly towards the free end of the tone arm 350 and is curved inwardly, as at 393 (Figure 29), and has an outwardly projecting portion 394 integral therewith in which the lower ends of a plurality of brush bristles 395 (Figure 5) are imbedded.

This arm 392 also has brush bristles 396 disposed adjacent the brush bristles 395 which are substantially longer than the brush bristles 395 and are preferably not as stiff as the bristles 395. The purpose of the longer brush bristles is to clean the bottom surface of the records 222 as the tone arm moves from the central portion of one of the records 222 outwardly to where the bristles 396 are moved out of engagement with the bottom surface of the record.

The purpose of the bristles 395 is to provide a means for controlling the position of the tone arm relative to the records in the event that a 12 inch record is to be played on the shaft 205 instead of a conventional 10 inch record. In the event that a larger than normal record is played, the bristles 395 engage the outer perpihery of the record 222 as the free end of the tone arm moves inwardly to a position slightly above the record and adjacent to the outer edge of the record, by means to be presently described. The parts that normally move the tone arm to a position adjacent to the outer edge of a normal size record continue to move to this position after the larger than normal record has been engaged by the bristles 395, there being spring means actuated during this operation and which will be later described in detail. As the tone arm is lowered to where the needle 351 engages the upper surface of the record 222, the bristles 395 are moved out of engagement with the outer periphery of the record 222 and the needle then follows the conventional grooves which are normally cut in the record.

When the tone arm 350 is raised and lowered, in the manner to be later described, to the desired elevation preparatory to being moved into engagement with the selected record, the tone arm is in the left-hand dotted line position in Figure 29 so the portion of the tone arm that is remote from the needle 351 is in engagement with the micro-switch 371. When the tone arm 350 has been raised or lowered to the desired elevation required to engage the selected record, the tone arm 350 is moved inwardly to substantially the position shown in solid lines in Figure 29 and it is then lowered to move the needle 351 into engagement with the top surface of the record 222 and as it follows the grooves to play the record, it finally moves to the right-hand dotted line position in Figure 29 and it is thus seen that the tone arm then engages the micro-switch 370.

When the tone arm has moved to the right-hand dotted line position shown in Figure 29, it is then raised slightly and moved back to the left-hand dotted line position in Figure 29, by means to be later described, for raising the tone arm. Now, this movement of the tone arm about the guide rod 355 is effected by means of a substantially U-shaped bracket 400 which is secured to the left-hand side of the tone arm 350 in Figure 29 by any suitable means such as rivets 401. This U-shaped bracket 400 has arms 402 and 403 integral therewith.

The arm 403 of the U-shaped member 400 has a pin 405 fixedly secured thereon and projecting upwardly therefrom, and one end of a finger 406 is pivotally mounted on the pin 405. This pin 405 also has mounted thereon a torsion spring 407 one end of which penetrates the pin 405 and the other end of which engages one of the edges of the finger 406 to thus urge the finger 406 toward an upwardly projecting lip portion 408 integral with the arm 403 (Figure 29).

Extending upwardly between the arms 402 and the finger 406 is a rod 410 which projects inwardly at its upper and lower ends and is bent around the guide rod 355 (Figures 1, 5 and 30) to thus permit oscillatory movement of the rod 410 on the guide rod 355 and the lower end of this oscillatable rod 410 slidably engages the upper surface of the plate 70.

A horizontally disposed connecting rod 411 is provided having a transverse slot 414 penetrating its front end in Figure 29. The oscillatable rod 410 slidably penetrates the slot 414 in the connecting rod 411 (Figure 30), adjacent its lower end, and this connecting rod 411 has horizontal sliding movement in guide blocks 412 and 413 secured on the horizontally disposed plates 70 and 52, respectively, by any suitable means such as screws 415. The connecting rod 411 extends rearwardly from the guide block 413 in Figure 30 and has a shoulder screw 420 threadably imbedded therein.

The cam wheel 94, which is fixedly mounted on the cam shaft 91, is adapted to engage the vertical surface of a strap iron member 422 (Figure 30) which projects downwardly and is bent at right angles at its lower end and has a vertical slot 423 therein which is slidably penetrated by the shoulder screw 420 and it is thus seen that the lower end of the strap iron member 422 may have vertical sliding movement on the shoulder screw 420.

This cam wheel 94 has a lobe portion 94a (Figure 30) and this cam wheel 94 engages a medial portion of the strap iron member 422 and this strap iron member 422 is bent rearwardly and upwardly on an angle and is then bent spirally at right angles and is pivotally mounted at its upper end on a transverse shaft 425. This transverse shaft 425 is fixedly mounted at one end thereof in a bearing block 426 (Figure 6) which is secured to the horizontally disposed bar 447 of the left-hand vertical side frame member 21, by any suitable means such as screws 427. The other end of the transverse shaft 425 is fixedly mounted in a bearing block 430 (Figures 7 and 18) which is secured by screws 431 to the rear vertical surface of the inverted U-shaped plate 53.

Figure 30:
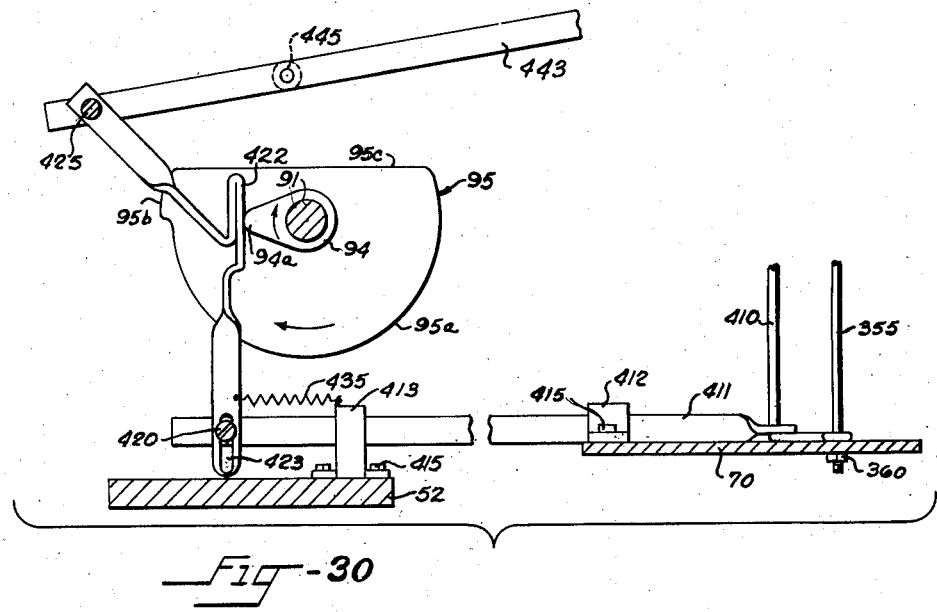
Figure 30 is an enlarged elevation with parts in section and being taken along the line 30—30 in Figure 6.
Figure 31:
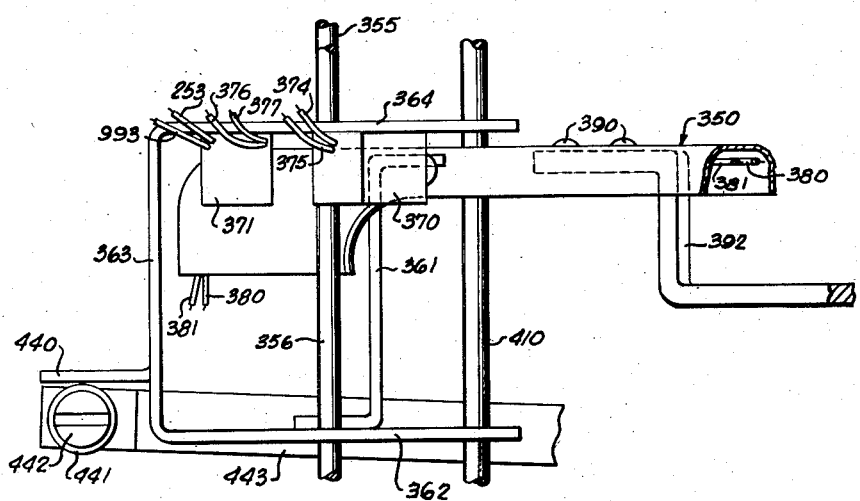
Figure 31 is an enlarged elevation with parts in section and is taken along the line 31—31 in Figure 5 and showing the tone arm elevating mechanism.

A tension spring 435 is mounted at one end on a spring perch integral with the guide block 413 (Figure 30) and the other end of the tension spring 435 is connected to the lower portion of the strap iron member 422 to thus urge the member 422 forwardly towards the guide block 413 which will, in turn, cause the connecting rod 411 to move from left to right in Figure 30. It will be noted that the transverse slot 414 in the connecting rod 411, which is penetrated by the oscillatable rod 410 is provided so the connecting rod 411 may oscillate in a straight path while the rod 410, to which it is connected, moves in an arcuate path.

Now, the cam wheel 94 is provided with the lobe 94a which upon rotation of the shaft 91 engages the member 422 to thus move the rod 411 from right to left in Figure 30. This movement caused the front end of the connecting rod 411 to move upwardly in Figure 29 to thus move the oscillatable rod 410 into engagement with the inner surface of the finger 406 to thus move the tone arm 350 in a clockwise direction about the guide rod 355 as observed in Figure 29 from the left-hand dotted line position, to the solid line position shown in Figure 29, to where the needle 351 is poised above and adjacent the edge of the records 222.

Now, in the event that the record to be played is larger than normal, that is, 12 inches instead of 10 inches in diameter, the bristles 395 on the arm 392 will engage the outer periphery of the record 222 before the lobe 94a on the cam wheel 94 in Figure 30 has caused the oscillatable rod 410 in Figure 29 to move to its rearmost position. Consequently, the oscillatable rod 410 must still continue to its rearmost position and thus the resilient finger 406 is provided, and as the needle 351 of the tone arm 350 is moved into engagement with the grooves in the top surface of the record 222, and as the record is played, the tone arm will gradually move to where pressure is no longer exerted against the finger 406 by the oscillatable rod 410. The crank shaft 91 then pauses in its rotation, by means to be later described, with the lobe 94a of the cam wheel 94 in the position shown in Figure 30.

The needle 351 on the tone arm 350 then follows the grooves in the upper surface of the record to the right-hand dotted line position shown in Figure 29, at which time the cam wheel 94 again starts to rotate and the tone arm is raised slightly, in a manner to be later described, and as the lobe 94a moves out of engagement with the strap iron member 422, the tone arm 350 will move in a counterclockwise direction in Figure 29 out of the path of the records 222 and as the cam wheel 94 (Figure 30) rotates so that the portion 94a is moved out of engagement with the member 422, the oscillatable rod 410 is then moved downwardly away from the observer in Figure 29 and into engagement with the arm 402 to thus move the tone arm to the left-hand dotted line position in Figure 29 to thus complete a cycle in the operation of the cam 94.

Secured to the inverted L-shaped member 67, as by a screw 416 (Figure 5) is a strap iron L-shaped member 417, which extends towards the front of the machine, and the vertical leg of the L-shaped strap iron member 417 has a micro-switch 418 secured thereto as by screws 419. This micro-switch 418 has electric wires 427 and 428 extending therefrom which are a part of the electrical circuit to be later described.

The micro-switch 418 as shown in Figures 2 and 5 is shown schematically in Figure 33-A, and there are many types of switches which could be used in the instance in which this micro-switch 418 is used; however, for purposes of illustration, the micro-switch 418 is shown in Figure 33-A as comprising an insulation lever arm 421 which is pivotally mounted, as at 424, in the micro-switch casing, not shown, and this lever arm 421 has a leaf spring arm 429 integral therewith and extending therefrom to the end of which a contact member 432 is welded.

This contact member 432 has an electric wire 427 connected to the same. It will be noted that the lower surface of the arm 429 in Figure 33-A is engaged by a compression spring 433 to urge the arm upwardly. The contact member 432 is adapted to engage a contact member 434 intermittently, disposed therebelow and to which the wire 428 is connected.

By referring to Figures 2 and 5, it is obvious that the horizontal plate portion 354 of the T-shaped bracket 363 will engage the lower surface of the free end of the lever arm 424 of the micro-switch 418 as the tone arm and associated parts are moved upwardly in the manner heretofore described.

This will cause the lever arm 421 to pivot on its pivot point 424 and the spring member 429 will be urged downwardly at its free end or in a counter-clockwise direction as observed in Figure 33-A to thus move the contact member 432 into engagement with the contact member 434 to complete a circuit between the electric wires 427 and 428.

As the contact point 432 moves into engagement with the contact member 434, the leaf spring member 429 will become bowed in the middle as the C-shaped member 364 continues in its upward movement. Now, as the C-shaped member moves downwardly, the lever arm 421 and associated parts are merely pivoted in a clockwise direction in Figure 33-A about the pivot point 424 to thereby permit the C-shaped member 364 to pass thereby and will not close the switch 418 as the C-shaped member 364 moves downwardly past the micro-switch 418.

Referring to Figures 1, 2, 5, 29 and 31, it may be observed that the vertical portion of the C- shaped bracket 363 is cut away to form a portion 440 which is bent downwardly to a horizontal position and this portion 440 is adapted to be engaged by a roller 441 rotatably mounted on a shoulder screw 442 (Figure 31), which is threadably secured on the free end of a lever bar 443 by means of a nut 444 (Figure 29). The lever bar 443 projects to the left in Figures 5 and 27 and then is bent at right angles as at 443a (Figure 29) and projects rearwardly and the rearmost end of this lever bar 443 is pivotally mounted on the shaft 425 heretofore described.

The lever 443 has a cam follower 445 secured thereon which is adapted to be intermittently engaged by the cam wheel 95. The cam wheel 95 has an arcuate portion 95a, a raised portion 95b and a flattened portion 95c. In the event that there are no restrictions to prevent the free end of the lever 443 from moving downwardly by gravity, such as will be later described, the cam follower 445 will remain in engagement with the peripheral surface of the cam wheel 95 at all times, and the free end of the lever 443 would then be caused to oscillate in a vertical plane to thus raise and lower the tone arm 350 and associated parts which are guided on the rods 355 and 356.

Spiral selector mechanism

In order to stop the free end of the lever 443 at a predetermined position, as it moves downwardly after having been raised by the flattened portion 95c of the cam wheel 95 to the raised portion 95b and the arcuate portion 95a. A vertically disposed tubular drum 446 is provided which is closed at its upper end and lower end by plates 447 and 448 respectively (Figure 14). The upper plate 447 is slidably penetrated by a vertically disposed shaft 450, and this shaft 450 has a splined medial portion 451 which slidably penetrates the lower plate 448 which closes the lower end of the tubular drum 446.

This tubular drum 446 has a plurality of spirally positioned pins 452 (Figures 1, 2, 4 and 5) extending outwardly therefrom and when the tubular drum 446 is caused to rotate, in a manner to be later described, any one of the pins, which will have been selected through means of a selector mechanism to be later described, will be moved into position to be engaged by the lower surface of the lever arm 443 adjacent the bend 443a after the arcuate portion 95a moves out of engagement with the follower 445.

The tubular drum 446 has a collar 453 (Figures 11 to 14 inclusive) secured thereon and spaced upwardly from the lower end thereof which is secured thereon by any suitable means such as screws 454. The lower surface of this collar 453 is adapted to be engaged by a forked member 455.

The forked member 455 has a cam surface 457 integral therewith (Figure 12). The forked member 455 has horizontal sliding movement in guide blocks 460 which are fixedly secured on the horizontally disposed plate members 52 and 70, by any suitable means such as screws 461. The forked member 455 also has horizontal sliding movement on the plate 70.

Disposed adjacent the rearmost end of the forked member 455 or the left-hand end thereof, as observed in Figure 12, is the lower end of a strap iron lever bar 462 which is pivotally mounted on a transverse bolt 463 fixedly mounted in spaced L-shaped brackets 465 secured on the upper surface of the horizontally disposed plate 52 by any suitable means such as screws 466 (Figures 6, 16 and 17).

This strap iron lever bar 462 (Figure 12) projects upwardly beyond the bolt 463 and is bent spirally ninety degrees and is engaged by the cam wheel 93 heretofore described as being fixedly secured on the transverse cam shaft 91. The cam wheel 93 has a flattened portion 93a in its periphery and this portion 93a is shown as being engaged by the upper portion of the vertically disposed lever bar 462 in Figure 12.

The lower end of the strap iron lever bar 462 has a vertical slot 470 therein which is penetrated by a shoulder screw which is threadably imbedded in the free end of the forked member 455. The forked member 455 also has one end of a tension spring 471 connected to a medial portion thereof which extends rearwardly and its rear end is connected to the guide block 460 to thus urge the forked member 455 rearwardly and to urge the upper end of the lever bar 462 into engagement with the periphery of the cam wheel 93.

Now, when the cam wheel 93 rotates in a clockwise direction in Figure 12, to where the enlarged portion thereof is engaged by the upper end of the lever bar 462, the forked member 455 would be urged from left to right in Figure 12 and the cam surface 457 would engage the collar 453 on the tubular shaft 446 to thus move the tubular drum 446 upwardly.

The cam wheel 93 is so designed and is in such timed relation with the other cam wheels mounted on the cam shaft 91 as to cause the tubular drum 446 to remain in raised position from the time that the tone arm 350 has completed playing one side of a record until it is moved from the right-hand dotted line position in Figure 29 to the left-hand dotted line position in Figure 29 and until another record has been selected and the free end of the tone arm 350 is again moved inwardly so that the needle 351 which is connected to the tone arm 350 is poised directly above and adjacent to the outer edge of the record 222.

At this time the upper portion of the strap iron member 462 in Figure 12 will again be engaged by the flattened portion 93a of the cam wheel 93 to thus lower the tone arm and associated parts so the needle 351 of the tone arm 350 is permitted to engage the top surface of the record 222.

The vertically disposed shaft 450 (Figure 5) is extended upwardly beyond the spiral drum 446 and is rotatably mounted, at its upper end, in the horizontal leg of the inverted L-shaped member 67 and is confined therein by a lock nut 472. The shaft 450 also extends downwardly below the splined portion 451 and is rotatably mounted in the horizontally disposed plate 70 (Figures 11, 12, 13 and 14) and this shaft continues downwardly and penetrates a spiral selector box 475 and extends therethrough and is rotatably mounted at its lower end in the plate 51 (Figure 11).

The spiral selector box 475 is of sheet metal construction and is supported on upwardly projecting blocks 476 which are welded at their lower ends to the horizontally disposed plate 51.

Mounted adjacent the lower end of the vertically disposed shaft 450 and disposed between the upper surface of the horizontally disposed plate 51 and the bottom surface of the spiral selector box 475 is a ratchet wheel 480 which has rotational movement against the upper surface of the plate 451. This ratchet wheel 480 has a hub portion 482 integral therewith and has a slot 481 therein, which extends diametrically from one side thereof and terminates closely adjacent the opposite side thereof. The hub portion 482 has ears 488 which are slidably penetrated by a transverse bolt 483, and the head of this bolt 483 is spaced apart from one of the ears 488 and has a compression spring 484 disposed therearound, one end of which engages the hub portion 482 of the wheel 480 and the other end of which engages the head of the bolt 483, to thus resiliently clamp the sprocket wheel 480 on the lower end of the shaft 450.

This ratchet wheel 480 is engaged by a ratchet pawl 485 pivotally secured as at 486 to the horizontally disposed plate 51 (Figure 15). The free end of this ratchet pawl 485 has one end of a tension spring 487 connected thereto, the other end of which is connected to a spring perch 490 secured to the horizontally disposed plate 51. The ratchet wheel 480 is also engaged by a rack 492 which is placed on its side and has horizontal sliding movement on the plate 51. This rack is secured, by any suitable means such as screws 493, to a rearwardly extending strap iron bar 495 which has horizontal sliding movement in guide blocks 496, secured to the upper surface of the plate 51, by any suitable means such as screws 497 (Figure 16).

The plate 52 has a bearing block 500 secured to the bottom surface thereof by any suitable means such as screws 501 (Figure 16). The bearing block 500 has a stud 502 oscillatably mounted therein which is integral with the upper end of a lever arm 503 having a slot 504 therein which is penetrated by a shoulder screw 505. The shoulder screw 505 is secured in the rear portion of the strap iron bar 495 by a nut 506. The lever arm 503 also has a slot 507 therein which is penetrated by a bolt 510 on which the lower end of a compound lever arm 511 is pivotally mounted. The plate 52 has a slot 509 therein which is penetrated by the lever arm 511, and the compound lever arm 511 has sliding movement in the slot 509. The compound lever arm 511 is oscillatably mounted intermediate its ends on the bolt 463 heretofore described. The upper end of this compound lever bar 511 is adapted to be engaged by the periphery of the cam wheel 92 and is shown in Figure 16 as being in engagement with a lobe portion 92a of the cam wheel 92.

The strap iron bar 495 has a spring perch 508 projecting therefrom to which the front end of a tension spring 512 is connected, the rear end of which is connected to one of the screws 497 (Figures 15 and 16). The tension spring urges the rack 492 and the strap iron bar 495 rearwardly and serves to hold the compound lever arm 511 in engagement with the cam wheel 92.

Now, when the lobe 92a of the cam wheel 92 engages the upper end of the compound lever arm 511, this causes the lever arm 503, disposed therebelow, in Figure 16, to move in a counter-clockwise direction from the dotted line position to the solid line position shown in Figure 16. This moves the strap iron bar 495 and the rack 492 secured thereto from left to right as observed in Figure 16, or downwardly in Figure 15, and it may be observed in Figure 15 that the rack 492 is held in engagement with the ratchet wheel 480 by a resiliently mounted roller 514 which is rotatably mounted in one end of a horizontally disposed plunger 516. The plunger 516 has horizontal sliding movement in a guide block 517 secured on the plate 51 as by screws 518. The guide block 517 has a compression spring 520 mounted therein, and this spring 520 urges the roller 517 on the plunger 516 outwardly against the surface of the strap iron bar 495 that is remote from the rack 492.

It is thus seen that the rack 492 causes the ratchet wheel 480 to rotate in a counter-clockwise direction to thus impart rotation to the shaft 450 one revolution with each forward stroke of the bar 495, unless rotation of this shaft 450 is restricted in a manner to be later described.

As the strap iron bar 495 is urged rearwardly or front right to left, as observed in Figure 16, by the tension spring 512, the rack 492 merely slips over the teeth of the ratchet wheel 480 causing the plunger 516 to recede into the guide block 517 equivalent to the depth of the teeth on the ratchet wheel 480. The ratchet pawl 485 in Figure 15 is provided to insure that the ratchet wheel 480 will not be caused to rotate in a clockwise direction as the rack 492 moves rearwardly, which might occur due to the pressure exerted on the rack 492 by the roller 514.

Although the shaft 450 may be restricted from rotating a complete revolution with each stroke of the rack 492, as will be later described, the ratchet wheel 480 is mounted in the manner heretofore described, on the lower end of the shaft 450, so that the ratchet wheel 480 may always complete a revolution with each forward stroke of the rack 492 although the shaft 450 does not rotate but a part of a revolution.

The spiral selector box 475 has a horizontally disposed partition 525 therein (Figure 11) which is loosely penetrated by the vertically disposed shaft 450. Engaging the upper surface of the horizontally disposed partition 525 and surrounding the shaft 450 is a compression spring 526 which is engaged at its upper end by a rotor 527 having a finger 528 and counter-balancing arms 529 projecting laterally therefrom.

The finger 528 of the rotor 527 has an enlarged portion 532 on its free end (Figures 11 and 27), and this enlarged portion has a notch 533 in one side thereof which is adapted to intermittently engage the inner ends of any one of a plurality of spiral selector contact fingers 534 to 545, inclusive. These spiral selector contact fingers are of a non-conducting material, such as plastic or insulation material, and each of the spiral selector fingers 534 to 545, inclusive, is pivotally mounted, intermediate its ends, on a pin 550. Each pin 550 is fixedly mounted in and spans the distance between a pair of upright members 551, the lower ends of which are welded to the top surface of the horizontally disposed partition 525.

Each of the pins 550, on which the spiral selector fingers 534 to 545, inclusive, are mounted has a compression spring 552 disposed therearound, one end of which engages one of the upright members 551 and the other end of which engages one side of the associated spiral selector contact finger, thus permitting the finger to oscillate on the pin 550, but providing a slight frictional resistance to oscillation of the finger so the finger will remain stationary at a predetermined attitude until moved by means to be presently described.

These contact fingers 534 to 545, inclusive, are arranged in a circle about the rotor 527, and disposed below the outer ends of these fingers is a plurality of electro-magnets 555, there being one of these electro-magnets for each of the fingers 534 to 545, inclusive. These electro-magnets are secured, as by screws 556 (Figure 11) to the horizontally disposed partition 525. Each of the fingers has a metallic contact block 557 molded integral therewith, and when the electro-magnets 555 are energized, in a manner to be later described, the electro-magnets attract the contact blocks 557 and cause the outer ends of the fingers 534 to 545, inclusive, to move downwardly and to thus raise the inner ends of the same into the path of the notched finger 528 of the rotor 527 as it rotates in the manner described.

Each of the electro-magnets 555 has electric wires 560 and 561 extending therefrom, which are a part of an electrical circuit to be later described in detail. The contact fingers 534 to 545 also have metallic contact blocks 562 integral therewith and disposed at the outer ends thereof which are also connected to a part of the electric circuit, in a manner to be later described.

The metallic contact blocks 562 are adapted to intermittently engage similar metallic contact blocks 563, there being one of these metallic contact blocks 563 associated with each of the contact fingers 534 to 535, inclusive. These blocks 563 are molded integral with insulation angle members 564 (Figure 10) projecting from the inner wall of the spiral selector box 475.

After the tone arm has completed playing a selection and the tubular drum 446 has been raised slightly in the manner heretofore described and the tone arm has moved in a counter-clockwise direction to the left-hand dotted line position as observed in Figure 29 by the cam wheel 94, the cam wheel 95 then moves the tone arm and associated parts upwardly to the top of its stroke and to where the horizontal plate portion 364 of the C-shaped bracket 363 engages the lower end of a vertically disposed rod 465.

The vertically disposed rod 465 slidably penetrates the horizontal leg of the inverted L-shaped member 67 between the vertically disposed guide rods 355 and 356, and the upper end of this rod 465 is pivotally connected as at 566 (Figure 5) to a horizontally disposed lever bar 567 which is oscillatably mounted, intermediate its ends, on a shaft 570. The shaft 570 is fixedly mounted in a bearing block 571 welded to the upper surface of the horizontal leg of the inverted L-shaped member 67. The left-hand end of the lever bar 567, in Figure 5, is pivotally connected, as at 575, to the upper end of a vertically disposed rod 576 which is mounted for vertical sliding movement in the horizontal leg of the inverted L-shaped member 67 as well as the horizontally disposed plate 70 adjacent its lower end. This rod 576 slidably penetrates the upper wall of the spiral selector box 475 (Figure 11), and is bent inwardly to form a horizontal portion 577 (Figure 10) which extends past the vertically disposed shaft 450 and is welded to a horizontally disposed annular ring 580 (Figures 10, 11 and 27).

The lower surface of this ring 580 is adapted to engage the upper surface of the rotor 527, and it is thus seen that as the tone arm 350 and associated parts move upwardly, and as the plate portion 364 engages the lower end of the vertically disposed rod 465, this will cause the lever bar 567 to move about its pivot point 570 and to thus move the vertically disposed rod 576 downwardly and to also cause the portion 577 of the rod 576 to move downwardly with the ring 580 and thus cause the rotor 527 to move downwardly. The finger 528 of the rotor 527 will then cause the inner end of any one of the spiral selector contact fingers 534 to 545 to move downwardly, depending upon which one of the same is in engagement with the finger 528, and this will open a part of the electrical circuit as will be later described.

The C-shaped bracket 363 will then be caused to move downwardly in Figure 5 by the raised portion 95b moving out of engagement with the cam follower 445 in Figure 30, thus releasing the rotor 527. The spring 526 in Figure 11 will then urge the rotor 527 as well as the rod 576 and the other inter-connected parts, heretofore described, upwardly to the position shown in Figure 11. The various cams are so timed that after the rotor has moved upwardly to the position shown in Figure 11, the rack 492 will then move downwardly in Figure 15, or from left to right in Figure 16 to impart a full revolution to the ratchet wheel 480. This will cause the shaft 450 to turn a complete revolution unless the finger 528 of the rotor 527 encounters another of the spiral selector contact fingers 534 to 545, inclusive.

In the event that the rotor engages one of the fingers 534 to 545, inclusive, before the shaft 480 has made a complete revolution, the ratchet wheel 480 will then slip around the shaft 450 for the remainder of the revolution.

Secured to the upper surface of the inverted L-shaped member 67 as by screws 568 is a micro-switch 569 having electric wires 572 and 573 extending therefrom which are also a part of the electric circuit to be later described. It will be noted in Figure 5 that this micro-switch 569 is adapted to be closed by the free end of the lever arm 567 which is moved downwardly at its left-hand end as the tone arm 350 reaches its upper-most position. This switch is urged upwardly in Figure 33-A by a suitable compression spring 574.

By referring to Figures 9, 32-B, 33 and 34 there may be observed a selector accumulator mechanism which cooperates with the manually operated selector switches, to be later described, so that any desired number of chosen selections may be played successively, and the manner in which this mechanism is mounted is clearly shown in Figures 3, 4 and 9.

Referring to Figure 4 it may be observed that the horizontally disposed plate 65 has an inverted L-shaped plate 600 welded to the lower surface thereof, and having a vertical leg to which an accumulator electric motor 601 is secured by any suitable means such as screws 602. This motor 601 has electric wires 603 and 604 extending therefrom to an electrical circuit to be later described. The motor 601 has a shaft 605 extending vertically therefrom, and, as may be observed in Figure 9, the shaft slidably penetrates the horizontally disposed plate 65 and has a cam wheel 607 fixedly mounted thereon by a set screw 608.

This cam wheel 607 is engaged by the plunger of a micro-switch 610 which is also secured to the horizontally disposed plate 65, as by a screw 611. The cam wheel 607 has a slot 612 extending diametrically from one side thereof and which terminates at a point closely adjacent the periphery of the cam wheel 607. The cam wheel 607 has a hub portion 615 (Figure 9) having ears 616, and one of these ears 616 is threadably penetrated by a screw 617 which slidably penetrates the other of the ears 616 and has a compression spring 618 surrounding the same and exerting pressure between the head of the screw 617 and one side of the flanged portion 616 to thus cause the cam wheel 607 to impart rotation to a shaft 620 which is mounted within the hub portion 615 of the cam wheel 607. However, when rotation of the shaft 620 is restricted in a manner to be later described, the cam wheel 607 will continue to rotate; however, the cam wheel 607 will merely slip around the lower end of the shaft 620.

The shaft 620 is rotatably mounted adjacent its lower end in a lower portion 621 of an accumulator mechanism box 622 having an upper portion 623 and a horizontally disposed partition 624. The accumulator mechanism box 622 is mounted on channel bars 626 which are welded to the bottom portion 621 and these channel bars 626 are secured, as by screws 628, to the upper surfaces of the horizontally disposed plate 65. The upper end of the shaft 620 is restricted as at 625 and this portion 625 is rotatably mounted in the partition 624. The shaft 625 is prevented from falling downwardly, by gravity, in the accumulator mechanism box 622 by a collar 627 fixedly secured on the upper end of the restricted portion 625. Engaging the lower surface of the horizontally disposed partition 624 and being urged upwardly against the same by a compression spring 635 is a rotor 636 having a finger 637 and counterbalancing arms 638 extending laterally therefrom (Figure 9).

This rotor 637 is keyed, as at 640, to the shaft 620 to thus permit vertical sliding movement of the rotor 637 on the shaft 620 and to also cause the shaft 620 to transmit rotation to the rotor 636. The compression spring 635 surrounds the shaft 620, and the upper end of the same engages the lower surface of the rotor 636, and the other end of the compression spring 635 engages the upper surface of the lower portion 621 of the accumulator box 622.

Disposed above the rotor 636 is an annular ring 645 which engages the lower surface of the plate 624, and this is secured as by screws 646 to the lower ends of vertically disposed guide rods 647 which are mounted for vertical sliding movement in the partition 624 and the upper ends of which are connected, as by screws 648, to a circular plate 649.

Disposed between the plate 649 and the upper surface of the horizontally disposed partition 624 is a compression spring 650 (Figure 9) which surrounds the collar 627 of the shaft 620 and urges the annular ring 645 upwardly against the lower surface of the horizontally disposed partition 624. This plate 649 is welded, as at 655, to the lower end of a vertically disposed shaft 656 which has vertical sliding movement in the upper portion 623 of the box 622. This shaft 656 has a restricted threaded portion 658 extending upwardly therefrom, and this portion has spaced adjustment screws 660 threadably mounted thereon. That portion of the shaft 658 which is disposed between the adjustment nuts 660 loosely penetrates one end of a lever bar 665. The lever bar 665 has a slot 666 intermediate its ends which is loosely penetrated by a solenoid plunger 667 extending upwardly from a solenoid coil 670 having electric wires 671 and 672 extending therefrom which are a part of an electrical circuit to be later described. The upper end of this solenoid plunger 667 is threaded for reception of a nut 675 which is adapted to engage the upper surface of the lever bar 665.

The other end of the bar 665, that is, that end remote from the restricted portion 658 of the shaft 656, is pivotally connected, as at 678, to a vertically disposed block 680 which is welded at its lower end to the upper surface of the top portion 623 of the accumulator box 622.

The rotor 636 has an enlarged portion 685 at its outer end (Figures 9 and 24), and this portion has a notch 686 cut therein which is adapted to engage any one of a plurality of accumulator selector fingers 690 which are of suitable insulation material, such as plastic. These fingers 690 are oscillatably mounted intermediate their ends on pins 691 (Figures 9 and 32-B), and these pins 691 are fixedly mounted in pairs of vertically disposed spaced bars 695 which are arranged in a circle around the rotor 636, and are welded at their lower ends to the upper surface of the lower portion 621 of the box 622. A compression spring 692 engages one side of each of the accumulator selector fingers 690, and the other end of the compression spring 692 engages one the bars of each pair of spaced bars. These insulation fingers 690 have molded integral therewith and extending therethrough metallic contact blocks 696 and 697 which are disposed in spaced relation to each other adjacent the inner ends of the accumulator fingers 690. When the fingers 690 are in substantially horizontal position, as shown in Figure 9, these metallic contact blocks 696 and 697 are engaged on each side thereof by the upper ends of leaf spring contact members 700 and 701, respectively, there being a pair of the contact members 700 and a pair of the contact members 701 for each finger 690.

Figure 24:
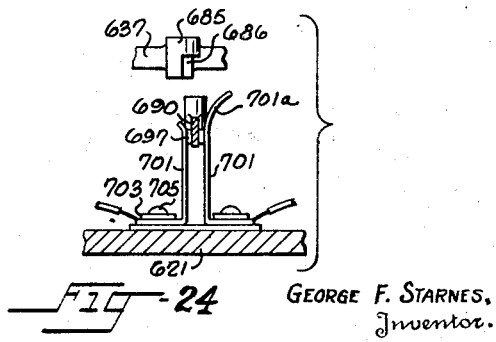
Figure 24 is an enlarged vertical sectional view of one end of one of the accumulator selector fingers taken along the line 24—24 in Figure 9.

Referring to Figure 24, it may be observed that the contact members 701 are L-shaped, and the two making up each pair are spaced apart from each other to engage opposite sides of the contact block 697. Each group of leaf spring members, comprising a pair of leaf spring members 700 and a pair of leaf spring members 701, is secured to the plate 621 by two insulation bars, the opposite ends of each of which engages one of the horizontal legs of each of the leaf spring members 700 and 701 and which are penetrated by screws 703 threadably imbedded in the plate 621. An insulation plate 704 is provided between the leaf spring members 700 and 701 and the plate 621, and is also penetrated by the screws 703 (Figures 9 and 24). It may be observed in Figure 24 that the right-hand leaf spring member 701 is turned outwardly, as at 701a, at its upper end to thereby guide the inner end of the finger 690 to the position shown as it is moved downwardly by the finger 637 of the rotor 636 as will be later described. The leaf spring members 700 and 701 are a part of an electrical circuit to be later described.

The accumulator selector contact fingers 690 each have a pair of spaced metallic contact members 710 and 711 moulded integral therewith and disposed at the outer ends thereof.

When the innermost ends of the accumulator selector fingers 690 are moved upwardly, by means to be presently described, the outermost ends will move downwardly to thus move the contact members 710 and 711 into alignment with mating metallic contact members 712 and 713, which are secured on but insulated from the lower portion 621 of the accumulator mechanism box 622, and these mating contact members 712 and 713 have a connection extending therefrom to an electrical circuit to be later described.

Molded integral with the accumulator contact fingers 690 and disposed approximately half way between the pivot point of the same and the metallic contact member 710 is another metallic contact member 715 which projects downwardly from the lower surface of the accumulator contact finger 690, and disposed immediately below this contact member 715 are electromagnets 716 having wires 717 and 718 extending therefrom which are connected to an electrical circuit to be later described.

It is obvious that although Figure 9 is a vertical sectional view through the center of the accumulator mechanism box 622, only one of the accumulator contact fingers 690 is shown for purposes of clarity.

Although this apparatus is shown as having six records 222 mounted in the magazine racks 156, it is obvious that more or less records than the number shown could be used, as desired. In this instance, I have elected to show the apparatus with six records thereon, and this brings the total number of selections to 48. Therefore, there is provided one of the accumulator contact fingers 690 for each side of the record that is to be played.

Inasmuch as a different electrical circuit must be set up for each of the accumulator selector fingers 690 as shown in the wiring diagram in Figures 32-B and 33, the reference character 699 will apply to each of the accumulator fingers with the numbers 1 through 48 affixed to the number 690 with a dash inbetween. For instance: 690—1, 690—2, 690—3, etc.

Credit ratchet mechanism

Referring to Figures 32-A and 36 there may be observed a credit ratchet mechanism, which is disposed in the electrical circuit between the selector switches to be later described and the accumulator mechanism heretofore described.

This mechanism is mounted on a vertically disposed plate 730 (Figure 4) and is secured, as by screws 731, to the vertical leg 30 of the vertical side frame member 21. This credit ratchet mechanism is shown in Figure 28 as being housed within a cover 732 which is mounted, as by a pressed fit, on the vertically disposed plate 730.

Extending downwardly adjacent the edge of the plate 730 in Figure 32-A is a coin chute 735, the upper end of which is in alignment with the coin slot 19 in the front panel 12 of the cabinet 10. This coin chute 735, which is shown schematically in Figure 32-A, has an opening 736 in one side thereof through which a lever arm 737 projects and the inner end of which is adapted to be engaged by a suitable coin 740.

This lever arm 737 is pivotally mounted, as at 738, on an outwardly projecting portion of the plate 730, and this lever arm 737 is preferably made of an insulation material and has molded integral therewith a metallic contact block 742 which is adapted to intermittently engage a metallic contact bar 743, which is a part of the electrical circuit to be later described. The lever arm 737 is engaged on its lower surface by one end of a compression spring 745, which extends downwardly, and the other end of which engages a lip portion 746 which is integral with the coin chute 735.

It may be observed in Figures 4 and 28 that the coin chute 735 then extends past the housing 732 and into a suitable coin box 750 secured to the vertical legs 27 and 30 of the side frame member 21 as by screws 751. The metallic contact block 742 integral with the lever arm 737 has an electric wire 755 extending therefrom to one side of a solenoid coil 756 which has a wire 757 extending from the same and which is a part of the electrical circuit to be later described.

This solenoid 756 has a solenoid plunger 760 (Figure 32-A) projecting therefrom, the outer end of which has pivotally connected thereto, as at 761, one end of a ratchet pawl 762 having a pointed portion 763 and having a flattened portion 764 at the other end thereof. This ratchet pawl 762 is pivotally mounted, as at 765, on the vertically disposed plate 730. That end of the ratchet pawl which is remote from the pivot point 761 has a spring perch 766 integral therewith to which one end of a tension spring 767 is connected. This tension spring 767 extends to the right in Figure 32-A and is mounted at its other end on a spring perch 770 projecting from the plate 730.

The ratchet pawl 762 is adapted to intermittently engage a credit ratchet wheel 771 which is rotatably mounted on a stub shaft 772 secured to the vertical plate 730, and this ratchet wheel 771 has a pin 773 extending outwardly therefrom which is adapted to engage a leaf spring member 775 having contact members 776 and 777 integral therewith. This leaf spring member 775 is mounted as a by a pressed fit in an insulation block 780 which is secured, as by a screw 781, in the vertical plate 730.

The insulation block 780 also has secured therein, as by a pressed fit, a second leaf spring member 785 having contact blocks 786 and 787 which are normally in engagement with the metallic contact blocks 776 and 777. It will be noted that the blocks 776 and 777 are insulated from each other and that the contact blocks 786 and 787 are also insulated from each other. The contact blocks 776, 777, 786 and 787 have electric wires 790 to 793, inclusive, extending therefrom, which are a part of the electrical circuit to be later described.

The ratchet wheel 771 has one end of a torsion spring 794 (Figure 36) connected to the hub thereof, and the torsion spring 794 surrounds the shaft 772 and is connected at its other end to the plate 730 to thus urge the ratchet wheel 771 in a clockwise direction as observed in Figure 32-A whenever the pointed portion 763 of the ratchet pawl 762 moves out of engagement with the ratchet wheel 772, which is caused by energizing the solenoid coil 756 in a manner to be later described.

Now, when this ratchet pawl moves out of engagement with the ratchet wheel 771, the flattened portion 764 of the ratchet pawl 762 is moved into engagement with the wheel 771 to thus cause the ratchet wheel 771 to turn about the shaft 772 the equivalent of approximately one-half of a step, and when the ratchet pawl is again released, the tension spring 767 will move the ratchet pawl in a counter-clockwise direction in Figure 32-A to move the flattened portion 764 out of engagement with the ratchet pawl 771 and to move the pointed portion 763 of the ratchet pawl 762 into engagement with the ratchet wheel 771 to thereby permit the ratchet wheel 771 to complete its step, equivalent to the length of arc of one tooth on the ratchet wheel.

One of the manually operated selector switches, to be later described, is actuated in a manner to close a circuit. There is provided a solenoid coil 795 to which the wire 791 from the contact block 777 extends, and this coil 795 has another wire 796 extending therefrom which is a part of the electrical circuit to be later described. This solenoid coil 795 has a solenoid plunger 800 extending outwardly therefrom which has pivotally connected thereto, as at 801, one end of a ratchet actuating finger 802, the outer end of which has one end of a tension spring 803 connected thereto, which is connected at its other end to a spring perch 804 secured to the vertical plate 730.

This ratchet finger 802 has a cam surface 805 which is adapted to engage a pin 806 extending outwardly from the vertically disposed plate 730, and it is thus seen in Figure 32-A that the tension spring 803 normally urges the ratchet actuating finger 805 to the right in Figure 32-A as well as the solenoid plunger 800, and the pin 806 causes the outer end of the finger 802 to move out of the path of the ratchet wheel 771. Now, when the solenoid coil 795 is energized, in a manner to be later described, the solenoid plunger 800 is drawn into the coil to thus cause the finger 802 to move into engagement with the ratchet wheel 771 and to thus turn the ratchet wheel about the shaft 772 the distance from one tooth to another on the ratchet wheel 771.

The solenoid 795 will be energized whenever one of the selector buttons, to be later described, is depressed until the pin 773 which projects out of the ratchet wheel 771 is moved by counterclockwise step-by-step rotation of the ratchet wheel 771 into engagement with the leaf spring member 775 to thus separate the contact blocks 776 and 786 and 777 and 787. It is thus seen that the circuit between the wires 790, 793, as well as the circuit between the wires 792 and 791 will be broken and will remain broken until at least another coin is inserted in the coin slot 19 and thus in the coin chute 735.

By referring to Figure 4, there may be observed a plate 810 having a mechanism mounted thereon for closing a switch and holding the switch in closed position for a predetermined length of time and then opening the switch. This delay switch mechanism is shown schematically in Figure 33-A. The plate 810 is secured, as by screws 811 (Figures 4 and 33-A) to the vertical leg 35 of the left-hand side frame member 21.

The plate 810 has a solenoid coil 812 secured thereto, as by screws 813. One end of the electric wire 572 is connected to the coil 812 (Figure 33-A), and a wire 809 is connected to the other side thereof.

This solenoid coil 812 has a solenoid plunger 814 extending therefrom. A bell crank 815, which is pivotally mounted, as at 816, on the vertically disposed plate 810, has a horizontal leg 817 having a slot 820 therein which is adapted to be slidably penetrated by a pin 821 in the outer end of the solenoid plunger 814. The horizontal leg 817 of the bell crank 816 has the lower end of a tension spring 822 connected to the same, the upper end of which is connected to a spring perch 823 (Figure 33-A) secured to the vertically disposed plate 810.

The vertical leg of the bell crank 815 has a slot 825 penetrating the same in which a pin 826 has sliding movement, and this pin is secured, as by a pressed fit, in a flattened portion 827 of a piston rod 830, the other end of which is connected to a suitable piston 831. This piston 831 is mounted for horizontal sliding movement in a hydraulic cylinder 832 having fluid 833 therein, and this hydraulic cylinder has ears 824 welded to the same, which are penetrated by screws 835, to secure the hydraulic cylinder 832 to the plate 810.

The piston 831 has a large bore 837 in the center thereof and has smaller bores 840 disposed at opposite sides thereof, and these bores 838 and 840 penetrate the piston 837 parallel to the axis of the piston. The piston 831 has a valve cover 841 pivotally secured to the same, as at 842, and it is thus seen that as the piston 831 moves from right to left in Figure 33-A, as the solenoid coil is energized in a manner to be later described, the fluid 833 in the cylinder 832 will pass through the bores 837 and 840. However, after the current to the solenoid coil is stopped, the piston 831 is moved from left to right in Figure 33-A by the tension spring 822 and movement of the piston will be retarded by the fluid 833 inasmuch as the fluid will not be able to pass through the bore 837 but will pass through the smaller bores 840.

The piston rod 830 has connected thereto, as by a bit 845, and insulated therefrom, a leaf spring member 846, the outer end of which has welded thereto a contact member 847. This contact member 847 has an electric wire 850 extending therefrom which is a part of the electrical circuit to be later described (Figure 33-A). The contact member 847 is adapted to intermittently engage an insulation block 851 having a contact block 852 molded therein, and this insulation member 851 is secured as by pins 853, to the vertically disposed plate 810.

The insulation block 851 has a bore 855 therethrough which is loosely penetrated by an electric wire 856 which is connected to the contact block 852. It is obvious that many types of delay switches could be used in association with this machine, and the apparatus just described, the operation of which will be later described, is shown by way of illustration only.

A detailed description of the various figures of the drawings having been given, it is believed that an explanation of the operation of this machine can best be understood by referring to Figures 32, 32-A, 32-B, 33, 33-A, 34, 34-A, 34-B and 34-C where many of the parts shown in the drawings are shown schematically and many of the parts in the schematic diagram also having been described in the structure of this machine, and where the wiring system is shown schematically for the first time, for the reason that the wires on the structural figures in the drawings, would not tend for clarity, or, as a matter of fact, the wiring and many of the controls for the machine can be disposed at points remote from the machine.

The credit ratchet mechanism, a detailed drawing of which is shown in Figure 32-A and which has heretofore been described, is very similar to a Moto Drive Coin Register Mechanism Assembly, such as is manufactured by the Rudolph Wurlitzer Company, North Tonawanda, New York, and under their number 455,208, and which is shown in a catalogue, entitled "Wurlitzer Service Instruction and Parts Catalogue," Model Number 1015," and relates to the new 1946 Wurlitzer Model 1015 Commercial Phonograph. This coin register mechanism assembly is shown in said catalogue in Section 1, Figure 5, on sheets 1 and 2.

The selector switches and buttons, to be presently described, need not be of the specific type of selector switch and button assembly shown in the drawings, and a suitable selector and button assembly is shown in the above named parts catalogue, in Section IV, Front Door, Figure 28, one of these selector switches and button assemblies being indicated, for example, by the part number 43972.

Figure 23:
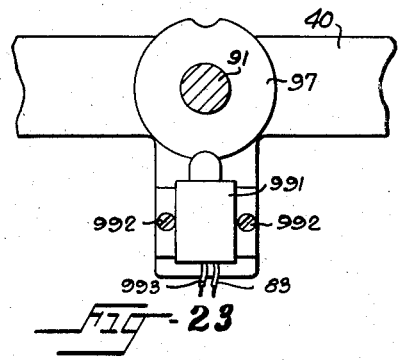
Figure 23 is an enlarged vertical sectional view taken along the line 23—23 in Figure 6.

Obviously there are many types of apparatus that may be used in the electrical circuits associated with this machine, such as Cannon plugs, transformers, timing relays and the like, and such as are shown in the wiring diagram on page 12, Figure 23, of the above-named catalogue, all of which would tend to improve the operation of the various parts of this machine as well as determine the correct voltage and amperage of the various circuits relating to the electrical parts of the machine. However, the various electrical circuits to be presently described, have been made as direct as possible and are shown merely as a means of illustrating the various cooperating functions of the electrical and mechanical parts of this machine, it being understood that this wiring diagram is shown by way of illustration only.

Referring to Figure 33, there may be observed a plurality of suitable selector switch and button assemblies, indicated at S and there being 48 of these selector switch and button assemblies which are adapted to cooperate with the 48 different recorded surfaces of the records 222, these selector switch and button assemblies S will be indicated at S–1 to S–48, inclusive, inasmuch as the structure of all of the selector switch and button assemblies is identical and only one of these selector switch and button assemblies is described in detail, and the same reference characters shall apply to all of the selector switch and button assemblies S–1 to S–48, inclusive.

These switches S–1 may be of the type heretofore described in the parts catalogue of the Rudolph Wurlitzer Company, and the structure of these selector switch and button assemblies to be presently described is merely shown by way of illustration.

The selector switch and button assemblies are divided into groups of 12. Each of the groups of 12 selector switch and button assemblies S–1 to S–12, S–13 to S–24, S–25 to S–36, and S–37 to S–48 are mounted within spaced selector switch boxes 860, which are mounted in the front panel 18 in Figure 1 in a suitable manner. These switch boxes 860 are shown in dotted lines in Figure 33 which surround the groups of 12 selector switch and button assemblies S.

Referring to Figure 35 there may be observed a vertical sectional view through one of the selector switch and button assemblies S and showing a portion of one of the switch boxes 860 in cross-section associated therewith.

The assembly S comprises a selector button B which is adapted to be engaged by one's finger and moved inwardly inasmuch as this button B is disposed outside the switch box 860, and this button B is mounted on the outer end of a bar which slidably penetrates the front wall of the switch box 860, and the rearmost end of which has a tension spring 861 connected to the same, which extends forwardly and downwardly at an angle, and is connected to a spring perch 862 welded to the inner surface of the front wall of the switch box 860.

Extending rearwardly from the front wall of the switch box 860 is a horizontally disposed plate member 863 (Figure 35) having the lower ends of spaced insulation bars C and D secured therein, as by a pressed fit. The upper end of the insulation bar C has a pair of spaced metallic contact members E molded integral therewith, and the upper end of the insulation bar D has a pair of spaced metallic contact members F molded integral therewith.

The metallic contact members E and F are adapted to intermittently engage and be bridged by metallic contact bars G and H, respectively, which are molded integral with the upper ends of insulation bars J and K, respectively, the lower ends of which are imbedded in the horizontally disposed bars A, as by a pressed fit. It is thus seen that when one of the selector buttons B is pressed inwardly towards the box 860, the metallic contact bars G and H will be moved into engagement with the spaced metallic contact members E and F, respectively, to thus complete a circuit between the same. Upon releasing the selector button B, the tension spring 861 will urge the button B outwardly to its original position.

Each of the metallic contact members F has an electric wire L extending from the same to an interconnecting wire 870 (Figure 33) which connects the selector switch and button assemblies S–1 to S–24, inclusive, and there is a similar wire 870a shown in the lower portion of Figure 33, and which is connected to the ends of the wires L extending from the metallic contact members F in each of the selector switch and button assemblies S–25 to S–48, inclusive.

The wires 870 and 870a are connected to a wire 871 extending to a lead wire 872 connected to one side of a suitable male electric plug 873, which is adapted to be plugged into a conventional source of electrical energy, not shown.

The other of the spaced metallic contact members F of each of the assemblies S–1 to S–48, inclusive, has electric wires W–1 to W–48, inclusive, connected to the respective switch assemblies. Each of the wires W–1 to W48, inclusive, extends from its respective selector switch and button assembly S–1 to S–48, inclusive, and the other ends of these wires are connected to one side of the electro-magnets 716 heretofore described, there being one of these electro-magnets 716 disposed adjacent the lower edges of each of the accumulator fingers 690—1 to 690—48, inclusive.

Each of the electro-magnets 716 has the electric wire 717 extending from the same to an interconnecting wire 874 (Figure 32-B), and one end of this interconnecting wire 874 is connected to the wire 790 which extends to the credit ratchet unit mounted on the plate 730 in Figure 32-A, and the circuit will continue through the metallic contact members 776 and 786 and through the wire 793 to a second lead wire 874. It may be observed that this second lead wire 874 extends from Figure 32-A to Figure 32 and is connected to the other side of the male plug 873 opposite from the wire 872.

One of the spaced metallic contact members E in each of the switch assemblies S–1 to S–48, inclusive, has an electric wire N connected to the same, and each of the wires N associated with the switches S–1 to S–24 is connected at its other end to an interconnecting wire 875, there being a similar wire 875a to which the wires N extending from the switches S–25 to S–48 are connected, and these wires 875 and 875a are connected at one end to the wire 871 leading to the lead wire 872. The metallic contact members E disposed in the other sides of the switches S–1 to S–48, inclusive, have an electric wire P connected thereto and extending therefrom.

There is a metallic contact bar 877 associated with each of the groups of twelve selector switches, and the other ends of the electric wires P are connected to the respective metallic contact bars 877. The metallic contact bars 877 that are disposed within the two switch boxes 860, in which the switches S–1 to S–24 are mounted, are connected by an electric wire 880, and there is a similar wire 880a connecting the proximate ends of the metallic contact bars 877 associated with the switches S–25 to S–48.

One end of the bars 877, associated with the two switch boxes 860 in which the selector switches S–1 to S–12 and S–25 to S–36 are mounted, has an interconnecting wire 881 (Figure 32) connected to the same, and this wire 881 has the wire 792 connected to the same, which has heretofore been described as being connected to the metallic contact member 787 of the ratchet mechanism 730 (Figure 32–A).

The electric wires 796 and 757 in Figure 32–A, which extend from the credit ratchet mechanism on the plate 730, are connected at their other ends to the lead wire 872. The lead wire 874 has the electric wire 793 connected to the same which also extends from the credit ratchet mechanism on the plate 730. There is an electric wire 882 extending from the metallic contact member 743 in Figure 32–A, and the other end of this wire 882 is connected to the lead wire 874 (Figure 32–A). This completes the description of the first of a series of circuits, the operation of which will be later described.

This circuit serves to prepare the accumulator mechanism shown schematically in Figures 32–B, 33 and 34 so the accumulator mechanism, which is housed within the accumulator box 622, in Figure 9, may transmit electrical energy to various other electrical apparatus associated with this machine.

By referring to Figure 33, there may be observed an enlarged plan view of the central portion of Figure 32–B which shows the leaf spring contact members 700 and 701 adjacent the inner ends of the accumulator contact arms 690 and which have been omitted from Figure 32–B for purposes of clarity.

The leaf spring metallic contact members 700 being insulated from each other and which are adapted to engage opposite sides of the metallic contact blocks 696 in each of the accumulator contact fingers 690, each have a wire 884 connected thereto and extending from remote sides of the same to the next adjacent leaf spring metallic contact member 700, to thus form a continuous circuit through each of the leaf spring members 700 and the wires 884 associated therewith, provided that the upper ends of the leaf spring metallic contact members 700 are in engagement with the metallic contact blocks 696.

One of the wires 884 is severed, and the proximate ends of the severed wire are connected to electric wires 885 and 886 (Figure 33). The electric wire 886 extends to a lead wire 887 extending from one side of a second male plug 890 which may be plugged into a suitable source of electrical energy, not shown. The electric wire 885 is connected to the electric wire 572 which extends from the micro-switch 569 to the solenoid coil 812.

The micro-switch 610 has a metallic contact bar 892 (Figure 33). The metallic contact bar 892 is adapted to intermittently engage spaced metallic contact members 893 and 894. A suitable compression spring 895 is provided to urge the micro-switch 610 to opened position when the plunger of the micro-switch 610 engages a transverse groove 607a in the periphery of the cam wheel 607 (Figures 9 and 33).

The electric wire 604 which extends from one side of the accumulator selector motor 601 is also connected to the lead wire 887. The leaf spring metallic contact members 701 which are spaced to engage each side of the metallic contact blocks 697 in the arms 690 also have connected to opposite sides thereof and extending to the proximate sides of the leaf spring contact member 701 disposed at the next succeeding accumulator contact arm 690, electric wires 896 and one of these wires 896 is also severed in the same manner as the wire 894, and the proximate severed ends are connected to electric wires 897 and 898 (Figure 33).

The electric wire 897 is connected to the lead wire 887 at its other end, and the wire 898 is connected to one side of a relay magnet 900 to the other side of which an electric wire 901 is connected, and the other end of this wire 901 is connected to a lead wire 902 which extends to the other side of the second male plug 890. The lead wire 902 also has a wire 904 connected to the same, the other end of which is connected to the metallic contact member 894 (Figure 33).

The contact member 893 has an electric wire 905 connected to the same, the other end of which is connected to the wire 603 extending to the accumulator selector motor 601. The wire 851 from the delay switch mechanism in Figure 33–A is connected at its other end to which is associated with the electro-magnet 900, and the other side of the switch 906 has the wire 603 connected thereto which extends from one side of the electric motor 601. The electric wire 850 from the delay switch mechanism in Figure 33–A is connected at its other end to the lead wire 903 (Figure 33).

The lead wires 887 and 902 have one end of respective lead wires 910 and 911 connected to the same which extend from Figure 33 to Figure 33–A, and have one end of the electric wires 672 and 427 connected thereto, respectively. The electric wire 809 extends from one side of the solenoid coil 812 in Figure 33–A, and the other end of this wire 809 is connected to the lead wire 902.

This completes the second series of electrical circuits associated with this machine.

Figure 34 shows schematically the outer ends of the accumulator contact fingers as shown in Figure 32–B, and shows one-half of the accumulator fingers 690 exploded apart from the other half of the accumulator fingers 690, and shows an electrical circuit associated therewith which has been omitted from Figure 32–B for purposes of clarity.

The electrical circuits shown in Figures 34, 34–A, 34–B and 34–C relate particularly to the means for transmitting electrical energy, by means of the accumulator selector fingers 690, to the spiral selector fingers 534 to 545, inclusive, which in turn transmit electrical energy to the various electrical apparatus associated with the tone arm 350, and assist in selecting the correct magazine and the correct side of the record associated therewith.

It has already been described how the accumulator selector fingers 690 are provided with spaced metallic contact blocks 710 and 711. Each of the fingers 690 has an electric wire 912 connecting the associated metallic contact members 710 and 711 together, and this wire 912 is also connected to an interconnecting wire 913 having one end of an electric wire 914 connected to the same, which is connected to a lead wire 915 extending from a suitable male plug 916 which may be plugged into a suitable source of electrical energy, not shown. This plug 916 has another lead wire 917 extending therefrom.

When the enlarged portion 685 of the rotor 636 engages any one of the selector fingers 690, this causes the finger 690 to be rotated slightly in a clockwise direction in Figures 32–B and 34 to thereby move the contact members 710 and 711 into engagement with the mating contact members 712 and 713.

Each of the mating contact members 713 associated with each of the fingers 690 has a wire 920 extending therefrom, and the wires 920 that are associated with the fingers 690—1 to 690—12, inclusive, are connected to an interconnecting wire 921 (Figure 34).

The wires 920 that are associated with the accumulator fingers 690—13 to 690—24, inclusive, are connected to an interconnecting wire 922. Each of the wires 920 associated with the fingers 690—25 to 690—36, inclusive, is connected at its other end to an interconnecting wire 924. All of the wires 921 to 924, inclusive, are identical. The wires 921 to 924, inclusive, have one end of electrical wires 925, 926, 927 and 928, respectively, connected thereto.

The mating contact member 712 associated with the accumulator selector finger 690—1 has one end of an electric wire 931 connected to the same, the other end of the wire being connected to the similar mating contact member 712 associated with the finger 690—25.

By referring to Figure 34 it may be observed that there are electric wires 932 to 954, all of which are identical to the electric wire 931, and the opposite ends of each of which are connected to a separate one of the mating contact members 712, there being one of these mating contact members 712 associated with each of the fingers 690—1 to 690—48, inclusive.

The opposite ends of the electric wire 932 extend to the accumulator selector fingers 690—2 and 690—26. The opposite ends of the wire 933 extend to the accumulator selector fingers 690—3 and 690—27. The electric wire 934 extends to the fingers 690—4 and 690—28. The wire 935 extends to fingers 690—5 and 690—29. The wire 936 extends between fingers 690—6 and 690—30. The wire 937 extends between 690—7 and 690—31, and the distribution of the opposite ends of the wires 938 to 954 continues in this manner, one end of the wires being connected successively to the mating contact members 712 associated with the fingers 690—8 to 690—24, inclusive, and the other end of these wires being connected successively to the mating contact members 712 associated with the fingers 690—32 to 690—48, inclusive, to where the last wire 954 is connected to the finger 690—24 and the finger 690—48.

The electric wires 931 to 942, inclusive, have one end of electric wires 961 to 972, respectively, connected intermediate their ends, the electric wire 961 also being connected intermediate the ends of the electric wire 954.

The electric wire 952 is connected to the electric wire 953. The electric wire 953 is also connected to the wire 962. The electric wire 964 is also connected to the electric wire 951. The electric wire 965 is also connected to the wire 950. The electric wire 966 is also connected to the electric wire 949. The electric wire 967 is also connected to the wire 948.

The electric wire 968 is also connected to the wire 947. The wire 969 is connected to the wire 946. The wire 970 is also connected to the wire 945. The wire 971 is also connected to the wire 944. The wire 972 is also connected to the wire 943.

One of each of the wires 961 to 967, inclusive, extends to one of each of the electric wires 560 extending from the electro-magnets 555 associated with the spiral selector fingers 542 to 545, inclusive, and 534 and 535 in Figure 34–A. The electric wires 972 to 968, inclusive, each extend to one of each of the electric wires 560 extending from the electro-magnets 555 associated with the spiral selector fingers 541, 540, 539, 538, 537 and 536, respectively (Figures 11 and 34–A).

It has already been described how the electro-magnet 555 has the electric wire 561 extending from each of the same, there being one of the electro-magnets 555 associated with each of the spiral selector fingers 534 to 545, inclusive. These wires 561 are all connected to a continuous electric wire 973 having one end of an electric wire 974 connected to the same (Figure 34–A), the other end of which is connected to the lead wire 917.

It has already been described that the outer ends of the contact fingers 534 to 545 are provided with metallic contact blocks 562 and have similar contact blocks 563 which they are adapted to engage intermittently.

Each of the blocks 562 has an electric wire 975 (Figure 34–A) extending from the same, and all of the wires 975 are connected at their other ends to a continuous wire 976 having another wire 977 connected to the same, the other end of which is connected to the lead wire 915. Referring to Figure 34–A it may be observed that there are two additional continuous wires 978 and 979 encircling the spiral selector mechanism adjacent the outer ends of the spiral selector fingers 534 to 545, inclusive.

Now, each of the metallic blocks 563 (Figure 34–A) has an electric wire 980 extending from the same, and the other ends of alternate wires 980 are connected to the continuous wire 978 while the other ends of the remaining wires between the alternate wires are connected to the continuous wire 979. That is, the electric wires 980 associated with the spiral selector fingers 536, 534, 538, 540, 542 and 544 are connected to the wire 978, and the wires 980 associated with the fingers 535, 537, 539, 541, 543 and 545 are connected to the wire 979. The continuous wire 978 has one end of the electric wire 318 connected to the same and which extends to Figure 34–B from Figure 34–A, and the other end of this wire 318 being connected to one side of the solenoid coil 306 as heretofore described.

The wire 317 extending from the other side of the solenoid coil 306 (Figure 34–B) extends to the lead wire 917. The continuous wire 979 in Figure 34–A has one end of the wire 316 connected to the same which extends to Figure 34–B and is connected to one side of the solenoid coil 305 as heretofore described. The electric wire 315 extending from the other side of the solenoid coil 305 is connected to the lead wire 917.

It may be observed in Figures 34, 34–A and 34–B that the electric wires 925 to 928, inclusive, extend past the spiral selector mechanism shown in Figure 34–A, and these wires extend to one side of the micro-switches 181 to 184, respectively, which are shown in Figure 34–B as being two-way push button two-point make switches, and which have heretofore been described as being associated with the magazine racks 156 (Figures 20 and 25), and are for controlling the position of the same. These micro-switches 181 to 184 each have a conventional compression spring 981 associated therewith.

An electric wire 982 extends from the opposite side of the switch 181, and the compression spring 981 urges the micro-switch 181 out of engagement with the electric wires 925 and 982. The electric wire 982 extends to the open side of the switch 183 which is normally held out of engagement with the wire 982 by its associated compression spring 981, and the electric wire 927 extends to the other open side of the switch 183. The wire 926 extends to one of the closed sides of the micro-switch 182, and there is one end of an electric wire 983 connected to the other closed side of the micro-switch 182 and which extends to one of the normally closed sides of the switch 184 (Figure 34-B). The end of the wire 928 is connected to the other normally closed side of the switch 184.

The wires 925 to 928, inclusive, have branch wires 984 to 988, respectively, connected thereto. The electric wires 984 and 986 extend to one side of the normally closed side of the switches 181 and 183, respectively, and the opposite closed sides of the switches 181 and 183 are connected to opposite ends of an electric wire 989.

The electric wires 985 and 987 are connected to one of the normally opened sides of the respective micro-switches 182 and 184, and there is connected to the other normally opened side of the switches 182 and 184 the opposite ends of an electric wire 990. The electric wire 82 which extends from the cam shaft motor 81 is connected to the electric wires 982 and 990. The electric wire 102 which extends from the conveyor motor 101 (Figure 34-C) is connected to the electric wires 983 and 989 in Figure 34-B.

The electric wire 83 on the other side of the cam shaft motor 81 in Figure 34-C extends to one side of a micro-switch 991 (Figure 23) secured to the bar 40, by any suitable means such as screws 992, and the plunger of which is adapted to engage the periphery of the cam wheel 97. The cam wheel 97 has oppositely positioned grooves 97a and 97b in its periphery (Figures 23 and 34-C), and when the plunger of the micro-switch 991 is urged into one of these grooves by a conventional spring within the micro-switch 991, this causes the switch 991 to open. The other side of the micro-switch 991 has an electric wire 993 extending from the same, the other end of which is connected to the lead wire 917.

The electric wire 375 in Figure 34-C extends from one side of the micro-switch 370 and is connected to the electric wire 83 extending from the electric motor 81. The electric wire 374 on the other side of the micro-switch 370 extends to the lead wire 917 and is connected thereto.

The micro-switch 370 is of the push button two-point make type of switch, and the switch 371 in Figures 29 and 34-C is a two-way two-point make switch. The micro-switch 371 is normally urged, by conventional spring means associated therewith, out of engagement with the electric wire 253, extending from the spindle motor 351, and an electric wire 993 which extends therefrom to the lead wire 917.

When the plunger of the switch 371 is engaged by the tone arm 350, the micro-switch 371 completes a circuit between the electric wires 376 and 377. The electric wire 376 is connected at its other end to the electric wire 103, and the wire 377 is connected at its other end to the wire 83. The electric wire 103 which extends from one side of the conveyor motor 101 is connected to the electric wire 374 between the micro-switch 370 and the lead wire 917. The wire 254 on the other side of the spindle motor 251 extends to the lead wire 915. This completes the description of the third series of electrical circuits associated with this machine.

Method of operation

Briefly, every other one of the selector switch and button assemblies S in the first group of 12 shown in Figure 32 is adapted to complete a circuit to the various parts of the machine in such a manner as to play one side of the records 222 disposed in one of the racks 156.

The remaining six selector switch and button assemblies in this first group of 12 is adapted to complete a circuit to other cooperating parts of the machine to thus play the opposite sides of the records 222 in the same magazine in which the selector switch and button assemblies previously mentioned have caused one side of the records to be played. It is thus seen that the selector switch assemblies S-1 to S-12, inclusive, are adapted to play both sides of all of the records 222 disposed within the rack 156, and the selector switch assemblies S-13 to S-24 are adapted to transmit current to cause the records 222 disposed in the magazine rack 156a to be played on both sides thereof.

The selector switch and button assemblies S-25 to S-36 are adapted to transmit current to the records 222 in the magazine rack 156b to thereby play both sides of the records in this magazine. The selector switch and button assemblies S-37 to S-48, inclusive, are adapted to transmit circuits to the magazine rack 156c and associated parts in such a manner as to play both sides of the records 222 mounted therein.

A description will first be given to describe the operation of the various mechanical and electrical parts associated with this machine which are actuated to cause one side of one of the records in a single magazine to be played.

It has already been described how the insertion of the coin 740 in the coin chute 735 will actuate the lever arm 737 to momentarily move the metallic contact member 742 and 743 into engagement with each other, and this will cause a circuit to be completed through the wire 881 (Figure 32-A) from the lead wire 874, extending from the male plug 873 and through the contact members 743 and 742, through the wire 755, through the solenoid coil 756, and then through the wire 757 to the other lead wire 872 extending from the male plug 873 (Figures 32 and 32-A).

This will cause the solenoid plunger 760 (Figure 32-A) to be drawn into the solenoid coil 756 to actuate the ratchet pawl 763 in the manner heretofore described, to thus accumulate a number of credits equivalent to the number of coins 740 inserted in the coin chute 735, so that the selector switch and button assemblies S-1 to S-48, inclusive, may be individually closed, manually, to thus complete a circuit to the desired records 222, a number of times equivalent to the number of coins 740 that have been inserted in the coin chute 735.

For purposes of description, we will assume that there have been two coins 740 inserted in the coin chute 735, to thus permit a circuit to be completed by any two of the selector switches S-1 to S-48, inclusive, to play any two records 222 as desired.

Assuming further that a desired selection is indicated as requiring that the push button B of the selector switch assembly S-1 be depressed manually, the electrical circuit will be completed in the following manner:

The electrical current will be transmitted through the male plug 873 in Figure 32, and the current will pass through the lead wire 872 and into the wire 871 and to the wire 870 to one of the contact members F associated with the switch S-1. Now, when the arm A is moved downwardly in Figure 32 by manually pressing the button B of the switch S-1, the contact bar H will complete a circuit between the contact members F heretofore described, and current will then flow through the wire W-1 in Figure 32.

The current then flows through the wire W-1 and to that electro-magnet 716 and through the wire 717 at the other side thereof and into the interconnecting wire 874, to which the wire 790 is connected, and through the wire 790 in Figure 32-B to the contact member 776 mounted on the leaf spring member 775 in Figure 32-A.

Now, inasmuch as the pin 773 which projects upwardly from the ratchet wheel 771 is not in engagement with the leaf spring member 775, the contact point 776 is in engagement with the contact member 786, and the current thus flows from the wire 790 through the contacts 776 and 786 and through the wire 793 to the lead wire 874, which extends to the other side of the male plug 873.

There having been two credits generated in the credit ratchet wheel 771, as heretofore stated, it is assumed that the push button B of the selector switch S-2 is depressed in a manner to cause the associated bar H to complete a circuit between the contact members F, and the current will then flow from the male plug 873, through the wire 872, the wire 871, the wire 870, and the associated wire L through the spaced contact members F and thus through the wire W-2, to one side of the electro-magnet 716 associated with the accumulator selector finger 690-2. The current for the electro-magnet 716 then flows through the same and through the associated electric wire 717 and to the interconnecting wire 874 and thus to the wire 790, and will again pass through the contact members 776 and 786 in Figure 32-A and thus through the wire 793 and through the lead wire 874 to the other side of the male plug 873.

Now, whenever one of the buttons B of any one of the switch assemblies S is moved inwardly, this will cause the associated bar G to move into engagement with the spaced contact members E to thus complete a circuit from the male plug 873 through the wire 871, through the wire 875, through the wire N, and current will flow through these members and through the contact member E at one side of the corresponding switch S, and through the contact bar G, through the contact member E at the other side of the switch S, through the associated wire P and the contact bar 877, and thus through the wire 881. This wire 881 has the wire 792 connected to the same, and thus current will flow through the wire 792, in Figure 32, to the contact member 787 in Figure 32-A and inasmuch as this contact member 787 is in engagement with the member 777, the current will flow through these contact members 787 and 777 and through the wire 791 to one side of the solenoid coil 795. A circuit is thus completed to the solenoid coil 795 by the electric wire 796 which extends to the lead wire 874 extending from the other side of the male plug 873.

This means that when there is a "credit" remaining in the credit ratchet mechanism 771, the current will flow to the solenoid coil 795 to thus cause the solenoid coil 795 to draw the plunger 800 into the same.

This will cause the dog 802 in Figure 32-A to engage the ratchet wheel 771 to thus move the same the equivalent of the distance from one tooth to the next of the wheel 771. Now, if this is the last credit remaining in the credit ratchet wheel 771, that is, either only a single coin 740 had been inserted in the coin chute 735 or the last remaining selector switch assembly button B had been depressed to where there would be one side of a record played, the ratchet wheel 773 and the pin 771 will be moved into engagement with the free end of the leaf spring member 775 (Figure 32-A) on which the contact members 776 and 777 are mounted to thus move these contact members 776 and 777 out of engagement with the contact members 786 and 787, respectively, and thus a circuit cannot be completed by the selector switch assembly S until another coin has been inserted in the coin chute 735 to actuate the credit ratchet mechanism in the manner heretofore described.

Every time a circuit is completed to the solenoid coil 795 in the manner heretofore described to cause the solenoid plungers 800 to be drawn into the same, this solenoid plunger is withdrawn, after the circuit is broken, from within the coil 795 by the tension spring 803 mounted at the outer free end of the dog 802, in the manner heretofore described.

When one of the magnets 716 (Figure 9) is energized in the manner heretofore described, the adjacent metallic contact members 715 will be attracted to the magnets 716 to thereby move the associated accumulator selector fingers 690 downwardly at their outer ends and upwardly at their inner ends on their pivot points 691, and it will thus draw the contact members 696 and 697 upwardly and out of engagement with the respective vertically disposed leaf spring members 700 and 701.

However, when the innermost ends of all of the accumulator selector fingers 690-1 to 690-48, inclusive, are in their lowermost position as shown in Figure 9, a circuit is completed through the electric wires 896 (Figure 33) which are connected to the leaf spring contact members 701, and the circuit will flow through the electric wire 887 from the male plug 890 which has been plugged into a suitable source of electrical energy, not shown. The current will flow through the lead wire 887, through the electric wire 897, through the electric wires 896, and the associated leaf spring members 701, through the electric wire 898 and through the relay magnet 900 and through the electric wire 901 on the other side thereof through which the current continues to the lead wire 902 and thus to the other side of the male plug 890. This causes the relay magnet 900 to be energized to thus open the relay switch 906 to thereby open an electrical circuit to the electric motor 601.

When any one of the magnets 716 has been energized to move any one of the accumulator selector fingers 690 so that the contact member 697 is moved out of engagement with the leaf spring metallic contact members 701, the circuit to the relay magnet 900 will be broken and thus the switch 906 will be permitted to close (Figure 33).

The various parts of this machine are so timed that when the last of the accumulator selector fingers 690 is moved downwardly at its inner end, in Figure 9, in the manner heretofore described, to thus complete the circuit to the electro-magnet 900, the cam wheel 607 on the shaft 608 will complete one revolution, which is caused by the horizontal leg 364 of the C-shaped member 363 having engaged the lower end of the vertically disposed rod 565 (Figure 5) to thus move the horizontally disposed lever bar 567 into engagement with the micro-switch 569.

This will close the micro-switch 569 and current will flow from one side of the male plug 890 (Figure 33) through the lead wires 887 and 910, through the wire 573 to one side of the micro-switch 569 (Figure 33-A). The current will then flow through the micro-switch 569, through the electric wire 572, to one side of the solenoid coil 812 (Figure 33-A). The current will then flow through wire 809 through the lead wire 902 to the other side of the male plug 890 in Figure 33.

This will energize the coil 812 in Figure 33-A to thus cause the solenoid plunger 814 to move downwardly in Figure 33-A and to move the bell crank 817 in a counter-clockwise direction in Figure 33-A to thus move the piston 831 in the cylinder 832 from right to left in Figure 33-A. The fluid 833 in the cylinder 832 will then be caused to pass through the bores 840 and 837 in the piston 831, and this will cause the valve 841 to swing outwardly on its pivot point 842 to thus permit the fluid 833 to pass therethrough.

Now, as the piston moves from left to right in Figure 33-A, this movement of the piston 831 through the fluid 833 in the cylinder 832 will cause the valve member 841 to close the right-hand end of the bore 837 in the piston 831 and will thereby retard the movement of the piston from left to right in Figure 33-A.

This piston 831 is caused to move from left to right in Figure 33-A by the tension spring 822 which is connected to the bell crank 817 and urges the bell crank 817 in a clockwise direction in Figure 33-A.

The purpose of retarding of the movement of the piston 831 from left to right in Figure 33-A is so the contact member 847 will remain in engagement with the contact plate 852 for a long enough period of time to permit the electric motor 601 to become energized and to thus rotate the shaft 608 on which the cam wheel 607 is mounted, and to thereby move the grooved portion 607a of the cam wheel 607 out of engagement with the plunger of the micro-switch 610, at which time the circuit will then be closed to the electric motor 601 through the micro-switch 610 (Figure 33).

When the contact member 847 is in engagement with the contact plate 852 in Figure 33-A, the current flows from the male plug 890 in Figure 33 through the lead wire 902, through the electric wire 850 and to the contact member 847. The current then continues through the contact member 847, the contact plate 852, the electric wire 851 in Figure 33-A, and through the relay switch 906 in Figure 33, which in this instance is closed, through the electric wire 603 to one side of the electric motor 601. The current then flows through the electric motor 601 through the electric wire 604 connected to the other side thereof and through the lead wire 887 to the other side of the male plug 890 in Figure 33.

Attention is called to the fact that the electrical circuit can be completed to the electric motor 601 by means of the contact members 847 and 852 in Figure 33-A only when the relay switch 906 is closed, which means only when the inner ends of all of the accumulator selector fingers 690—1 to 690—48, inclusive, are in their lower-most position as shown in Figure 9.

The delay switch associated with the piston 831 and associated parts is necessary inasmuch as the micro-switch 569 is only momentarily engaged by the horizontal lever bar 567 at the apex of the upward stroke of the C-shaped member 363 associated with the tone arm 350, and the micro-switch 569 would not remain closed long enough, under these circumstances, to move the cam wheel 607 in Figure 33 to where the plunger of the micro-switch 610 is out of engagement with the groove 607a in the periphery of the cam wheel 607.

Assuming that the shoulder portion 686 of the rotor 637 is in engagement with the inner end of one of the accumulator selector fingers 690, and further assuming that there are no other accumulator fingers 690 in the path of the shoulder portion 686 of the rotor 637, after the side of the record 222 has been played to which this particular accumulator selector finger is connected in the manner heretofore described, the tone arm moves upwardly and this will move the C-shaped member 363 upwardly and into engagement with the free end of the lever arm 421 of the micro-switch 418 in Figure 33-A.

The upper horizontal leg 364 of the C-shaped member 363 then engages the lower surface of the lever arm 421 adjacent its free end, and thus urges the contact members 432 and 434 into engagement with each other. This will complete a circuit from the male plug 890 in Figure 33 through the lead wires 902 and 911, through the electric wire 427 in Figure 33-A and to the contact member 432. The current will then flow through the contact member 432, through the contact point 434, through the wires 428 and 671 to one side of the solenoid coil 670 (Figures 33-A and 9).

The current will then flow through the solenoid coil 670, through the electric wire 672, through the lead wires 910 and 887 and to the other side of the male plug 890 in Figure 33.

This will cause the solenoid coil 670 in Figures 9 and 33-A to be energized and thus pull the plunger 667 downwardly to thus move the left-hand end of the lever arm 665 in Figure 9 downwardly.

The left-hand end of the lever arm 665, being in engagement with the restricted portion 658 of the shaft 656, will thus move the shaft 656 and associated parts downwardly to thereby move the ring 645 downwardly into engagement with the upper surfaces of the counter-balancing arms 638 and the finger 637 of the rotor 636 to thereby urge the same downwardly against the compression spring 635 in Figure 9.

Inasmuch as the shoulder portion 686 at the free end of the finger 637 of the rotor 636 is in engagement with the inner end of one of the accumulator selector fingers 690 at this time, this will also urge the inner end of the finger 690 downwardly to thus move the contact members 696 and 697 into engagement with the leaf spring contact members 700 and 701, respectively, and will thereby complete a circuit to the relay magnet 900 in the manner heretofore described.

Now, as the C-shaped member 363 of the tone arm 350 moves on upwardly and immediately after its engagement with the micro-switch 418, it will again cause the micro-switch 569 to be closed in the manner heretofore described to thus move the contact member 847 into engagement with the contact member 852 in Figure 33–A, in the manner heretofore described. This will cause the accumulator selector motor 601 to again complete a revolution inasmuch as the grooved portion 607a of the cam wheel 607 will be caused to move out of engagement with the plunger of the micro-switch 610 to thus move the contact bar 892 in Figure 33 into engagement with the contact members 893 and 894, which will complete a circuit to the accumulator selector motor 601 until the cam wheel 607 has completed a revolution, to thereby move the grooved portion 607a of the cam wheel 607 into engagement with the plunger of the micro-switch 607a.

However, inasmuch as the inner ends of all of the accumulator selector fingers 690 are in their lowermost position, the slotted portion 686 of the finger 637 of the rotor 636 will merely complete a revolution and will not engage any of the accumulator selector fingers 690, and therefore a circuit cannot be completed to cause another selection to be played.

When the micro-switch 610 is closed in the manner heretofore described, by the cam wheel 607, the current flows from one side of the male plug 890 in Figure 33 through the lead wire 887, through the wire 604, through the accumulator selector motor 601, through the wires 603 and 905 to the contact member 893. The current then flows through the contact bar 892 through the contact member 894, through the electric wire 904, and through the lead wire 902 to the other side of the male plug 890.

It is thus seen that the accumulator selector motor, when energized in the manner heretofore described, will always complete exactly one revolution and will then stop, and the cam wheel 607 on the motor shaft 608 will stop with the grooved portion 607a in engagement with the plunger of the micro-switch 610.

Now, when a first push button S is operated in the manner heretofore described to cause one of the electro-magnets 716 to be energized, and to thereby cause the innermost ends of one or more of the fingers 690 to be moved upwardly, depending upon how many of the selector switches S are operated, it again becomes necessary to start the accumulator selector motor to where the plunger of the micro-switch 610 will be moved out of engagement with the portion 607a of the cam wheel 607.

Therefore, when all of the accumulator fingers 690 are in their lowermost position, an electric circuit is completed from the one side of the male plug 890 through the lead wire 887 (Figure 33), through the wires 886 and 884, through the leaf spring contact members 700 associated with each of the accumulator selector fingers 690, through the contact members 696 which are molded integral with each of the accumulator selector fingers 690, through the wire 885 in Figures 33 and 33–A, through the wire 572, through the coil 812, through the wire 809, through the connecting lead wire 902, to the other side of the male plug 890 in Figure 33.

It is thus seen that the solenoid plunger 814 will be held in its lowermost position in Figure 33–A by the solenoid coil 812 at all times when all of the fingers 690 are in their lowermost position at their inner ends.

This means that the solenoid plunger 814 is not released until one or more of the switches S has been operated in the manner heretofore described, to cause one or more of the accumulator selector fingers 690 to move upwardly at its inner end, which, of course, will move the contact member 696 associated therewith out of engagement with the corresponding pairs of leaf spring members 700 (Figures 9, 33 and 33–A) at which time the contact member 847 will be in engagement with the contact plate 852 in the lower portion of Figure 33–A and the relay magnet 900 will no longer be energized. As a result, the relay switch 906 will then be closed and the electrical circuit will be completed to the motor 601, in the manner heretofore described, to thus start and energize the motor 601 until the micro-switch 610 may take over in the manner heretofore described.

It is obvious that although the contact member 847 is in engagement with the plate 852, when the inner ends of all of the fingers 690 are in their lowermost position the relay magnet 900, in Figure 33, will also be energized at this time and will thus hold the relay switch 906 in an opened position and an electrical circuit cannot be completed to the motor 601 until at least one of the fingers 690 is caused to move upwardly at its inner end.

Assuming again that the selector switches S–1 and S–2 (Figure 32) have been closed in the manner heretofore described to energize the magnets 716 associated with the accumulator selector fingers 690—1 and 690—2 and to thus cause these accumulator selector fingers to move downwardly at their outer ends and upwardly at their inner ends, the rotor 636 will then be caused to rotate in a counterclockwise direction as observed in Figures 32–B and 33, in the manner heretofore described, to where the portion 686 of the finger 637 of the rotor 636 will engage the inner end of the first of these fingers 690—1 and 690—2 to be in its path, which, in this instance, would be the finger 690—2.

This means that the finger 637 of the rotor 636 will move from the position in which it had previously stopped, which, in this instance, is shown in the drawings as having been immediately above the inner end of the finger 690—24 in Figures 32–B and 33. It is obvious that the rotor 636 would then have to rotate approximately one-half a revolution from the position shown in Figures 32–B and 33 to where the outer end of the finger 637 would engage the inner end of the finger 690—2.

It has already been described how the electric motor 601 is caused to rotate a complete revolution when the first of the accumulator selector fingers 690 is caused to move upwardly at its inner end. It has been further described how, when the finger 637 of the rotor 636 engages any one of the fingers 690—1 to 690—48, inclusive, the cam wheel 607 will then continue its rotation but will slip around the lower end of the shaft 620, in Figure 9, until it has completed its revolution.

Now, assuming that the outer end of the finger 637 of the rotor 636 has engaged the enlarged portion 685 at the inner end of the accumulator selector finger 690—2, this will cause the finger 690—2 to rotate slightly in a clockwise direction in Figure 32–B. The accumulator selector fingers 690 are caused to rotate when engaged by the enlarged portion of the arm 637 around the pin 691, there being an elongated slot in each of the fingers 690, and these accumulator selector fingers 690 are, of course, urged against one of the spaced bars 695 by the spring 692 to thus frictionally hold the inner ends of these fingers in a raised position, although the circuit to the corresponding electro-magnets 716 may be open.

This partial counter-clockwise rotation of the finger 690—2 will cause the contact members 610 and 611 at the outer ends of the accumulator selector finger 690—2 to be moved into engagement with the mating contact members 712 and 713 (Figures 9 and 34).

This will cause the electro-magnet 555 associated with the spiral selector finger 542 to be energized inasmuch as the current will flow from one side of the male plug 916 in Figure 34, through the lead wire 915, through the wire 914, through the interconnecting wire 913 in Figure 34, through the wire 912, to the contact members 710 and 711 associated with the finger 690—2. The current will then flow through these members 710 and 711, through the associated mating contact members 712 and 713 respectively, and into the wires 932 and 920, respectively.

The current in the electric wire 932 will then flow through the wires 962 and 560 in Figures 34 and 34-A to one side of the electro-magnet 555 adjacent the spiral selector finger 542, and the current will flow through this magnet 555 through the wire 561 at the other side thereof, through the interconnecting wire 973, through the wire 974, through the lead wire 917 and to the other side of the male plug 916 in Figure 34, to thus complete a circuit to the magnet 555 associated with the finger 542, and to thereby cause the contact member 557 (Figure 11) adjacent the outer end of the finger 542 to be attracted to the magnet 555 and to thereby move the inner end of the spiral selector finger 542 upwardly, to the position in which the spiral selector finger 535 is shown in Figure 11.

Simultaneously, the electrical current continues through the wire 920, as heretofore described, through the interconnecting wire 921 in Figure 34, through the wires 925 and 984 in Figures 34, 34-A and 34-B to one side of the normally closed side of the micro-switch 181 in Figures 20, 25 and 34-B.

The current will then flow through the micro-switch 181, it being closed as shown in Figure 34-B, through the electric wires 939 and 102 to one side of the conveyor motor 101 in Figures 2, 6 and 34-C. The current then flows through the motor 101, through the wires 103, 376, 374 and lead wire 917 in Figures 34-A and 34-B to the other side of the male plug 916.

Assuming that the magazine rack 156 is in the position in which the magazine rack 156a is shown to be in Figure 7, it is thus seen that the conveyor motor 101 would be enerized, and this would transmit rotation to the shaft 104 in Figure 6, and the sprocket wheel 105 thereon, and would tranmit rotation to the sprocket chain 107 and the sprocket wheel 110 to the transverse shaft 111 in Figures 6 and 7. This would cause the sprocket chains 115 and 116 to move in a counter-clockwise direction, as observed in Figure 7, to thus move the magazine rack 156 (with is assumed to be in the position occupied by magazine rack 156a) from right to left in Figure 7 and then downwardly to where the guide block 145 would be moved into engagement with the flared guide members 60 and 61 (Figures 7, 20 and 25) to move the associated actuating arm 187 into engagement with the micro-switch 181 in Figure 20. It is thus seen that this would cause the micro-switch 181 to move out of engagement with the electric wires 984 and 989 and into engagement with the electric wires 925 and 982. The electrical current would then continue from the wire 925, it having entered the wire 925 in the manner heretofore described, and will flow through the switch 181, through the wires 982 and 82 to one side of the cam shaft motor in Figure 34-C. The electrical current would then flow through the motor 81, through the wires 83 and 377, through the micro-switch 371 and the wire 376, the wires 376 and 377 being connected by the micro-switch 371 in this instance.

The electrical current would then flow through the wire 376 and wire 374 to the lead wire 917 and to the male plug 916 in Figure 34 to thereby complete the circuit to the cam shaft motor 81.

The motor 81 will then cause the shaft 85 to rotate in Figure 6 to thus transmit rotation through the sprocket wheel 86 and the sprocket chain 87, to the sprocket wheel 90 and thus to the transverse shaft 91. This will cause the transverse shaft 91 to rotate in a clockwise direction in Figures 4 and 30. When this machine ceases to operate, the cam wheel 95, in Figure 4, stops with the cam follower 445, in Figure 6, in engagement with the arcuate portion 95a. When the cam follower 445 is in engagement with the portion 95a of the cam wheel 95, the arm 443 to which the tone arm assembly 350 is connected would be slightly lower at its outer end than the uppermost end of its normal stroke.

It is noted that the cam wheel 95 causes a temporary pause of the arm 443 associated with the cam follower 445 for approximately one-half of a revolution of the cam shaft 91 to which the cam wheel 95 is secured.

Referring to Figure 16 it may be observed that the lobe 92a of the cam wheel 92 is caused to engage the upper end of the lever arm 511 to thus cause the shaft 450 in Figures 10, 13 and 15 to rotate in a counter-clockwise direction. This shaft 450 (Figures 10, 11, 13 and 16) will thus transmit rotation to the rotor 527, and this rotor 527 will rotate until the outer end of its associated finger 528 is moved into engagement with the inner end of one of the spiral selector fingers 534 to 545, inclusive, which, in this instance, would be the finger 542.

Now, when the outer end of the finger 528 of the rotor 527 engages the inner end of the spiral selector finger 542, in the manner heretofore described, the ratchet wheel 480, which is caused to rotate in the manner heretofore described will continue to rotate a complete revolution, although the shaft 450 will not be able to turn after the finger 528 engages the spiral selector finger 542 inasmuch as the rotor 527 is keyed to the shaft 450. This rotation of the ratchet wheel 480 (Figure 15) will cause the same to slip around the shaft 450 for the remainder of its revolution after the outer end of the finger 528 has engaged the inner end of one of the spiral selector fingers 534 to 545, inclusive. It is obvious in Figures 10 to 16 that this rotation of the shaft 450 will cause the spiral selector drum 446 to rotate in a counter-clockwise direction in Figure 13 and will cause the drum 446 to stop when the rotor 527 stops to thereby position one of the pins 552 at the desired height for playing the desired record 222.

Now, as this shaft 450 is caused to rotate in the manner heretofore described, the cam wheel 93, in Figure 12, is in engagement with the upper end of the lever arm 462 to thus move the lower end of the lever arm 462 from left to right in Figure 12 and to thereby cause the drum 446 to be raised slightly from the position shown in Figures 12 and 14.

Now, as the spiral selector drum 446 stops in the manner heretofore described, this will cause the spiral selector finger 542 to move slightly in a clockwise direction in Figures 10 and 34-A to thus move the associated contact member 562 into engagement with the adjacent contact member 563 on the insulation angle clip 564.

When the spiral selector fingers 534 to 545, inclusive, are caused to move downwardly at their outer ends in Figure 11, by the means heretofore described, the compression spring 552 will exert pressure on one side of each of the fingers in such a manner as to cause it to be held in its uppermost position at its inner end by friction until such time as the inner end of these fingers are moved downwardly in the manner to be later described.

Inasmuch as the fingers 534 to 545, inclusive, are loosely mounted on the pins 551, the finger 542 will be permitted to rotate slightly in a clockwise direction in Figure 10 to thereby move the contact members 562 and 564 into engagement with each other as heretofore described.

The current then flows from the male plug 916 in Figure 34 through the lead wire 915 through the wire 977 in Figure 34-A, through the wires 976 and 975, through the contact members 562 and 564 associated with the spiral selector finger 542, through the associated wire 980 to the interconnecting wire 978, through the electric wire 318, in Figures 34-A and 34-B, and to the solenoid coil 306 in Figures 7 and 34-B.

The current then flows through the solenoid coil 306, through the electric wire 317 at the other side thereof to the lead wire 916 and to the other side of the male plug 916 in Figure 34. This will cause the solenoid plunger 311 to move into the solenoid coil 306 in such a manner as to move the finger 300 of the T-shaped member 301 downwardly to its lowermost position as indicated in dotted lines in Figure 34-B.

It has already been described how the cam wheel 96 in Figure 18 causes the shaft 368 to rotate and to thus impart movement to the magazine racks 156. Now, as the rack 156 moves into position to where the guide block 145 is in the correct position between the guide members 60 and 61, the shaft 268 will be in the neutral position shown in Figures 18 and 19 so that the tongue 143 of the shaft 147 will move into engagement with the slot 270 in the shaft 268, as shown in Figure 25. As the magazine racks 156, 156a, 156b and 156c are moved with the sprocket chains 115 and 116, the shaft 268 and the associated parts, including the cam wheel 96, are in the neutral position shown in Figure 19.

Inasmuch as the arm 300 of the T-shaped member 301 is in the lowermost position at this time, the cam wheel 96 will rotate from the position shown in Figure 19 to the position shown in Figures 21 and 22, and this will cause the channel-shaped bracket 282 to move upwardly from the position shown in Figure 19 to the position shown in Figures 21 and 22.

Now, since the finger 300 of the T-shaped member 301 is not restricting rotation of the rack 156 in Figure 5, the rack 156 will rotate in a counter-clockwise direction in Figure 5 so that the ear 201 of the rack 156 will engage the finger 301 of the T-shaped member 300, and the parts associated with the cam wheel 96 will come to rest in the position shown in Figure 22, with the shaft 268 being held under the torsion of the spring 280 to where the ear 201 will be held in engagement with the finger 300 of the T-shaped member 301.

It is thus seen that the sides of the records 222 that are facing the arm 157 of the rack 156 are in the uppermost position, and it is this side of one of the records 222 which is about to be played in the manner about to be described.

In the meantime the cam wheel 95 will continue to rotate in a clockwise direction as observed in Figures 4 and 30, and the cam surface 95a then moves out of engagement with the cam follower 445 to which the lever arm 443 is connected, and this lever arm 443 will fall, by gravity, as the cam follower 445 moves into engagement with the flattened surface 95c of the cam wheel 95. However, the cam follower 445 will not follow this flattened surface 95c in its entirety inasmuch as the outer end of the lever arm 443 will engage the desired pin 452 in the selector drum 446 as shown in Figure 5.

The various cam wheels are in such timed relation that after the lever arm 443 has moved downwardly at its outer end and engaged the desired pin 452 in the drum 446, the cam wheel 94 in Figure 30 will have rotated in a clockwise direction, as observed in Figure 30, so the lobe portion 94a moves into engagement with the strap iron member 422 in such a manner as to urge the lower end of the same in Figure 30 from right to left about its pivot point indicated at 425 in Figure 30.

There being a connection between the lower end of the strap iron member 422 and the lower end of the vertically disposed rod 410 to thus cause the rod 410 to partially rotate in a clockwise direction in Figures 2 and 29, and in the instance of a conventional 10-inch record being mounted in the magazine rack 156, the tone arm 350 will be moved from the left-hand dotted line position shown in Figure 29 to the solid line position shown in Figure 29 by the rod 410 engaging the inner surface of the finger 406 of the U-shaped bracket 400 to thus cause the tone arm 350 to partially rotate in a clockwise direction to where the short bristles 395 of the arm 392 will engage the outer periphery of the record 222.

The needle 351 of the tone arm 350 would then be poised above and adjacent the outer edge of the record 222.

As the cam shaft motor 81 is started in the manner heretofore described, the cam wheel 97 is caused to rotate in a clockwise direction in Figure 34-C to thereby cause the micro-switch 991 to be closed inasmuch as the grooved portion 97b of the cam wheel 97 is moved out of engagement with the plunger of the micro-switch 991.

As the tone arm 350 is caused to move in a clockwise direction in Figure 29, in the manner heretofore described, the lowermost end of the tone arm 350, as observed in Figure 29, is moved out of engagement with the plunger of the micro-switch 371 to thereby cause the micro-switch to move out of engagement with the electric wires 376 and 377 in Figure 34-C and into engagement with the electric wires 253 and 993.

This will complete a circuit to the spindle motor 251 as follows: The current flows from one side of the male plug 916 through the lead wire 915 and through the wire 254 to one side of the motor 251. The current then flows through the motor 251, through the wire 253, through the micro-switch 371, through the wire 993 and through the lead wire 917 and thus to the other side of the male plug 916 in Figure 34.

It is thus seen that the spindle motor 251 will be energized only from the time that the tone arm 350 has begun its movement into engagement with the outer edge of the record 222, through the time that the record is played and then until the tone arm 350 has been returned to the left-hand dotted line position shown in Figure 29.

As soon as the magazine 156 has rotated to the desired position for playing the desired side of the record 222, in the manner heretofore described, the spindle motor 251 is caused to move rearwardly by the cam wheels 235 and 236 (Figures 2 to 6, inclusive) and the tension spring 265, in the manner heretofore described, so the resilient roller 261 is moved into engagement with the lowermost of the records 222 in the rack 156.

It has already been described how this energizing of the spindle motor 251 will transmit rotation to the shaft 205 on which the records 222 are mounted, to thus transmit rotation to all of the records in any one of the four magazines when these magazines are in the position adjacent the tone arm 350.

Since the needle 351 of the tone arm 350 is now poised above and adjacent the outer edge of the desired record 222, it is now necessary to move the tone arm 350 downwardly so that the needle 351 will engage the upper surface of the desired record 222. The arcuate portion of the cam wheel 93, in Figure 12, will then move out of engagement with the lever arm 462 to where the lever arm 462 is engaged by the flattened surface 93a. Now, as this arm 462 in Figure 12 is urged into engagement with the flattened portion 93a of the cam wheel 93 by the tension spring 471, the lower end of the lever arm 462 is moved from right to left to thus move the cam surface 457 of the forked member 455 out of engagement with the lower surface of the collar 453 and to thereby permit the spiral drum 446 to move downwardly by gravity and into engagement with the upper surface of the horizontally disposed plate 70 in Figures 12 and 14.

Inasmuch as the lever arm 443 is in engagement with one of the pins 452 in the spiral drum 446, it is obvious that this sudden downward movement of the drum 446 will permit the tone arm 350 to move downwardly to where the needle 351 will engage the upper surface of the desired record 222.

The record 222 will then be played in a conventional manner as the tone arm follows the conventional grooves in the record, and the tone will be transmitted through the needle 351, through the tone arm 350 and through the electric wires 380 and 381 to the amplifier 382 in Figure 3 and thus through the wires 384 and 385 to the loudspeaker 386 to thus emit the tone from the loudspeaker 386 through the grilled portion 16 of the cabinet 10.

The needle 351 of the tone arm 350 follows the conventional grooves in the record 222 to the right-hand dotted line position as shown in Figure 29, at which time the tone arm 350 will engage the plunger of the switch 370 to thereby again complete a circuit to the cam shaft motor 81, it having been stopped due to the fact that as the tone arm needle 351 of the tone arm 350 is moved into engagement with the upper surface of the record 222, the cam wheel 97 will have rotated to where the grooved portion 97a will be engaged by the plunger of the micro-switch 991 to thereby open the switch 991 and to thus cause the cam shaft motor 81 to stop, inasmuch as it is desired not to continue rotation of the cam shaft 91 during the time that the record 222 is being played.

When the plunger of the switch 370 is engaged and moved inwardly by the tone arm 350, the switch 370 is closed and the current passes from one side of the male plug 916 (Figure 34) through the lead wire 917, through the wire 374, through the switch 370, through the wires 375 and 83, through the cam shaft motor 81, through the wires 82 and 982 to one side of the switch 181, which, as has been heretofore described, is in engagement with the wires 925 and 982 and to which the circuit is completed in the manner heretofore described.

As the switch 370 is closed, in the manner heretofore described, the cam wheel 97 (Figures 23 and 34-C) then starts its rotation to again close the micro-switch 991, in the manner heretofore described, and to thereby complete the circuit to the cam shaft motor 81, in the manner heretofore described, for one-half revolution of the cam shaft 91, that is, until the plunger of the switch 991 is again engaged by one of the grooves 97a or 97b in the cam wheel 97.

As soon as the cam shaft motor has been started by the switch 370, the switch 370 is caused to open in the following manner: The lever arm 462 in Figure 12 then again engages the arcuate surface of the cam wheel 93 to raise the needle 351 and the tone arm 350 out of engagement with the central portion of the record 222, and at the same time will move the bristles 396 in the arm 392 into engagement with the lower surface of the record 222 to thus clean the lower surface thereof as the tone arm is moved to the left-hand dotted line position in Figure 29 by the cam wheel 94 (Figure 30).

The tone arm is moved to the left-hand dotted line position due to the fact that the lobe 94a of the cam wheel 94 will then move out of engagement with the strap iron member 422 to thereby permit the tension spring 435 to pull the lower portion of the strap iron member 422 from left to right in Figure 30 to thereby cause the rod 410 to rotate in a counter-clockwise direction in Figures 2 and 29. This rod 410 will engage the arm 402 of the U-shaped member 400 to thus move the tone arm 350 from the right-hand dotted line position in Figure 29 to the left-hand dotted line position, which will cause the micro-switch 370 to be opened and this will cause the switch 371 to be closed as indicated in Figure 34-C. This completes a cycle in the operation of the tone arm 350.

This will cause the spindle motor 251 to stop inasmuch as the circuit to the spindle motor 251 will be broken when the tone arm engages the plunger of the micro-switch 371.

The cam wheel 95 has, in the meantime, continued its operation as the cam shaft motor 81 is started and stopped and again started in the manner heretofore described, and thereby will cause the raised portion 95b of the cam wheel 95 to engage the cam follower 445, it having been again engaged by the flattened surface 95c of the cam wheel 95, and to thus raise the lever arm 443 to the apex of its upward stroke to thereby close the micro-switch 569 (Figures 5 and 33–A), in the manner heretofore described, and to cause the finger 637 of the rotor 636 to move downwardly with the rotor 636 in the manner heretofore described and to thereby move the innermost end of the accumulator selector finger 690—2 downwardly to its lowermost position, as shown in Figure 9, in the manner heretofore described.

Now, as this finger 637 of the rotor 636 moves downwardly, in the manner heretofore described, the circuits to the cam shaft motor 81, the conveyor motor 101 and the accumulator selector motor 601 are all opened in the manner heretofore described. However, in the meantime, the cam wheel 95 will have rotated with the cam shaft 91 to where the raised portion 95b moves out of engagement with the cam follower 445 (Figure 30), and the arcuate portion 95a of the cam wheel 95 engages the follower 443 so that the tone arm 350 and associated parts come to rest a short distance below the apex of its upward stroke after having reached this apex.

After the record has been played and simultaneously with the raising of the tone arm 350 and the movement of the tone arm in a counter-clockwise direction in Figure 29 to the left-hand dotted line position, the cam wheel 96 will continue its rotation in a counter-clockwise direction in Figure 7 to thus move the channel-shaped bracket 282 from its raised position shown in Figure 22 to the lowered position shown in Figure 19 and to thereby cause the magazine rack 156 to move in a clockwise direction in Figure 5 to where the ear 201 adjacent one end of the rack 156 would be in the uppermost position as shown in Figure 5.

There is no tension on the tension spring 280 in Figure 19 when the parts are in the position shown in Figure 19, and, therefore, there will be no torsional effect exerted on the shaft 268 so that in the event that it is desired to move the magazine 156 to where one of the magazines 156a, 156b or 156c may move into the position for having one of the associated other records 222a, 222b, or 222c played, there will be no resistance to this movement of the magazine rack 156 between the grooved portion 270 in the shaft 268 and the tongue portion of the shaft 147. The shaft 268 would also be in position for receiving the next magazine rack 156a in the event that one of the selector switches S—13 to S—24 were closed.

Now, inasmuch as another of the accumulator selector fingers 690 is still in the raised position, namely, finger 690—1, the accumulator selector motor 601 is caused to complete another revolution of the cam wheel 607 by the means heretofore described, that is, the delay switch mechanism shown in Figure 33–A, and will thus cause the notched portion 686 of the rotor 636 to engage the innermost end of the finger 690—1. The circuit set up by this engagement of the notched portion 686 with the finger 690—2 is very similar to the circuit set up by the accumulator selector finger 690—1.

However, in this instance, the current flows through the wire 931 from the mating contact member 712 associated with the finger 690—1, it having been transmitted to the mating contact members 712 in the manner identical to that of the contact member 712 associated with the finger 690—2.

Current will then flow through the wire 931, through the wires 961 and 560, through the magnet 555 and the wire 561 associated with the spiral selector finger 541 in Figure 34–B, through the wire 561 and so on to complete the circuit to the magnet 555 in the manner identical to that previously described for the magnet 555 associated with the spiral selector finger 542. This will cause the finger 541 to move into engagement with the electro-magnet 555, in the manner heretofore described.

When this accumulator selector finger 690—1 is engaged by the outer end of the rotor arm 637, a circuit is completed identical to that of the accumulator selector finger 690—2 to thereby cause the cam shaft motor and the conveyor motor to be energized. However, if the conveyor of the desired magazine rack 156 is already in position, such as it would be in this instance, the micro-switch 181 would be out of engagement with the wires 984 and 989, and, therefore, the conveyor motor 101 would not be energized.

The spiral selector finger 541 would be engaged at its inner end by the outer end of the rotor finger 528 of the rotor 527 and would cause a record 222 of a different elevation than the previous record to be played inasmuch as a different one of the pins 452 in the spiral drum 446 would be moved into position to be engaged by the lever arm 443 and, inasmuch as this would complete a circuit between the contact members 562 and 564 (Figures 10 and 34–A) associated with the spiral selector finger 541, the current would flow from the male plug 916 (Figure 34) through the lead wire 915, through the wires 977 and 976 (Figure 34–A), through the contact members 562 and 564, through the wire 980 and the interconnecting wire 979, through the wire 316, through the solenoid coil 305 (Figure 34–B), through the wire 315, through the lead wire 917 and to the other side of the male plug 916. Attention is called to the fact that the main difference between actuating the spiral selector fingers 542 and 541 is that the finger 542 causes the solenoid coil 306 to be energized, and the finger 541 causes the solenoid coil 305 to be energized, and these two fingers as well as all of the rest of the spiral selector fingers each cause a different side of a record 222 to be played.

Now, when the solenoid coil 305 is energized in the manner heretofore described, this will cause the upper end of the T-shaped member 301 to be moved inwardly by the solenoid plunger 310 and will thus move the free end of the finger 309 to its uppermost position.

When the free end of the arm 300 of the T-shaped member 301 is in the raised position and the shaft 268 is again caused to rotate in the manner heretofore described, the channel-shaped bracket 282 will move from the position shown in Figure 19 to the position shown in Figure 21, and as this bracket 282 moves upwardly the ear 200 of the magazine rack 156 would be urged against the free end of the finger 300 of the T-shaped member 301 by the torsional effect transmitted to the shaft 268 by the tension spring 280, and the parts would rest in the position shown in Figure 21 as the record was being played.

The method of operation thus far has referred to only one of the magazine racks, namely 156.

By referring to Figures 34, 34–A and 34–B it is obvious that whenever one of the accumulator selector fingers 690—1 to 690—12 is actuated in the manner heretofore described, this will complete the circuit to the micro-switch 181 as heretofore described and will cause the records 222 associated with the magazine rack 156 to be positioned for playing and the accumulator selector fingers 690—13 to 690—24 would cause the switch 182 to be energized in the manner heretofore described, to thus cause the rack 156a to be positioned for playing the records 222a associated therewith. The accumulator selector fingers 690—25 to 690—36 would cause the switch 183 to be energized to position the magazine rack 156b for playing the records 222b and when the accumulator selector fingers 690—37 to 690—48 are actuated in a manner identical to the fingers 690—1 and 690—2 as heretofore described, the rack 156c would be positioned for playing the records 222c.

The spiral selector mechanism shown in Figures 10, 11 and 34–A controls which side of which record in each of the magazines 156 shall be engaged by the needle 351 of the tone arm 350 regardless of which one of the racks may be positioned for being played by the needle 351.

It is thus seen that I have provided an improved record selector and changing mechanism having a plurality of magazines in which a plurality of spaced records are rotatably mounted and means for selecting any one of the records for playing, as desired, by manually closing any one of a number of switches, there being a switch provided for each selection to be played on the records, and there being two selections for each record.

Not only have I provided means for playing the conventional 10-inch records in these magazines, but I have provided means whereby 12-inch and 10-inch records may both be mounted in the same magazine, or, if desired, each magazine may have all of one size record mounted therein.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a selectively operable automatic phonograph, a rotatable member having a plurality of spaced blocks thereon, a magazine supporting shaft projecting radially through and rotatably mounted in each spaced block, one end of each magazine shaft having a magazine rotatably mounted thereon, each of said magazines having a rotatable shaft extending transversely of the magazine supporting shaft and having means for removably securing a plurality of superposed disk-shaped records thereon, a source of electrical energy, stationary guide members disposed in the path of the blocks on the rotatable member, electrically controlled selecting means for arresting rotation of the rotatable member when the desired block on the rotatable member has moved into engagement with the guide members, a vertically movable and laterally swingable tone arm disposed adjacent the path of the travel of the magazines, cam means for rotating the magazine disposed in engagement with the guide members after rotation of said rotatable member has been arrested so as to present the desired side of the record to be played, said cam means comprising an idler shaft, connector means on the idler shaft and cooperating connecting means on the magazine supporting shaft for causing common rotation of the idler and magazine supporting shafts upon either of them being rotated, a channel-shaped bracket having arms extending across said idler shaft in diametrically opposed spaced relation thereto, a cable connected to and surrounding said idler shaft, one of the ends of said cable extending from the shaft and being connected to one of the arms of the channel-shaped member, the other end of said cable extending from the shaft and being connected to the other arm of the channel-shaped member, a driven shaft, a cam member fixed on the driven shaft and means on the channel-shaped bracket engageable by the cam member for transmitting reciprocatory motion to the channel-shaped bracket whereby, upon reciprocatory motion of the channel-shaped bracket, the bracket will pull the cable in the direction in which the channel-shaped bracket is moving to thus transmit partial rotation to the shaft and which will in turn transmit partial rotation to the corresponding magazine.

2. In a structure according to claim 1, automatically and electrically controlled means for arresting rotation of the magazine with the magazine in a predetermined position and a resilient means connecting one end of the cable to one arm of the bracket so as to permit continuous reciprocatory motion of the channel-shaped bracket although the idler shaft does not rotate.

3. In a phonograph record player having an endless movable member thereon and means for moving the movable member and also having a plurality of spaced magazines extending radially from the movable member and being mounted for rotation on an axis extending radially of the movable member, and each of said magazines having a shaft therein and also having a plurality of spaced superposed tablet phonograph records fixedly mounted on said shaft and said record player also having a tone arm and means for moving the tone arm into and out of engagement with predetermined records in a magazine positioned adjacent the same, in sequence, means for arresting movement of the endless movable member with the magazines in a predetermined position with one of the magazines adjacent the tone arm, resilient means for transmitting partial rotation to the magazine on the movable member adjacent the tone arm, movable means disposed in the path of travel of opposed ends of the magazine upon rotation being imparted thereto for arresting rotation thereof to present a predetermined side of the phonograph records for engagement by the tone arm.

4. In a selective automatic phonograph having a movable tone arm and a rotatable member and also having a plurality of radially spaced magazines mounted for rotation on the rotatable member and also having a plurality of superposed tablet phonograph records in each of said magazines, selector controlled electrically operable means for initiating rotation of the rotatable member, electrically operable means responsive to said selector controlled means for arresting rotation of the rotatable member to present a predetermined magazine in a predetermined position adjacent the tone arm, electrically operable means responsive to the positioning of the predetermined magazine adjacent the tone arm for resiliently imparting partial rotation to the positioned magazine and means responsive to said selector controlled means for limiting rotational movement of the magazine so as to position the magazine with selected surfaces of the records facing in a predetermined direction to be engaged by the tone arm.

5. In a selective automatic phonograph having a movable tone arm and a rotatable member and also having a plurality of radially spaced magazines mounted for rotation on the rotatable member and also having a plurality of superposed tablet phonograph records in each of said magazines, selector controlled electrically operable means for initiating rotation of the rotatable member, electrically operable means responsive to said selector controlled means for arresting rotation of the rotatable member to present a predetermined magazine in a predetermined position adjacent the tone arm, electrically operable means responsive to the positioning of the predetermined magazine adjacent the tone arm for resiliently imparting partial rotation to the positioned magazine, means responsive to said selector controlled means for limiting rotational movement of the magazine so as to position the magazine with selected surfaces of the records facing in a predetermined direction to be engaged by the tone arm, said selector controlled electrically operable means for arresting rotation of the rotatable member having the magazine thereon comprising an electrical circuit including a source of electrical energy, a plurality of manually operable selector means, a plurality of normally closed electrical switches disposed adjacent the tone arm, switch engaging means on each of said magazines and each of the switch engaging means being adapted to engage a different one of the switches disposed adjacent the tone arm upon moving past the tone arm, electrical connections between the switches disposed adjacent said tone arm and the manually operable selector means and the electrically operable means for imparting movement to said rotatable member and other electrical connections between the switches adjacent said tone arm and the electrically operable means for imparting rotation to the rotatable member whereby, upon a predetermined one of the switches disposed adjacent said tone arm being engaged by the switch engaging means on a predetermined magazine, a circuit to the electrically operable means for transmitting rotation to the rotatable member will be opened thus arresting movement of the magazines thereon.

6. In a selective automatic phonograph having a movable tone arm and a rotatable member and also having a plurality of radially spaced magazines mounted for rotation on the rotatable member and also having a plurality of superposed tablet phonograph records in each of said magazines, selector controlled electrically operable means for initiating rotation of the rotatable member, electrically operable means responsive to said selector controlled means for arresting rotation of the rotatable member to present a predetermined magazine in a predetermined position adjacent the tone arm, electrically operable means responsive to the positioning of the predetermined magazine adjacent the tone arm for resiliently imparting partial rotation to the positioned magazine, means responsive to said selector controlled means for limiting rotational movement of the magazine so as to position the magazine with selected surfaces of the records facing in a predetermined direction to be engaged by the tone arm, said selector controlled electrically operable means for arresting rotation of the rotatable member having the magazines thereon comprising an electrical circuit including a source of electrical energy, a plurality of manually operable selector means, a plurality of normally closed electrical switches disposed adjacent the tone arm, switch engaging means on each of said magazines and each of the switch engaging means being adapted to engage a different one of the switches disposed adjacent the tone arm upon moving past the tone arm, electrical connection between the switches disposed adjacent said tone arm and the manually operable selector means and the electrically operable means for imparting movement to said rotatable member and other electrical connections between the switches adjacent said tone arm and the electrically operable means for imparting rotation to the rotatable member whereby, upon a predetermined one of the switches disposed adjacent said tone arm being engaged by the switch engaging means on a predetermined magazine, a circuit to the electrically operable means for transmitting rotation to the rotatable member will be opened thus arresting movement of the magazines thereon, said means for limiting rotation of the predetermined magazine comprising a pivoted T-shaped member disposed adjacent the path of travel of the predetermined magazine and at a point remote from the axis of the predetermined magazine, a solenoid disposed adjacent opposed sides of the T-shaped member, electrically operable plungers in the solenoids connected to opposed ends of the T-shaped member and an electrical connection between each of the solenoids and the manually operable selector means for selectively energizing either of the solenoids whereby upon one of the solenoids being energized, the T-shaped member will be partially rotated so as to project into the path of the rotating magazine to limit further rotation thereof thus presenting selected surfaces of the records in the predetermined magazine to be engaged by the tone arm.

7. In a selective automatic phonograph having a rotatable member on which a plurality of magazines are mounted for rotation on an axis extending radially of the rotatable member, electrically operable means for rotating the rotatable member, manually controlled electrically operable means for arresting rotation of the rotatable member in a predetermined position, an intermittently reciprocable shaft disposed adjacent the path of travel of the magazines on the rotatable member, said shaft being intermittently reciprocable in timed relation to movement of the rotatable member, means on each of said magazines for engaging said intermittently reciprocable shaft in a manner to cause like rotation to be transmitted from the intermittently reciprocable shaft to the predetermined magazine and electrically operable means for arresting rotation of the predetermined magazine in a predetermined position so as to present a selected surface of the records in the predetermined magazine to be played and resilient means associated with the intermittently reciprocable shaft so as to permit the intermittently reciprocable shaft to stop in the position determined by the magazine arresting means.

GEORGE F. STARNES.

REFERENCES CITED

The following references are of record in the file of this patent:

UNITED STATES PATENTS

| Number | Name | Date |
|---|---|---|
| 1,199,192 | Krauss | Sept. 26, 1916 |
| 1,291,027 | Krauss | Jan. 14, 1919 |
| 1,525,283 | Eshleman | Feb. 3, 1925 |
| 1,538,667 | Smith | May 19, 1925 |
| 1,872,706 | Erbe | Aug. 23, 1932 |
| 1,911,707 | Mills | May 30, 1933 |
| 1,919,378 | Pepin | July 25, 1933 |
| 2,005,923 | Wilcox | June 25, 1935 |
| 2,265,124 | Andres | Dec. 9, 1941 |
| 2,389,327 | Rockola et al. | Nov. 20, 1945 |

FOREIGN PATENTS

| Number | Country | Date |
|---|---|---|
| 198,698 | Great Britain | Feb. 21, 1924 |